(12) United States Patent
Kobayashi et al.

(10) Patent No.: US 11,546,561 B2
(45) Date of Patent: Jan. 3, 2023

(54) IMAGING APPARATUS, IMAGE DATA PROCESSING METHOD OF IMAGING APPARATUS, AND PROGRAM

(71) Applicant: FUJIFILM CORPORATION, Tokyo (JP)

(72) Inventors: Makoto Kobayashi, Saitama (JP); Tomoyuki Kawai, Saitama (JP); Ryo Hasegawa, Saitama (JP); Hitoshi Sakurabu, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 17/351,273

(22) Filed: Jun. 18, 2021

(65) Prior Publication Data

US 2021/0314535 A1    Oct. 7, 2021

Related U.S. Application Data

(63) Continuation of application No. PCT/JP2019/049218, filed on Dec. 16, 2019.

(30) Foreign Application Priority Data

Dec. 26, 2018    (JP) .............................. JP2018-243662

(51) Int. Cl.
*H04N 5/374*    (2011.01)
*H04N 9/04*    (2006.01)
(Continued)

(52) U.S. Cl.
CPC ....... *H04N 9/04515* (2018.08); *G06T 3/4015* (2013.01); *G06V 10/26* (2022.01);
(Continued)

(58) Field of Classification Search
CPC ...... H04N 9/04515; H04N 5/374; H04N 9/64; H04N 2209/042; H04N 5/3456;
(Continued)

(56) References Cited

U.S. PATENT DOCUMENTS

| | | | |
|---|---|---|---|
| 2005/0007375 A1* | 1/2005 | Yi ..................... | H04N 21/42692 348/E5.002 |
| 2006/0164527 A1* | 7/2006 | Wada ................. | H04N 9/04511 348/E9.01 |

(Continued)

FOREIGN PATENT DOCUMENTS

| | | |
|---|---|---|
| CN | 1717940 A | 1/2006 |
| CN | 101102498 A | 1/2008 |

(Continued)

OTHER PUBLICATIONS

International Search Report issued in International Application No. PCT/JP2019/049218 dated Mar. 3, 2020.

(Continued)

*Primary Examiner* — Mekonnen D Dagnew
(74) *Attorney, Agent, or Firm* — Solaris Intellectual Property Group, PLLC

(57) ABSTRACT

An imaging apparatus includes a storage portion that stores captured image data obtained by imaging a subject by an imaging element and is incorporated in the imaging element, an output portion that is incorporated in the imaging element, and a plurality of signal processing portions that are disposed outside the imaging element, in which the output portion includes a plurality of output lines each disposed in correspondence with each of the plurality of signal processing portions and outputs each of a plurality of pieces of image data into which the captured image data stored in the storage portion is divided, to a corresponding signal processing portion among the plurality of signal processing portions from the plurality of output lines, and any of the plurality of signal processing portions combines the plurality of pieces of image data.

19 Claims, 31 Drawing Sheets

(51) Int. Cl.
  *G06T 3/40* (2006.01)
  *H04N 9/64* (2006.01)
  *G06V 10/26* (2022.01)
  *G06V 40/16* (2022.01)

(52) U.S. Cl.
  CPC .......... *G06V 40/161* (2022.01); *H04N 5/374* (2013.01); *H04N 9/64* (2013.01); *H04N 2209/042* (2013.01)

(58) Field of Classification Search
  CPC ........ H04N 5/225; H04N 5/232; H04N 5/343; H04N 5/772; H04N 9/8042; G06T 3/4015; G06T 1/20; G06V 10/26; G06V 40/161
  See application file for complete search history.

(56) References Cited

U.S. PATENT DOCUMENTS

| | | | |
|---|---|---|---|
| 2013/0235150 A1* | 9/2013 | Itou | G06T 1/00 348/42 |
| 2014/0059317 A1 | 2/2014 | Okajima et al. | |
| 2016/0198115 A1 | 7/2016 | Tsuchiya | |
| 2019/0253655 A1 | 8/2019 | Tsuchiya | |

FOREIGN PATENT DOCUMENTS

| | | |
|---|---|---|
| CN | 103312988 A | 9/2013 |
| CN | 104820966 A | 8/2015 |
| JP | 2006238022 A | 9/2006 |
| JP | 201442110 A | 3/2014 |
| JP | 2016-158294 A | 9/2016 |
| JP | 2018-160830 A | 10/2018 |
| JP | 2018-182551 A | 11/2018 |
| WO | 2015/022900 A1 | 2/2015 |

OTHER PUBLICATIONS

Written Opinion of the ISA issued in International Application No. PCT/JP2019/049218 dated Mar. 3, 2020.
International Preliminary Report on Patentability issued in International Application No. PCT/JP2019/049218 dated Jun. 23, 2020.
English language translation of the following: Office action dated Jul. 26, 2022 from the SIPO in a Chinese patent application No. 201980086347.3 corresponding to the instant patent application. This office action translation is submitted now in order to supplement the understanding of the cited references which are being disclosed in the instant Information Disclosure Statement.

* cited by examiner

IMAGING APPARATUS, IMAGE DATA PROCESSING METHOD OF IMAGING APPARATUS, AND PROGRAM

CROSS-REFERENCE TO RELATED APPLICATIONS

This application is a continuation application of International Application No. PCT/JP2019/049218, filed Dec. 16, 2019, the disclosure of which is incorporated herein by reference in its entirety. Further, this application claims priority from Japanese Patent Application No. 2018-243662, filed Dec. 26, 2018, the disclosure of which is incorporated herein by reference in its entirety.

BACKGROUND

1. Technical Field

The technology of the present disclosure relates to an imaging apparatus, an image data processing method of an imaging apparatus, and a program.

2. Related Art

JP2016-158294A discloses an electronic apparatus comprising an imaging element, an image processing portion, and a control portion. The imaging element has a first imaging region and a second imaging region. In the imaging element, pixels are alternately arranged in the first imaging region and the second imaging region. In a case of a first imaging condition, the imaging element performs imaging using the first imaging region. In a case of a second imaging condition different from the first imaging condition, the imaging element performs imaging using the second imaging region. Image data consisting of pixel signals of the first imaging region and image data consisting of pixel signals of the second imaging region are output to the image processing portion in a rear stage through one output line.

The image processing portion generates first image data by performing various types of image processing on the image data consisting of the pixel signals of the first imaging region, and generates second image data by performing various types of image processing on the image data consisting of the pixel signals of the second imaging region. The control portion displays a live view image or a still picture in which a first image indicated by the first image data and a second image indicated by the second image data are combined, on a display portion.

SUMMARY

One embodiment according to the technology of the present disclosure provides an imaging apparatus, an image data processing method of an imaging apparatus, and a program capable of implementing high-speed image processing, compared to a case of outputting image data to a plurality of signal processing portions from an imaging element using only one output line.

An imaging apparatus according to a first aspect of the technology of the present disclosure is an imaging apparatus including an imaging element and comprises a storage portion that stores captured image data obtained by imaging a subject by the imaging element and is incorporated in the imaging element, an output portion that is incorporated in the imaging element, and a plurality of signal processing portions that are disposed outside the imaging element, in which the output portion includes a plurality of output lines each disposed in correspondence with each of the plurality of signal processing portions and outputs each of a plurality of pieces of image data into which the captured image data stored in the storage portion is divided, to a corresponding signal processing portion among the plurality of signal processing portions from the plurality of output lines, and any of the plurality of signal processing portions combines the plurality of pieces of image data. Accordingly, high-speed image processing can be implemented, compared to a case of outputting image data to the plurality of signal processing portions from the imaging element using only one output line.

In the imaging apparatus according to a second aspect of the technology of the present disclosure, each of the plurality of pieces of image data is image data indicating an image having an overlapping region between adjacent images among images based on each of the plurality of pieces of image data. Accordingly, noticeability of a boundary region between two images is suppressed, compared to a case of joining two images obtained by simply dividing a captured image into two parts.

In the imaging apparatus according to a third aspect of the technology of the present disclosure, the plurality of images are divided into a designated image and an image different from the designated image. Accordingly, noticeability of a boundary region between the designated image and the image different from the designated image is suppressed.

The imaging apparatus according to a fourth aspect of the technology of the present disclosure further comprises a detection portion that detects face image data indicating an image of a face from the captured image data, in which the designated image is an image including the image of the face indicated by the face image data detected by the detection portion in a captured image indicated by the captured image data. Accordingly, noticeability of a boundary region between the image including the image of the face and an image not including the image of the face is suppressed.

In the imaging apparatus according to a fifth aspect of the technology of the present disclosure, a division method for the captured image data varies between a recording imaging mode and a display motion picture capturing mode. Accordingly, a balance among image quality, power consumption, and a processing speed can be set to vary between the recording imaging mode and the display motion picture capturing mode.

In the imaging apparatus according to a sixth aspect of the technology of the present disclosure, the captured image data is divided into a plurality of pieces of overlapping image data as the plurality of pieces of image data in the recording imaging mode, and the captured image data is divided in units of lines in the display motion picture capturing mode. Accordingly, in the recording imaging mode, the image quality can be increased, compared to the display motion picture capturing mode. In the display motion picture capturing mode, the power consumption can be reduced, and the processing speed can be increased, compared to the recording imaging mode.

In the imaging apparatus according to a seventh aspect of the technology of the present disclosure, each of the plurality of pieces of overlapping image data is image data indicating an image having an overlapping region between adjacent images among the plurality of images. Accordingly, noticeability of a boundary region between two images is suppressed, compared to a case of joining two images obtained by simply dividing a captured image into two parts.

In the imaging apparatus according to an eighth aspect of the technology of the present disclosure, the recording imaging mode is an operation mode in which the imaging element performs imaging for a still picture image. Accordingly, the balance among the image quality, the power consumption, and the processing speed can be set to vary between the operation mode in which the imaging for the still picture image is performed, and the display motion picture capturing mode.

In the imaging apparatus according to a ninth aspect of the technology of the present disclosure, the captured image data is color image data indicating a color captured image in which a plurality of primary color pixels are periodically arranged, the color image data is divided into a plurality of pieces of primary color pixel arrangement image data as the plurality of pieces of image data, and each of the plurality of pieces of primary color pixel arrangement image data is image data indicating an image in which each of the plurality of primary color pixels is periodically arranged. Accordingly, even in a case where the color image data is divided into the plurality of pieces of primary color pixel arrangement image data, demosaicing for the plurality of primary color pixels can be implemented.

In the imaging apparatus according to a tenth aspect of the technology of the present disclosure, the plurality of pieces of primary color pixel arrangement image data are a plurality of pieces of divided image data obtained by thinning out and then, dividing the color image data. Accordingly, high-speed processing can be implemented, compared to a case where a plurality of pieces of image data obtained by dividing the color image data without thinning are processed by the plurality of signal processing portions.

In the imaging apparatus according to an eleventh aspect of the technology of the present disclosure, the plurality of pieces of divided image data are odd-numbered column image data indicating a set of pixels of odd-numbered columns and even-numbered column image data indicating a set of pixels of even-numbered columns in thinned image data obtained by thinning out the color image data in units of rows. Accordingly, each of the signal processing portions can implement high-speed processing, compared to a case of processing image data obtained by irregular division.

In the imaging apparatus according to a twelfth aspect of the technology of the present disclosure, any of the plurality of signal processing portions performs demosaicing on combined image data obtained by combining the plurality of pieces of image data. Accordingly, a high image quality image can be obtained, compared to a case of not performing the demosaicing.

In the imaging apparatus according to a thirteenth aspect of the technology of the present disclosure, the plurality of pieces of image data are a plurality of pieces of compressed image data obtained by compressing the captured image data by dividing the captured image data into a plurality of bit ranges. Accordingly, each of the signal processing portions can implement high-speed processing, compared to a case of processing image data obtained by irregular division.

In the imaging apparatus according to a fourteenth aspect of the technology of the present disclosure, the plurality of pieces of compressed image data are high-order bit image data and low-order bit image data in the captured image data. Accordingly, high-accuracy processing can be performed on the high-order bit image data, compared to the low-order bit image data. For the low-order bit image data, the power consumption can be reduced, and the processing speed can be increased, compared to the high-order bit image data.

In the imaging apparatus according to a fifteenth aspect of the technology of the present disclosure, the imaging element is an imaging element in which at least a photoelectric conversion element and the storage portion are formed in one chip. Accordingly, portability of the imaging element can be increased, compared to an imaging element in which the photoelectric conversion element and the storage portion are not formed in one chip.

In the imaging apparatus according to a sixteenth aspect of the technology of the present disclosure, the imaging element is a laminated imaging element in which the photoelectric conversion element is laminated with the storage portion. Accordingly, a load exerted on processing between the photoelectric conversion element and the storage portion can be reduced, compared to a case of not laminating the photoelectric conversion element and the storage portion.

The imaging apparatus according to a seventeenth aspect of the technology of the present disclosure further comprises a control portion that performs a control for displaying an image based on the plurality of pieces of image data output by the output portion on a display portion. Accordingly, a user can visually recognize the image based on the plurality of pieces of image data output by the output portion.

An image data processing method according to an eighteenth aspect of the technology of the present disclosure is an image data processing method of an imaging apparatus including an imaging element, a storage portion that stores captured image data obtained by imaging a subject by the imaging element and is incorporated in the imaging element, an output portion that is incorporated in the imaging element, and a plurality of signal processing portions that are disposed outside the imaging element, in which the output portion includes a plurality of output lines each disposed in correspondence with each of the plurality of signal processing portions and outputs each of a plurality of pieces of image data into which the captured image data stored in the storage portion is divided, to a corresponding signal processing portion among the plurality of signal processing portions from the plurality of output lines, and any of the plurality of signal processing portions combines the plurality of pieces of image data. Accordingly, high-speed image processing can be implemented, compared to a case of outputting image data to the plurality of signal processing portions from the imaging element using only one output line.

A program according to a nineteenth aspect of the technology of the present disclosure is a program causing a computer to function as an output portion included in an imaging apparatus including an imaging element, a storage portion that stores captured image data obtained by imaging a subject by the imaging element and is incorporated in the imaging element, the output portion that is incorporated in the imaging element, and a plurality of signal processing portions that are disposed outside the imaging element, in which the output portion includes a plurality of output lines each disposed in correspondence with each of the plurality of signal processing portions and outputs each of a plurality of pieces of image data into which the captured image data stored in the storage portion is divided, to a corresponding signal processing portion among the plurality of signal processing portions from the plurality of output lines, and any of the plurality of signal processing portions combines the plurality of pieces of image data. Accordingly, high-speed image processing can be implemented, compared to a case of outputting image data to the plurality of signal processing portions from the imaging element using only one output line.

An imaging apparatus according to a twentieth aspect of the technology of the present disclosure is an imaging apparatus including an imaging element and comprises a memory that stores captured image data obtained by imaging a subject by the imaging element and is incorporated in the imaging element, a processor that is incorporated in the imaging element, and a plurality of signal processing portions that are disposed outside the imaging element, in which the processor includes a plurality of output lines each disposed in correspondence with each of the plurality of signal processing portions and outputs each of a plurality of pieces of image data into which the captured image data stored in the memory is divided, to a corresponding signal processing portion among the plurality of signal processing portions from the plurality of output lines, and any of the plurality of signal processing portions combines the plurality of pieces of image data. Accordingly, high-speed image processing can be implemented, compared to a case of outputting image data to the plurality of signal processing portions from the imaging element using only one output line.

BRIEF DESCRIPTION OF THE DRAWINGS

Exemplary embodiments of the technology of the disclosure will be described in detail based on the following figures, wherein.

DETAILED DESCRIPTION

Hereinafter, an example of embodiments of an imaging apparatus according to the embodiments of the technology of the present disclosure will be described in accordance with the appended drawings.

First, meanings of terms used in the following description will be described.

In the following description, the abbreviation CPU stands for "Central Processing Unit". In addition, in the following description, the abbreviation RAM stands for "Random Access Memory". In addition, in the following description, the abbreviation ROM stands for "Read Only Memory". In addition, in the following description, the abbreviation DRAM stands for "Dynamic Random Access Memory". In addition, in the following description, the abbreviation SRAM stands for "Static Random Access Memory".

In the following description, the abbreviation IC stands for "Integrated Circuit". In addition, in the following description, the abbreviation LSI stands for "Large-Scale Integration". In addition, in the following description, the abbreviation ASIC stands for "Application Specific Integrated Circuit". In addition, in the following description, the abbreviation PLD stands for "Programmable Logic Device". In addition, in the following description, the abbreviation FPGA stands for "Field-Programmable Gate Array".

In the following description, the abbreviation SSD stands for "Solid State Drive". In addition, in the following description, the abbreviation DVD-ROM stands for "Digital Versatile Disc Read Only Memory". In addition, in the following description, the abbreviation USB stands for "Universal Serial Bus". In addition, in the following description, the abbreviation HDD stands for "Hard Disk Drive". In addition, in the following description, the abbreviation EEPROM stands for "Electrically Erasable and Programmable Read Only Memory".

In the following description, the abbreviation CCD stands for "Charge Coupled Device". In addition, in the following description, the abbreviation CMOS stands for "Complementary Metal Oxide Semiconductor". In addition, in the following description, the abbreviation EL stands for "Electro-Luminescence". In addition, in the following description, the abbreviation A/D stands for "Analog/Digital". In addition, in the following description, the abbreviation FIFO stands for "First in First out". In addition, in the following description, the abbreviation I/F stands for "Interface". In addition, in the following description, the abbreviation EIS stands for "Electronics Image Stabilization". In addition, in the following description, the abbreviation AF stands for "Auto-Focus". In addition, in the following description, the abbreviation AE stands for "Automatic Exposure". In addition, in the following description, the abbreviation UI stands for "User Interface".

First Embodiment

Figure 1:
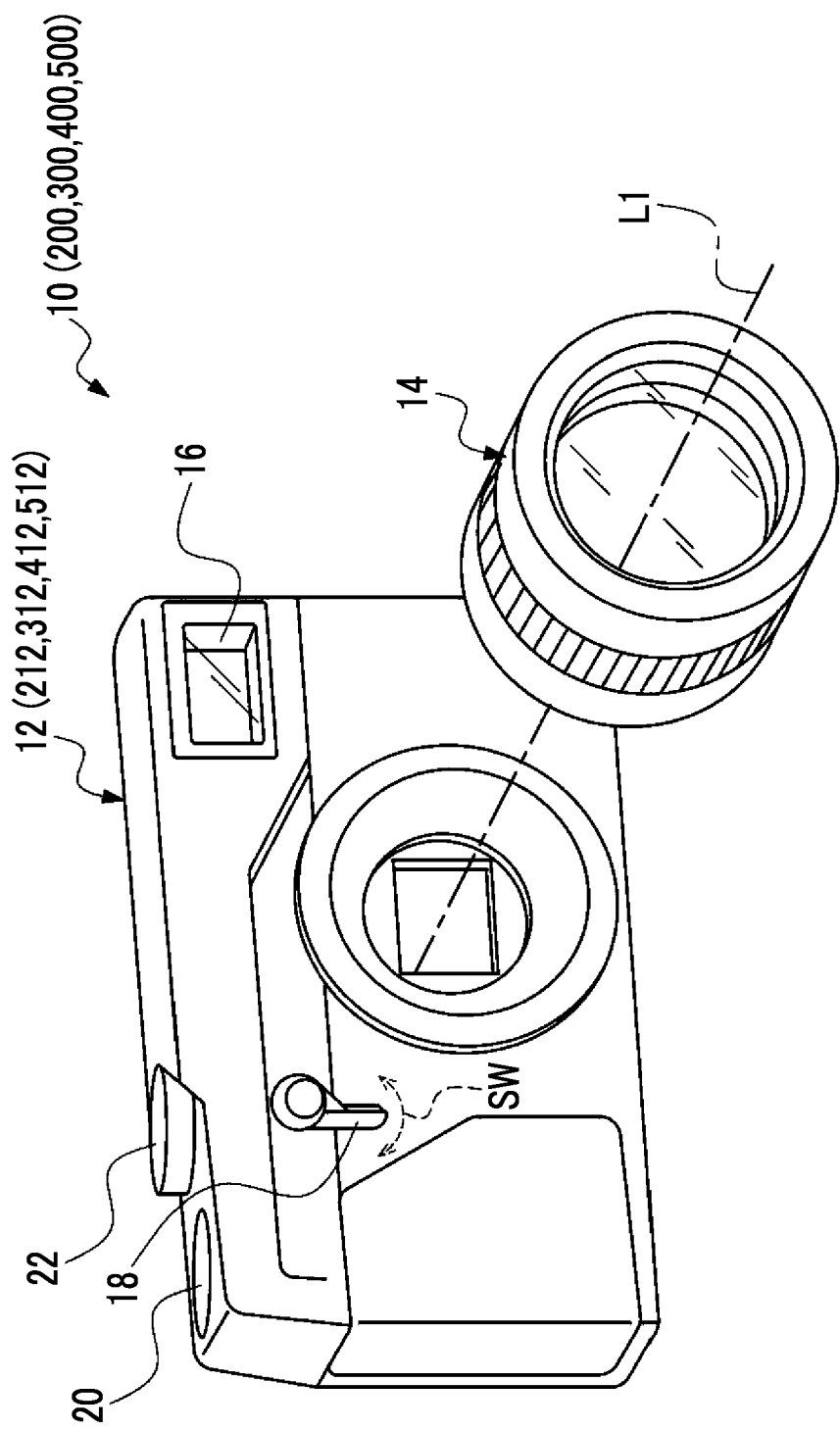
FIG. 1 is a perspective view illustrating an exterior of an imaging apparatus.

As illustrated in FIG. 1 as an example, an imaging apparatus 10 is an interchangeable lens camera. The imaging apparatus 10 is a digital camera that includes an imaging apparatus main body 12 and an interchangeable lens 14 interchangeably mounted on the imaging apparatus main body 12, and that does not include a reflex mirror.

A hybrid finder (registered trademark) 16 is disposed in the imaging apparatus main body 12. For example, the hybrid finder 16 here refers to a finder in which an optical view finder (hereinafter, referred to as the OVF) and an electronic view finder (hereinafter, referred to as the EVF) are selectively used. The abbreviation OVF stands for "optical viewfinder". In addition, the abbreviation EVF stands for "electronic viewfinder".

A finder switching lever 18 is disposed on a front surface of the imaging apparatus main body 12. An optical image visually recognizable by the OVF and a live view image that is an electronic image visually recognizable by the EVF are switched by rotationally moving the finder switching lever 18 in a direction of arrow SW. The "live view image" here refers to a motion picture image for displaying obtained by imaging by a photoelectric conversion element 61 (refer to FIG. 3 and FIG. 4) described later. The live view image is generally referred to as a live preview image.

A release button 20 and a dial 22 are disposed on an upper surface of the imaging apparatus main body 12. The dial 22 is operated in a case of setting an operation mode of an imaging system, an operation mode of a playback system, and the like.

The release button 20 functions as an imaging preparation instruction portion and an imaging instruction portion, and a push operation of two stages of an imaging preparation instruction state and an imaging instruction state can be detected. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

In the imaging apparatus 10, an imaging mode and a playback mode are selectively set as an operation mode in accordance with an instruction of a user. The imaging mode is broadly divided into a display motion picture capturing mode and a recording imaging mode.

The display motion picture capturing mode is an operation mode in which the live view image based on display image data of a plurality of consecutive frames obtained by consecutive imaging is displayed on a first display 32 and/or a second display 86 (refer to FIG. 8 and FIG. 9) described later. The display image data is image data for the live view image and, for example, is generated by a CPU 46A (refer to FIG. 8) described later based on captured image data 70 (refer to FIG. 3 to FIG. 7) indicating an image of a subject. The captured image data 70 refers to image data obtained by imaging the subject by an imaging element 44 (refer to FIG. 3) described later. Hereinafter, for convenience of description, the image indicated by the captured image data 70 will be referred to as a "captured image".

The recording imaging mode is broadly divided into a still picture image capturing mode and a motion picture image capturing mode. The still picture image capturing mode is an operation mode in which the imaging element 44 (refer to FIG. 3) performs imaging for a still picture image. In the still picture image capturing mode, a still picture image obtained by imaging the subject by the imaging apparatus 10 is recorded on a specific recording device (for example, a secondary storage device (refer to FIG. 8)). The motion picture image capturing mode is an operation mode in which the imaging element 44 (refer to FIG. 3) performs imaging for the motion picture image. In the motion picture image capturing mode, a motion picture image obtained by imaging the subject by the imaging apparatus 10 is stored in the specific recording device.

The recording imaging mode is an operation mode in which the live view image is displayed on the first display 32 and/or the second display 86 described later, and in which recording image data is recorded on a secondary storage device 80 (refer to FIG. 8) described later and/or a memory card or the like. The recording image data is broadly divided into still picture image data and motion picture image data and is generated based on the captured image data 70 (refer to FIG. 3 to FIG. 7).

In a case where the imaging mode is set, first, the imaging apparatus 10 is set to the display motion picture capturing mode. In the display motion picture capturing mode, in a case where the push operation is performed on the release button 20, the imaging apparatus 10 transitions to the recording imaging mode from the display motion picture capturing mode.

In the imaging mode, a manual focus mode and an auto focus mode are selectively set in accordance with an instruction of the user. In the auto focus mode, an imaging condition is adjusted by setting the release button 20 to the half push state. Then, in a case where the full push state is subsequently set, exposure is performed. That is, by setting the release button 20 to the half push state, an AE function is operated, and an exposure state is set. Then, an AF function is operated, and a focusing control is performed. In a case where the release button 20 is set to the full push state, imaging is performed.

Figure 2:
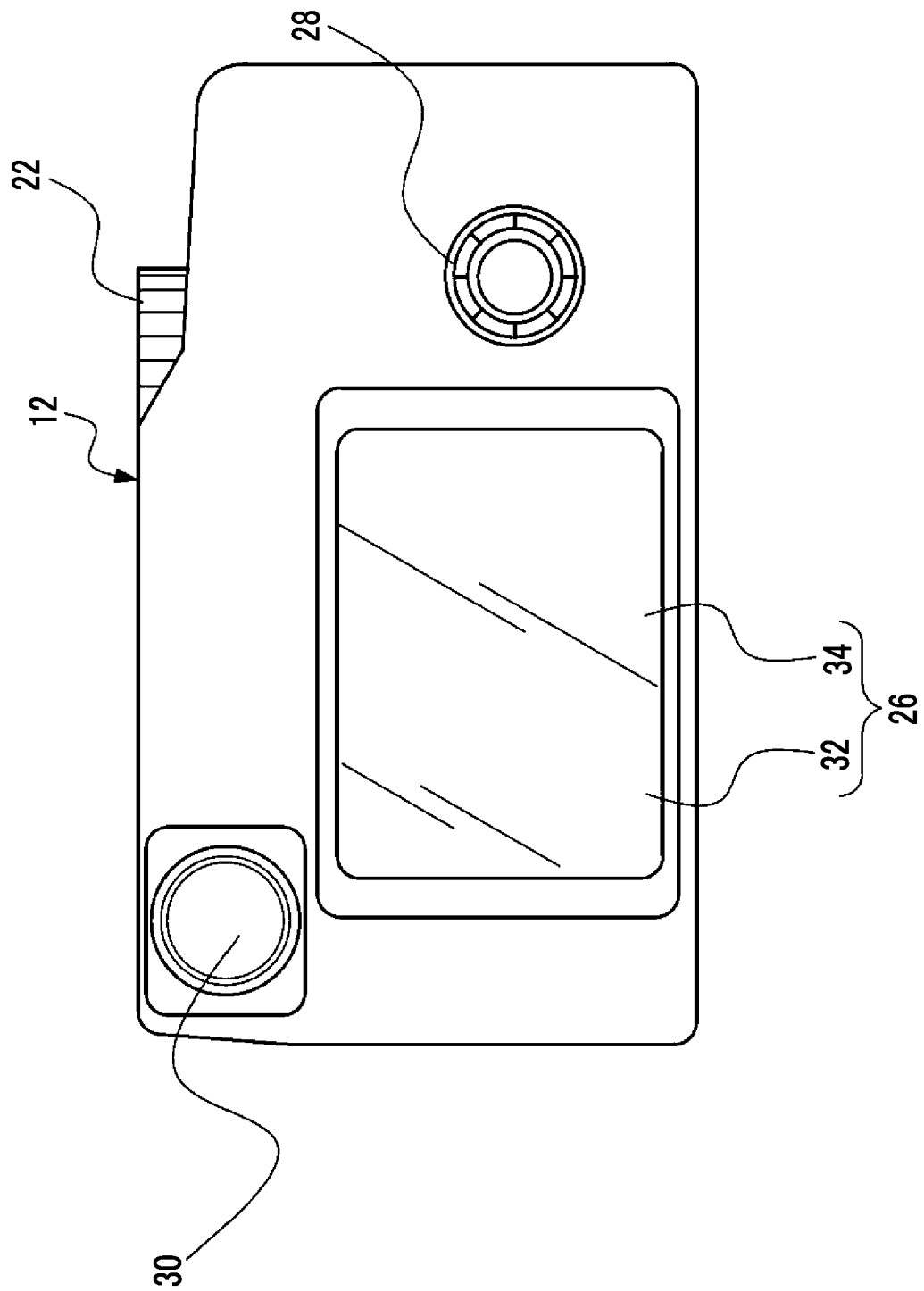
FIG. 2 is a rear view illustrating a rear surface side of the imaging apparatus.

As illustrated in FIG. 2 as an example, a touch panel display 26, an instruction key 28, and a finder eyepiece portion 30 are disposed on a rear surface of the imaging apparatus main body 12.

Figure 8:
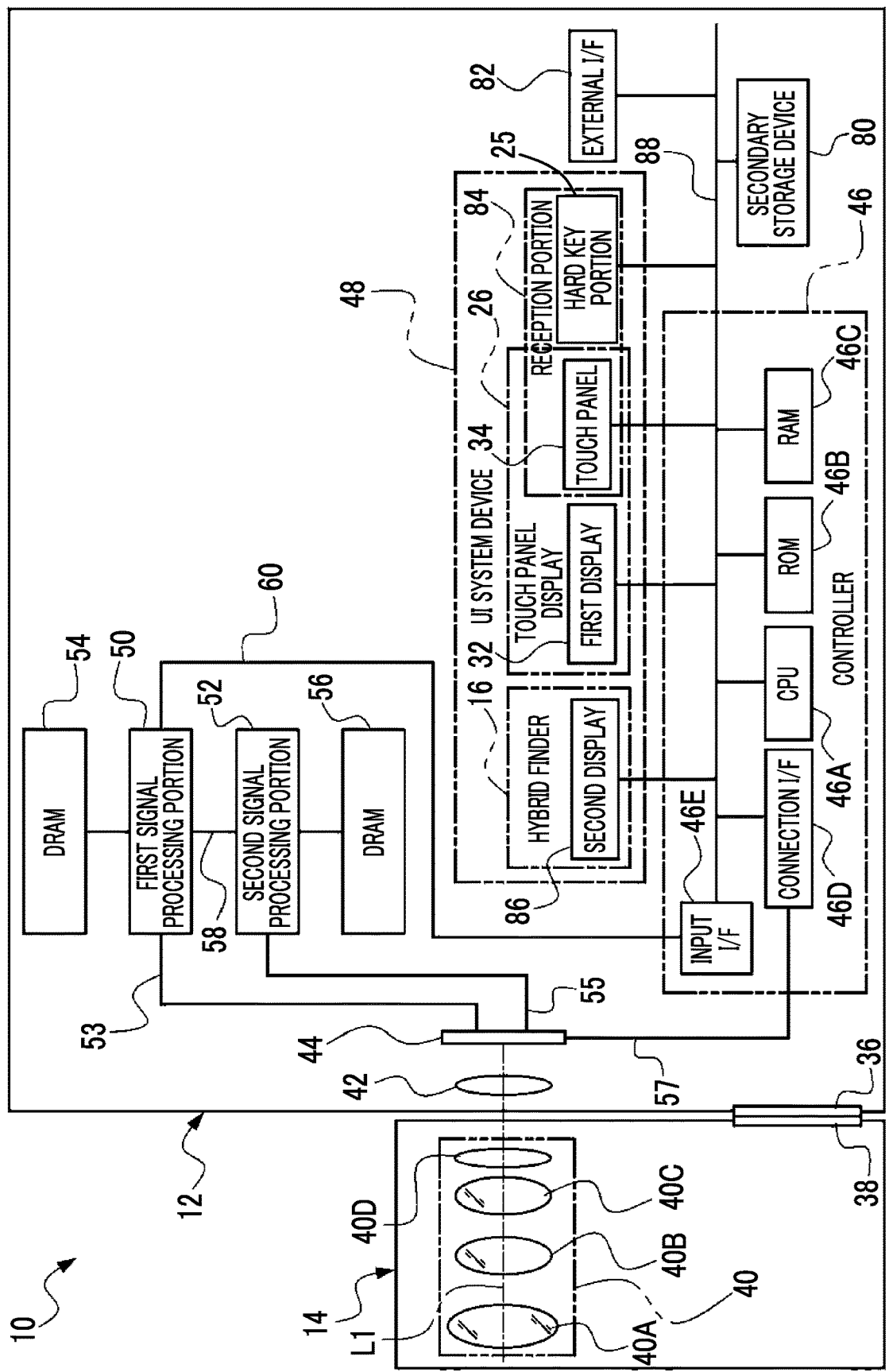
FIG. 8 is a block diagram illustrating configurations of a controller, a UI system device, and surroundings of the controller and the UI system device included in the imaging apparatus.

The touch panel display 26 comprises the first display 32 and a touch panel 34 (refer to FIG. 8). A liquid crystal display or an organic EL display is illustrated as the first display 32.

The first display 32 displays images, text information, and the like. The first display 32 is used for displaying the live view image which is obtained by consecutive imaging in a case where the imaging apparatus 10 is in the imaging mode. In addition, the first display 32 is used for displaying the still picture image obtained by imaging in a case where a still picture image capturing instruction is provided. Furthermore, the first display 32 is used for displaying a playback image and displaying a menu screen and the like in a case where the imaging apparatus 10 is in the playback mode.

The touch panel 34 is a transmissive touch panel and is overlaid on a surface of a display region of the first display 32. The touch panel 34 senses a contact by an instruction object such as a finger or a stylus pen and outputs a sensing result to a predetermined output destination such as the CPU 46A (refer to FIG. 8) described later.

The instruction key 28 receives various instructions such as selection of one or a plurality of menus, confirmation of a selected content, deletion of the selected content, zooming, and frame advance.

Figure 3:
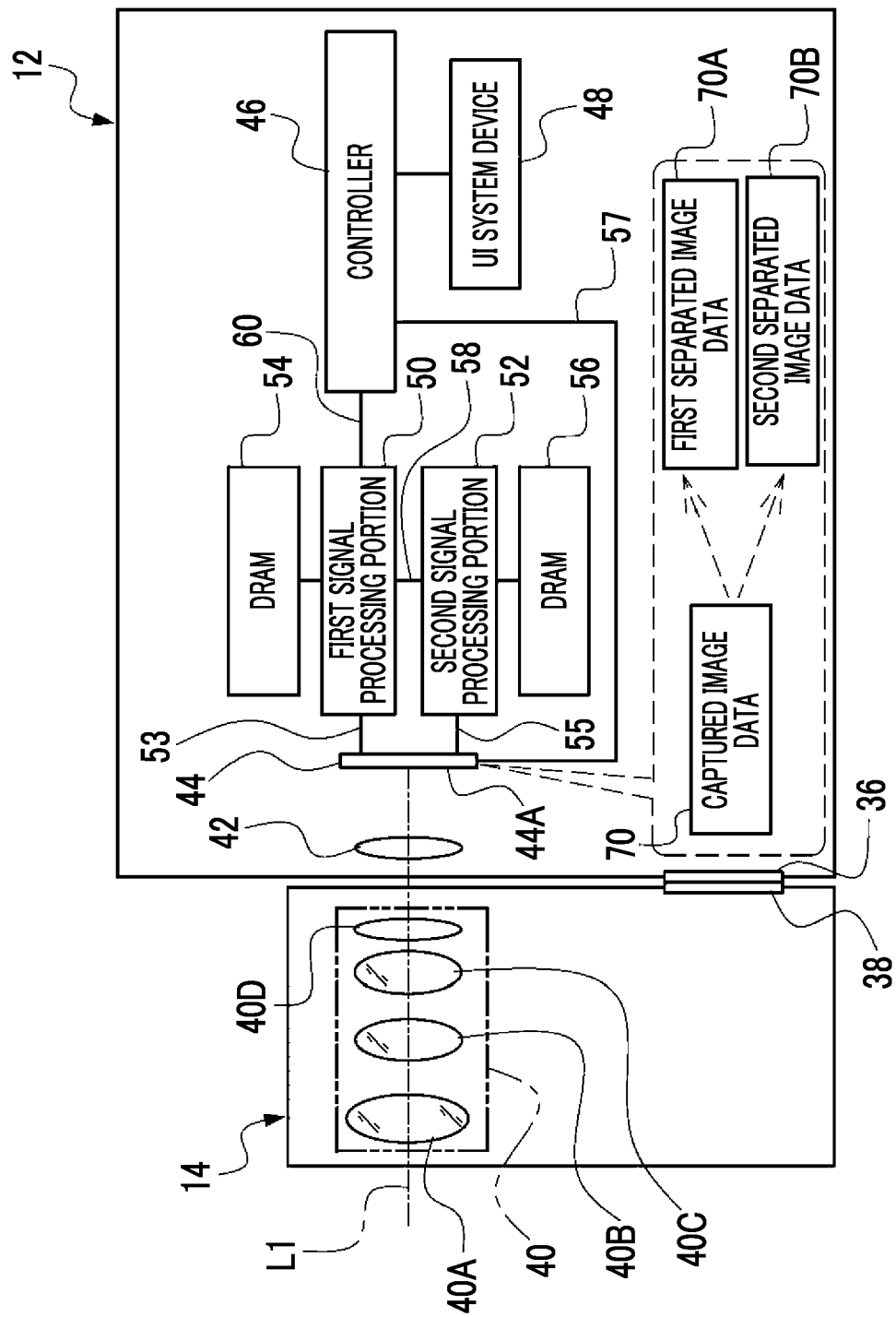
FIG. 3 is a block diagram illustrating a configuration of the imaging apparatus.

As illustrated in FIG. 3 as an example, the imaging apparatus 10 comprises mounts 36 and 38. The mount 36 is disposed in the imaging apparatus main body 12. The mount 38 is disposed in the interchangeable lens 14 at a position corresponding to a position of the mount 36. The interchangeable lens 14 is interchangeably mounted on the imaging apparatus main body 12 by joining the mount 38 to the mount 36.

As illustrated in FIG. 3 as an example, the interchangeable lens 14 includes an imaging lens 40. The imaging lens 40 comprises an objective lens 40A, a focus lens 40B, a zoom lens 40C, and a stop 40D. The objective lens 40A, the focus lens 40B, the zoom lens 40C, and the stop 40D are arranged in an order of the objective lens 40A, the focus lens 40B, the zoom lens 40C, and the stop 40D along an optical axis L1 from a subject side to an imaging apparatus main body 12 side. The focus lens 40B, the zoom lens 40C, and the stop 40D operate by receiving motive power from a driving source (not illustrated) such as a motor under control of the CPU 46A (refer to FIG. 8) described later. That is, the focus lens 40B and the zoom lens 40C move along the optical axis L1 in response to the provided motive power. In addition, the stop 40D adjusts exposure by operating in response to the provided motive power.

The imaging apparatus main body 12 comprises a mechanical shutter 42 and the imaging element 44. The mechanical shutter 42 operates by receiving motive power from a driving source (not illustrated) such as a motor under control of the CPU 46A (refer to FIG. 8) described later. In a case where the interchangeable lens 14 is mounted on the imaging apparatus main body 12 through the mounts 36 and 38, subject light showing the subject is transmitted through the imaging lens 40, and an image of the subject light is formed on a light receiving surface 44A of the imaging element 44 through the mechanical shutter 42.

The imaging apparatus main body 12 comprises a controller 46, a UI system device 48, a first signal processing portion 50, a second signal processing portion 52, and DRAMs 54 and 56. The first signal processing portion 50 and the second signal processing portion 52 are an example of a "plurality of signal processing processors" according to the embodiments of the technology of the present disclosure.

The controller 46 controls the entire imaging apparatus 10. The UI system device 48 is a device that presents information to the user or receives an instruction from the user. The UI system device 48 is connected to the controller 46. The controller 46 acquires various types of information from the UI system device 48 and controls the UI system device 48.

The imaging element 44 is connected to the controller 46 through a communication line 57 and generates the captured image data 70 by imaging the subject under control of the controller 46. As will be described later in detail, the imaging element 44 separates the generated captured image data 70 into two pieces of image data. In the example illustrated in FIG. 3, first separated image data 70A is illustrated as one piece of image data of the two pieces of image data obtained by separating the captured image data 70, and second separated image data 70B is illustrated as the other piece of image data.

The imaging element 44 is connected to the first signal processing portion 50 through a first output line 53 and is connected to the second signal processing portion 52 through a second output line 55. Each of the first signal processing portion 50 and the second signal processing portion 52 is an LSI. In the present embodiment, each of the first signal processing portion 50 and the second signal processing portion 52 is implemented by an ASIC.

However, the technology of the present disclosure is not limited thereto. For example, a PLD and/or an FPGA may be employed instead of the ASIC. In addition, the ASIC, the PLD, and/or the FPGA may be employed. In addition, a computer including a CPU, a ROM, and a RAM may be employed. The number of CPUs may be singular or plural. In addition, the first signal processing portion 50 and/or the second signal processing portion 52 may be implemented by a combination of a hardware configuration and a software configuration.

The first signal processing portion 50 and the second signal processing portion 52 are connected to each other through a communication line 58. The first signal processing portion 50 is connected to the DRAM 54, and the second signal processing portion 52 is connected to the DRAM 56. The first signal processing portion 50 is connected to the controller 46 through a communication line 60.

The imaging element 44 outputs the first separated image data 70A to the first signal processing portion 50 through the first output line 53, and outputs the second separated image data 70B to the second signal processing portion 52 through the second output line 55.

The first signal processing portion 50 performs various types of signal processing (for example, a "specific type of signal processing" described later) on the input first separated image data 70A in cooperation with the DRAM 54. The second signal processing portion 52 performs various types of signal processing (for example, the "specific type of signal processing" described later) on the input second separated image data 70B in cooperation with the DRAM 56. The second signal processing portion 52 outputs the second separated image data 70B subjected to the various types of signal processing to the first signal processing portion 50 through the communication line 58. The first signal processing portion 50 combines the first separated image data 70A subjected to the various types of signal processing with the second separated image data 70B input from the second signal processing portion 52 and outputs the combined first separated image data 70A and the second separated image data 70B to the controller 46 through the communication line 60.

Figure 4:
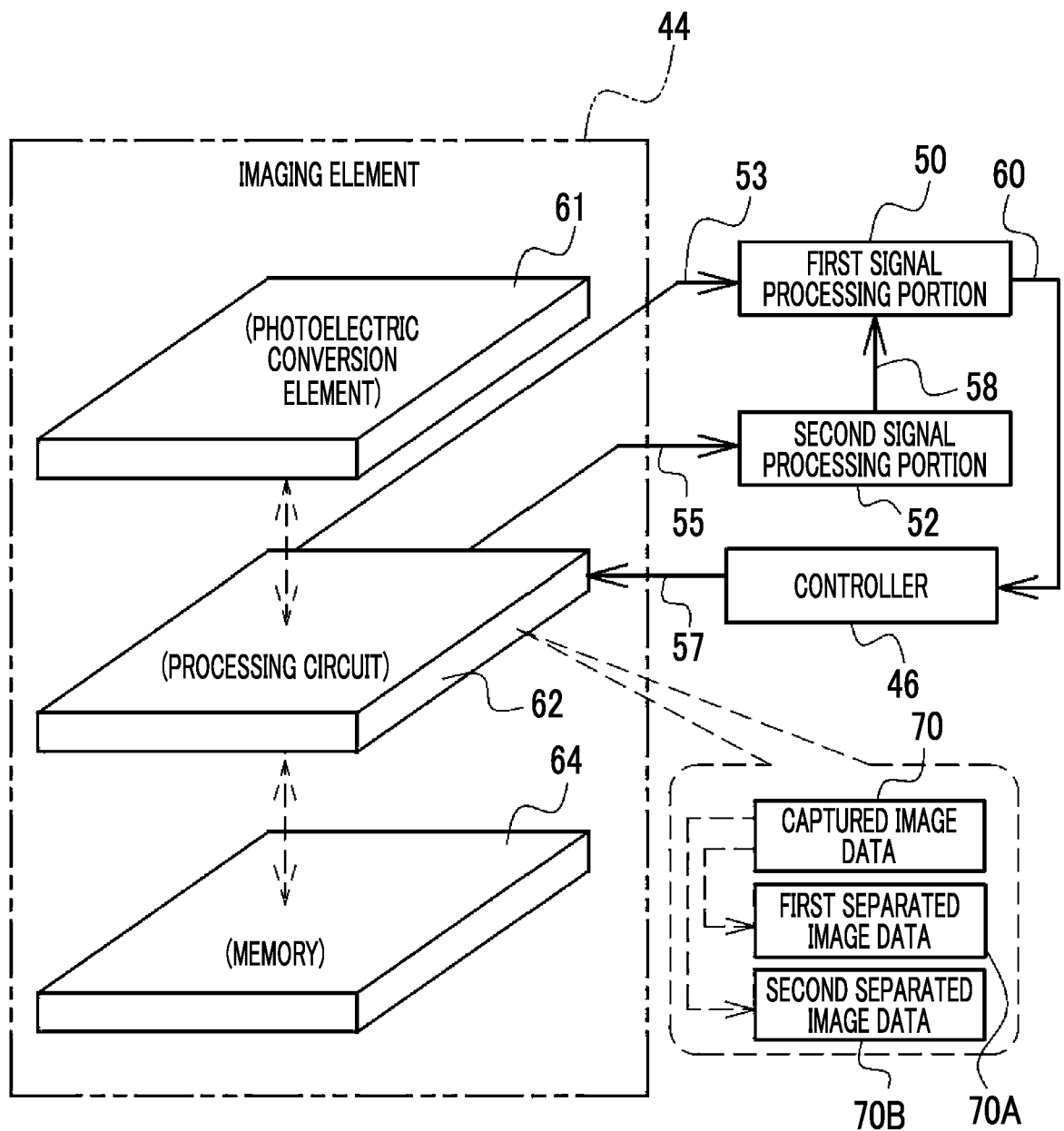
FIG. 4 is a schematic configuration diagram illustrating a configuration of an imaging element.

The imaging element 44 is an example of a "laminated imaging element" according to the embodiments of the technology of the present disclosure. For example, the imaging element 44 is a CMOS image sensor. As illustrated in FIG. 4 as an example, the imaging element 44 incorporates the photoelectric conversion element 61, a processing circuit 62, and a memory 64. The imaging element 44 is an imaging element in which the photoelectric conversion element 61, the processing circuit 62, and the memory 64 are formed in one chip. That is, the photoelectric conversion element 61, the processing circuit 62, and the memory 64 are formed in one package. In the imaging element 44, the photoelectric conversion element 61 is laminated with the processing circuit 62 and the memory 64. Specifically, the photoelectric conversion element 61 and the processing circuit 62 are electrically connected to each other by a bump (not illustrated) of copper or the like having conductivity. The processing circuit 62 and the memory 64 are also electrically connected to each other by a bump (not illustrated) of copper or the like having conductivity. The memory 64 is an example of a storage portion according to the embodiments of the technology of the present disclosure.

The processing circuit 62 is, for example, an LSI, and the memory 64 is, for example, a DRAM. However, the technology of the present disclosure is not limited thereto, and an SRAM may be employed as the memory 64 instead of the DRAM.

The processing circuit 62 is implemented by an ASIC and controls the entire imaging element 44 in accordance with an instruction of the controller 46. While an example of implementing the processing circuit 62 by the ASIC is illustrated here, the technology of the present disclosure is not limited thereto. For example, a PLD and/or an FPGA may be employed instead of the ASIC. In addition, the ASIC, the PLD, and/or the FPGA may be employed. In addition, a computer including a CPU, a ROM, and a RAM may be employed. The number of CPUs may be singular or plural. In addition, the processing circuit 62 may be implemented by a combination of a hardware configuration and a software configuration.

The photoelectric conversion element 61 includes a plurality of photodiodes arranged in a matrix form. Photodiodes of "4896×3265" pixels are illustrated as an example of the plurality of photodiodes.

The photoelectric conversion element 61 comprises color filters, and the color filters include a G filter corresponding to green (G) that most contributes to obtaining a brightness signal, an R filter corresponding to red (R), and a B filter corresponding to blue (B). In the present embodiment, the G filter, the R filter, and the B filter are arranged with a predetermined periodicity in each of a row direction (horizontal direction) and a column direction (vertical direction) for the plurality of photodiodes of the photoelectric conversion element 61. Thus, the imaging apparatus 10 can perform processing in accordance with a repeating pattern in a case of performing demosaicing and the like on R, G, and B signals. The demosaicing refers to processing of calculating the entire color information for each pixel from a mosaic image corresponding to color filter arrangement of a single plate color imaging element. For example, in a case of an imaging element consisting of color filters of three colors of R, G, and B, the demosaicing means processing of calculating color information about all of R, G, and B for each pixel from a mosaic image consisting of R, G, and B.

While the CMOS image sensor is illustrated here as the imaging element 44, the technology of the present disclosure is not limited thereto. For example, the technology of the present disclosure is also established in a case where the imaging element 44 is a CCD image sensor.

The imaging element 44 has a so-called electronic shutter function and controls an electric charge accumulation time period of each photodiode in the photoelectric conversion element 61 by performing the electronic shutter function under control of the controller 46. The electric charge accumulation time period refers to a so-called shutter speed.

In the imaging apparatus 10, the imaging for the still picture image and the imaging for the motion picture image are performed using a rolling shutter method. The imaging for the still picture image is implemented by performing the electronic shutter function and operating the mechanical shutter 42 (refer to FIG. 3). The imaging for the motion picture is implemented by performing the electronic shutter function without operating the mechanical shutter 42. While the rolling shutter method is illustrated here, the technology of the present disclosure is not limited thereto. A global shutter method may be applied instead of the rolling shutter method.

The processing circuit 62 reads out the captured image data 70 obtained by imaging the subject by the photoelectric conversion element 61. The captured image data 70 is signal electric charges accumulated in the photoelectric conversion element 61. The processing circuit 62 performs A/D conversion on the captured image data 70 read out from the photoelectric conversion element 61. The processing circuit 62 stores the captured image data 70 obtained by performing the A/D conversion on the captured image data 70 in the memory 64.

The processing circuit 62 acquires the captured image data 70 from the memory 64 and performs various types of processing on the acquired captured image data 70. The "various types of processing" here includes processing of separating the captured image data 70 into the first separated image data 70A and the second separated image data 70B as illustrated in FIG. 4. The processing circuit 62 outputs the first separated image data 70A to the first signal processing portion 50 through the first output line 53, and outputs the second separated image data 70B to the second signal processing portion 52 through the second output line 55.

Figure 5:
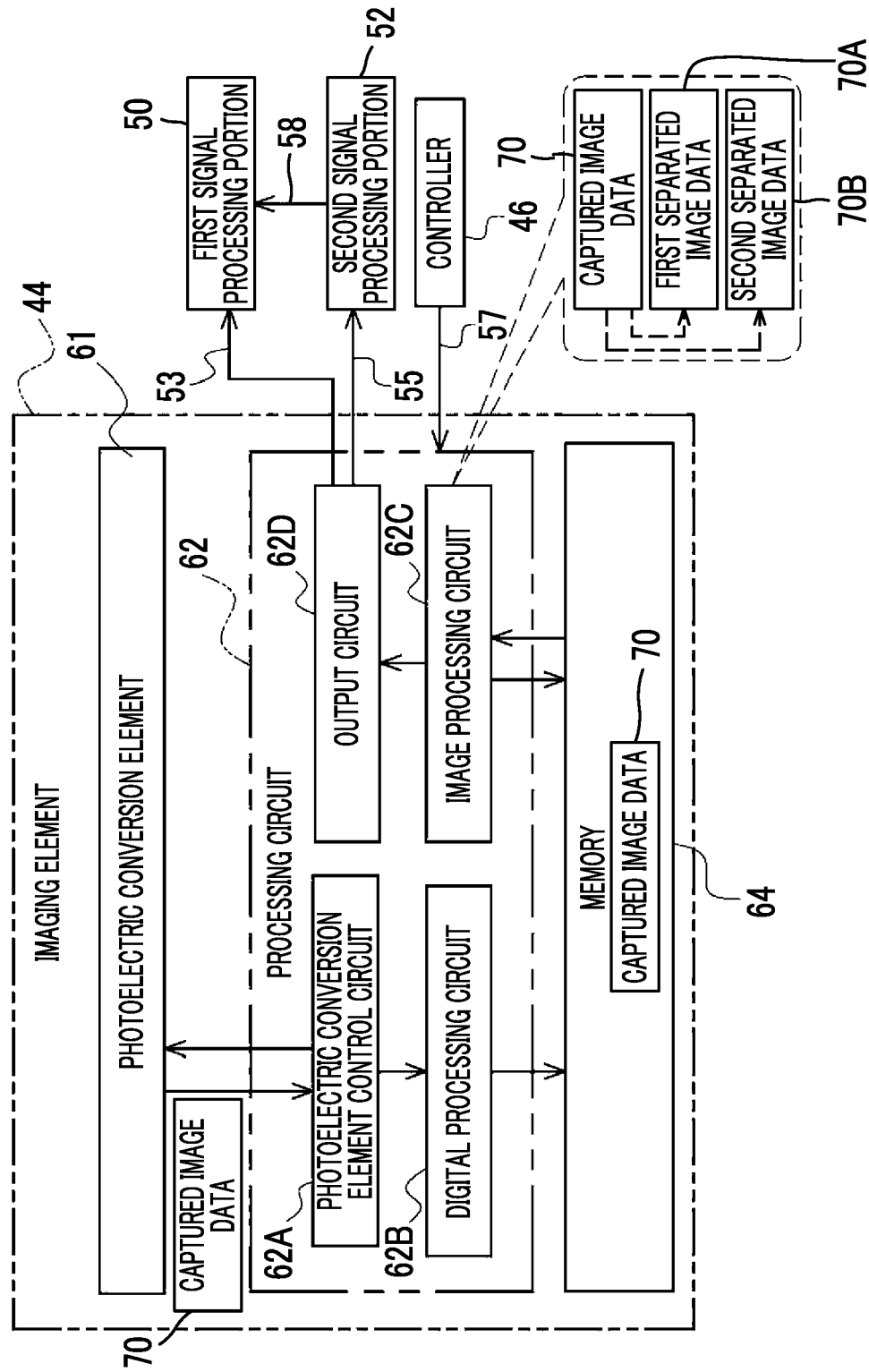
FIG. 5 is a block diagram illustrating the configuration of the imaging element.

As illustrated in FIG. 5 as an example, the processing circuit 62 includes a photoelectric conversion element control circuit 62A, a digital processing circuit 62B, an image processing circuit 62C, and an output circuit 62D. The output circuit 62D is an example of an "output portion" according to the embodiments of the technology of the present disclosure.

The photoelectric conversion element control circuit 62A is connected to the photoelectric conversion element 61 and the digital processing circuit 62B. The memory 64 is connected to the digital processing circuit 62B and the image processing circuit 62C. The image processing circuit 62C is connected to the output circuit 62D and the memory 64.

The output circuit 62D includes the first output line 53 and the second output line 55. The first output line 53 corresponds to the first signal processing portion 50 and connects the output circuit 62D to the first signal processing portion 50. The second output line 55 corresponds to the second signal processing portion 52 and connects the output circuit 62D to the second signal processing portion 52.

The photoelectric conversion element control circuit 62A controls the photoelectric conversion element 61 and reads out the analog captured image data 70 from the photoelectric conversion element 61 under control of the controller 46. The digital processing circuit 62B digitizes the analog captured image data 70 by performing signal processing of correlative double sampling processing and then, the A/D conversion on the analog captured image data 70 read out by the photoelectric conversion element control circuit 62A. The digital processing circuit 62B stores the digitized captured image data 70 in the memory 64.

The memory 64 is a memory that can store the captured image data 70 of a plurality of frames. The memory 64 has a storage region (not illustrated) in units of pixels. The captured image data 70 is stored in a corresponding storage region of the memory 64 in units of pixels by the digital processing circuit 62B.

The image processing circuit 62C acquires the captured image data 70 from the memory 64 and processes the acquired captured image data 70.

The image processing circuit 62C performs the various types of processing on the captured image data 70. The image processing circuit 62C separates the captured image data 70 into the first separated image data 70A and the second separated image data 70B and outputs the first separated image data 70A and the second separated image data 70B (refer to FIG. 3 and FIG. 4) obtained by separation to the output circuit 62D.

The output circuit 62D outputs the first separated image data 70A input from the image processing circuit 62C to the first signal processing portion 50 through the first output line 53. In addition, the output circuit 62D outputs the second separated image data 70B input from the image processing circuit 62C to the second signal processing portion 52 through the second output line 55.

An output frame rate in the output circuit 62D is a frame rate that is the same as a frame rate used in a device in a rear stage of the imaging element 44. The output frame rate is a frame rate required for outputting the first separated image data 70A and the second separated image data 70B by the output circuit 62D and is, for example, 60 frames per second (fps). Meanwhile, an imaging frame rate is a frame rate required for imaging performed by cooperation among the photoelectric conversion element 61, the photoelectric conversion element control circuit 62A, the digital processing circuit 62B, and the memory 64 and is, for example, 120 fps. The "imaging" here refers to processing from a start of exposure of one frame in the photoelectric conversion element 61 to storage of the captured image data 70 of one frame in the memory 64.

Here, specific processing contents in the image processing circuit 62C, the output circuit 62D, the first signal processing portion 50, and the second signal processing portion 52 will be described.

Figure 6:
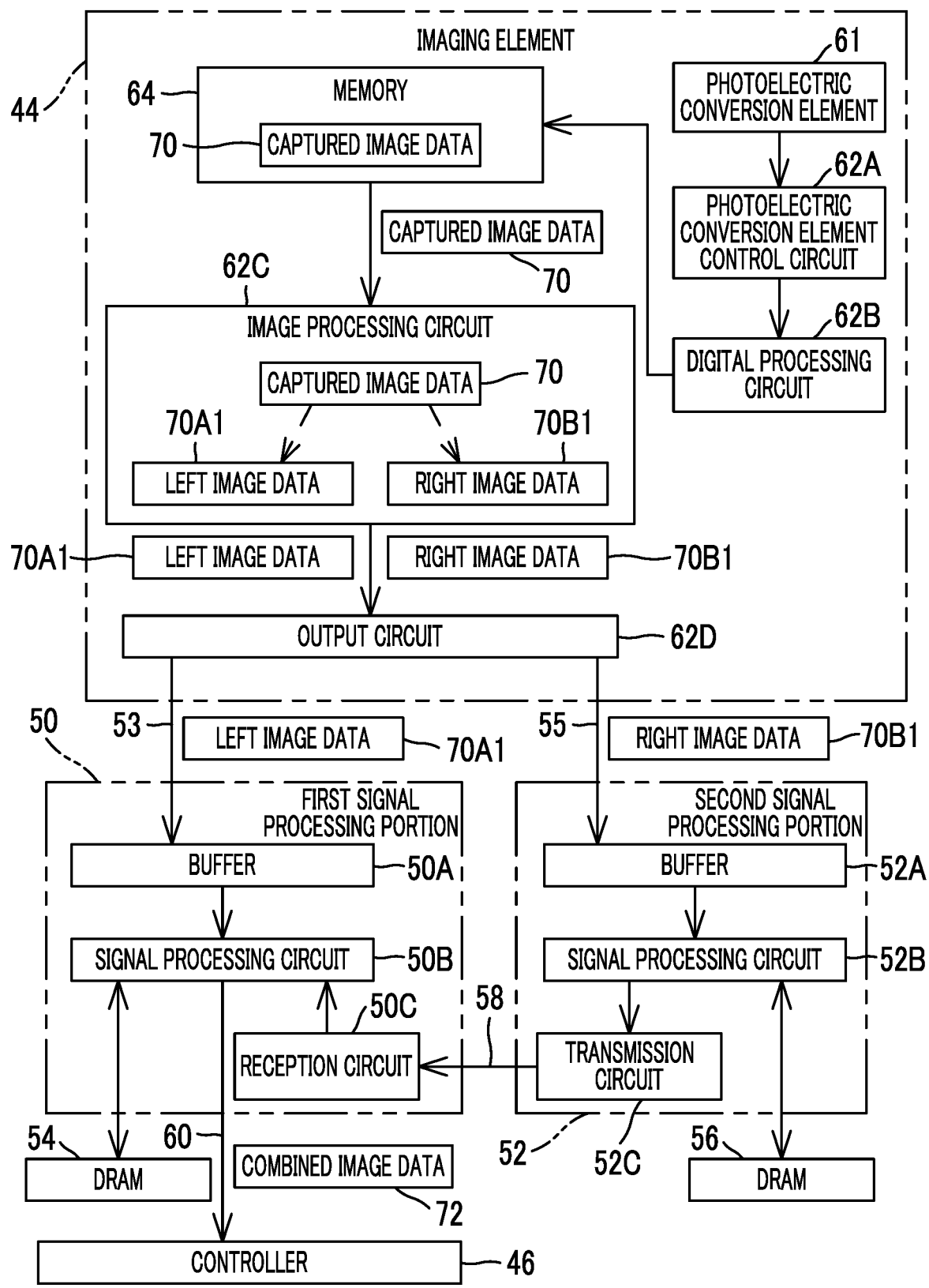
FIG. 6 is a block diagram illustrating a flow of data within an imaging apparatus according to a first embodiment.

As illustrated in FIG. 6 as an example, the image processing circuit 62C acquires the captured image data 70 from the memory 64 and separates the acquired captured image data 70 into left image data 70A1 and right image data 70B1. The image processing circuit 62C outputs the left image data 70A1 and the right image data 70B1, which are obtained by separating the captured image data 70, to the output circuit 62D.

The left image data 70A1 is an example of the first separated image data 70A (refer to FIG. 3 to FIG. 5), and the right image data 70B1 is an example of the second separated image data 70B (refer to FIG. 3 to FIG. 5).

Figure 7:
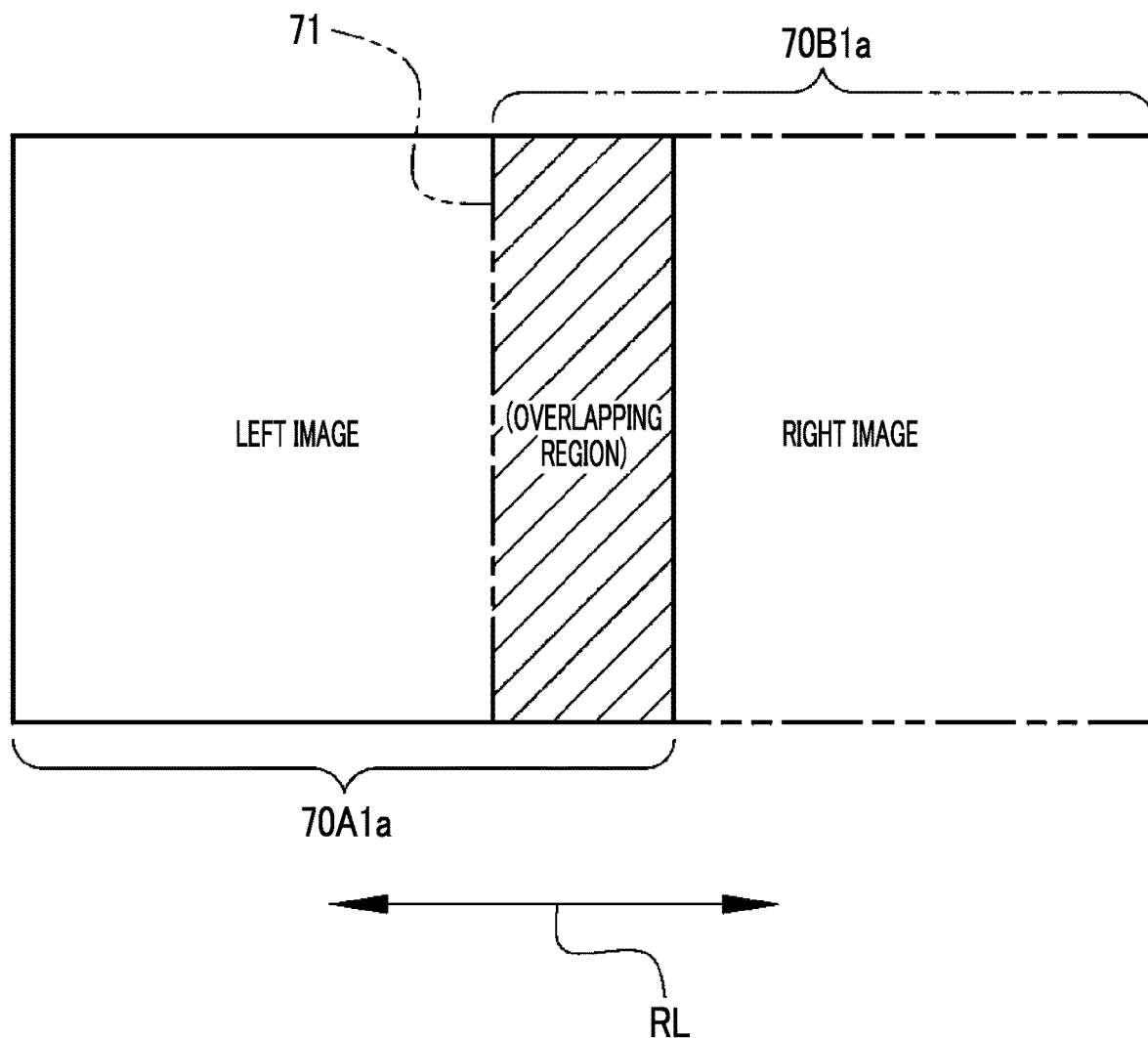
FIG. 7 is a conceptual diagram illustrating features of a left image and a right image included in a captured image.

The left image data 70A1 is image data indicating a left image 70A1a (refer to FIG. 7), and the right image data 70B1 is image data indicating a right image 70B1a (refer to FIG. 7). As illustrated in FIG. 7 as an example, the left image 70A1a and the right image 70B1a are a pair of images adjacent left and right to each other. The left image 70A1a and the right image 70B1a have an overlapping region 71. The overlapping region 71 is a region that overlaps between the left image 70A1a and the right image 70B1a in a left-right direction RL. For example, the number of pixels of the overlapping region 71 in the left-right direction RL is a few tens of pixels to a few hundred pixels.

In the example illustrated in FIG. 6, an example of a form of acquiring the captured image data 70 from the memory 64 and separating the acquired captured image data 70 by the image processing circuit 62C is illustrated. However, the technology of the present disclosure is not limited thereto. In this case, for example, first, the image processing circuit 62C selects the left image data 70A1 and the right image data 70B1 from the captured image data 70 in accordance with a predetermined address in the memory 64. The image processing circuit 62C directly acquires the selected left image data 70A1 and the right image data 70B1 from the memory 64. The predetermined address includes an address for acquiring the left image data 70A1 and an address for acquiring the right image data 70B1. The address for acquiring the left image data 70A1 and the address for acquiring the right image data 70B1 are determined such that image data indicating the overlapping region 71 is also included in each of the left image data 70A1 and the right image data 70B1.

The first signal processing portion 50 includes a buffer 50A, a signal processing circuit 50B, and a reception circuit 50C. The DRAM 54 and the controller 46 are connected to the signal processing circuit 50B. The second signal processing portion 52 includes a buffer 52A, a signal processing circuit 52B, and a transmission circuit 52C. The DRAM 56 is connected to the signal processing circuit 52B.

The output circuit 62D outputs the left image data 70A1 to the buffer 50A through the first output line 53. The buffer 50A holds the left image data 70A1 which is input and outputs the left image data 70A1 to the signal processing circuit 50B using a FIFO method. The signal processing circuit 50B stores the left image data 70A1 input from the buffer 50A in the DRAM 54. The signal processing circuit 50B performs signal processing (hereinafter, referred to as the "specific type of signal processing") such as tone correction, white balance adjustment, sharpness adjustment, gamma correction, and gradation correction on the left image data 70A1 stored in the DRAM 54.

The output circuit 62D outputs the right image data 70B1 to the buffer 52A through the second output line 55. The buffer 52A holds the right image data 70B1 which is input and outputs the right image data 70B1 to the signal processing circuit 52B using the FIFO method. The signal processing circuit 52B stores the right image data 70B1 input from the buffer 52A in the DRAM 56. The signal processing circuit 52B performs the specific type of signal processing on the right image data 70B1 stored in the DRAM 56.

The transmission circuit 52C transmits the right image data 70B1 subjected to the specific type of signal processing by the signal processing circuit 52B to the first signal processing portion 50. In the first signal processing portion 50, the reception circuit 50C receives the right image data 70B1 transmitted from the transmission circuit 52C.

The signal processing circuit 50B generates combined image data 72 by combining the right image data 70B1 received by the reception circuit 50C with the left image data 70A1 subjected to the signal processing. The signal processing circuit 50B outputs the combined image data 72 obtained by combining to the controller 46 through the communication line 60.

The combined image data 72 is generated by joining the left image data 70A1 to the right image data 70B1. Here, an arithmetic mean of image data indicating the overlapping region 71 (refer to FIG. 7) in the left image data 70A1 and image data indicating the overlapping region 71 (refer to FIG. 7) in the right image data 70B1 is calculated. Accordingly, noticeability of a boundary region between two images is suppressed, compared to a case of joining two images obtained by simply dividing a captured image into two parts in the left-right direction RL (refer to FIG. 7). While the arithmetic mean is illustrated here, the technology of the present disclosure is not limited thereto. Substitution may be employed instead of the arithmetic mean. The "substitution" here refers to replacing one of the image data indicating the overlapping region 71 in the left image data 70A1 and the image data indicating the overlapping region 71 in the right image data 70B1 with the other.

As illustrated in FIG. 8 as an example, the controller 46 comprises a CPU 46A, a ROM 46B, a RAM 46C, a connection I/F 46D, and an input I/F 46E. The CPU 46A, the ROM 46B, the RAM 46C, the connection I/F 46D, and the input I/F 46E are connected to each other through a busline 88.

The ROM 46B stores various programs. The CPU 46A reads out the various programs from the ROM 46B and loads the read various programs into the RAM 46C. The CPU 46A controls the entire imaging apparatus 10 in accordance with the various programs loaded in the RAM 46C.

The connection I/F 46D is an FPGA and is connected to the imaging element 44 through the communication line 57. The CPU 46A controls the imaging element 44 through the connection I/F 46D.

The input I/F 46E is a device including an FPGA and is connected to the first signal processing portion 50 through the communication line 60. The combined image data 72 (refer to FIG. 6) is input into the input I/F 46E from the first signal processing portion 50 through the communication line 60. The input I/F 46E transfers the combined image data 72 input from the first signal processing portion 50 to the CPU 46A.

The secondary storage device 80 and an external I/F 82 are connected to the busline 88. The secondary storage device 80 is a non-volatile memory such as an SSD, an HDD, or an EEPROM. The CPU 46A reads out and writes various types of information in the secondary storage device 80.

The external I/F 82 is a device including an FPGA. An external apparatus (not illustrated) such as a USB memory and a memory card is connected to the external I/F 82. The external I/F 82 exchanges various types of information between the CPU 46A and the external apparatus.

The UI system device 48 comprises the hybrid finder 16, the touch panel display 26, and a reception portion 84. The first display 32 and the touch panel 34 are connected to the busline 88. Accordingly, the CPU 46A displays various types of information on the first display 32 and operates in accordance with various instructions received by the touch panel 34.

The reception portion 84 comprises the touch panel 34 and a hard key portion 25. The hard key portion 25 includes a plurality of hard keys and includes a release button 20, a dial 22, and an instruction key 28. The hard key portion 25 is connected to the busline 88, and the CPU 46A operates in accordance with various instructions received by the hard key portion 25.

The hybrid finder 16 comprises the second display 86. The CPU 46A displays various types of information on the second display 86.

Figure 9:
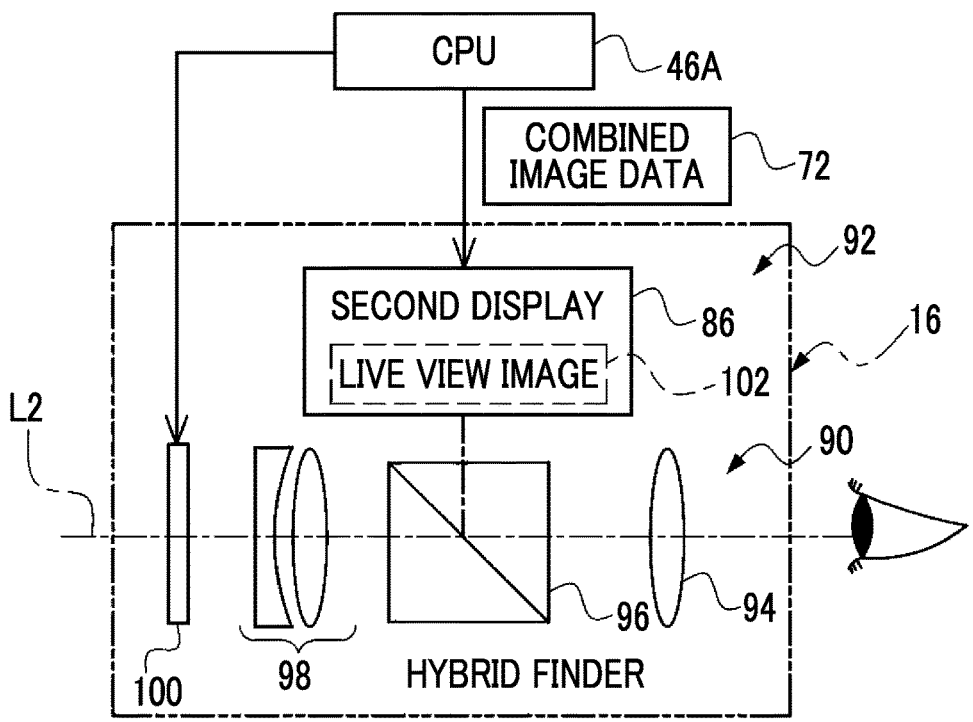
FIG. 9 is a schematic configuration diagram illustrating a configuration of a hybrid finder.

As illustrated in FIG. 9 as an example, the hybrid finder 16 includes an OVF 90 and an EVF 92. The OVF 90 is a reverse Galilean finder and includes an eyepiece lens 94, a prism 96, and an objective lens 98. The EVF 92 includes the second display 86, the prism 96, and the eyepiece lens 94.

A liquid crystal shutter 100 is arranged closer to the subject side than the objective lens 98 along an optical axis L2 of the objective lens 98. The liquid crystal shutter 100 blocks light such that the optical image is not incident on the objective lens 98 in a case of using the EVF 92.

The prism 96 reflects and guides the electronic image or various types of information displayed on the second display 86 to the eyepiece lens 94 and combines the optical image with the electronic image and/or the various types of information displayed on the second display 86. A live view image 102 based on the combined image data 72 is illustrated as the electronic image displayed on the second display 86.

In a case of an OVF mode, the CPU 46A enables the optical image to be visually recognized from the eyepiece lens 94 by controlling the liquid crystal shutter 100 to a non-light blocking state. In addition, in a case of an EVF mode, the CPU 46A enables only the electronic image displayed on the second display 86 to be visually recognized from the eyepiece lens 94 by controlling the liquid crystal shutter 100 to a light blocking state.

Hereinafter, for convenience of description, the first display 32 (refer to FIG. 2 and FIG. 8) and the second display 86 will be referred to as the "display" without a reference sign unless otherwise necessary to distinguish therebetween. The display is an example of a "display portion" according to the embodiments of the technology of the present disclosure. In addition, the CPU 46A is an example of a "control portion (control processor)" according to the embodiments of the technology of the present disclosure.

Next, an action of the imaging apparatus 10 will be described.

Figure 10:
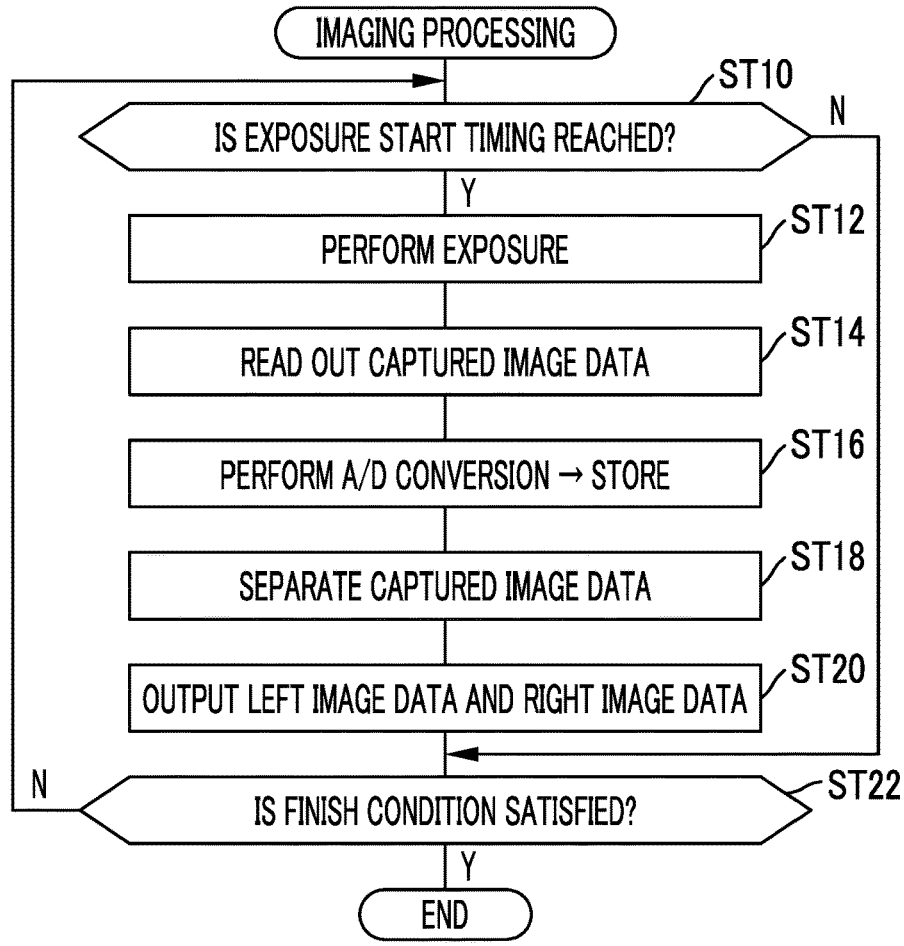
FIG. 10 is a flowchart illustrating a flow of imaging processing according to the first embodiment.

First, a flow of imaging processing executed by the processing circuit 62 of the imaging element 44 will be described with reference to FIG. 10.

In the imaging processing illustrated in FIG. 10, first, in step ST10, the photoelectric conversion element control circuit 62A determines whether or not a timing (hereinafter, referred to as an "exposure start timing") at which the photoelectric conversion element 61 starts the exposure is reached. The exposure start timing is a timing that is periodically defined by the imaging frame rate. In step ST10, in a case where the exposure start timing is not reached, a negative determination is made, and the imaging processing transitions to step ST22. In step ST10, in a case where the exposure start timing is reached, a positive determination is made, and the imaging processing transitions to step ST12.

In step ST12, the photoelectric conversion element control circuit 62A causes the photoelectric conversion element 61 to perform the exposure of one frame.

In subsequent step ST14, the photoelectric conversion element control circuit 62A reads out the captured image data 70 of one frame from the photoelectric conversion element 61.

In subsequent step ST16, the digital processing circuit 62B digitizes the analog captured image data 70 by performing signal processing of the correlative double sampling processing and then, the A/D conversion on the captured image data 70 read out in step ST14. The digital processing circuit 62B stores the digitized captured image data 70 in the memory 64.

In subsequent step ST18, the image processing circuit 62C acquires the captured image data 70 from the memory 64 and separates the acquired captured image data 70 into the left image data 70A1 (refer to FIG. 6) and the right image data 70B1 (refer to FIG. 6). The image processing circuit 62C outputs the left image data 70A1 and the right image data 70B1 to the output circuit 62D.

In subsequent step ST20, the output circuit 62D outputs the left image data 70A1 to the first signal processing portion 50 through the first output line 53 (refer to FIG. 3 to FIG. 6 and FIG. 8). In addition, the output circuit 62D outputs the right image data 70B1 to the second signal processing portion 52 through the second output line 55 (refer to FIG. 3 to FIG. 6 and FIG. 8).

In subsequent step ST22, the processing circuit 62 determines whether or not a condition (hereinafter, referred to as an "imaging processing finish condition") under which the imaging processing is finished is satisfied. For example, a condition that an instruction to finish the imaging processing is received by the reception portion 84 is illustrated as the imaging processing finish condition. In step ST22, in a case where the imaging processing finish condition is not satisfied, a negative determination is made, and the imaging processing transitions to step ST10. In step ST22, in a case where the imaging processing finish condition is satisfied, a positive determination is made, and the imaging processing is finished.

Next, a flow of first signal processing executed by the first signal processing portion 50 will be described with reference to FIG. 11.

Figure 11:
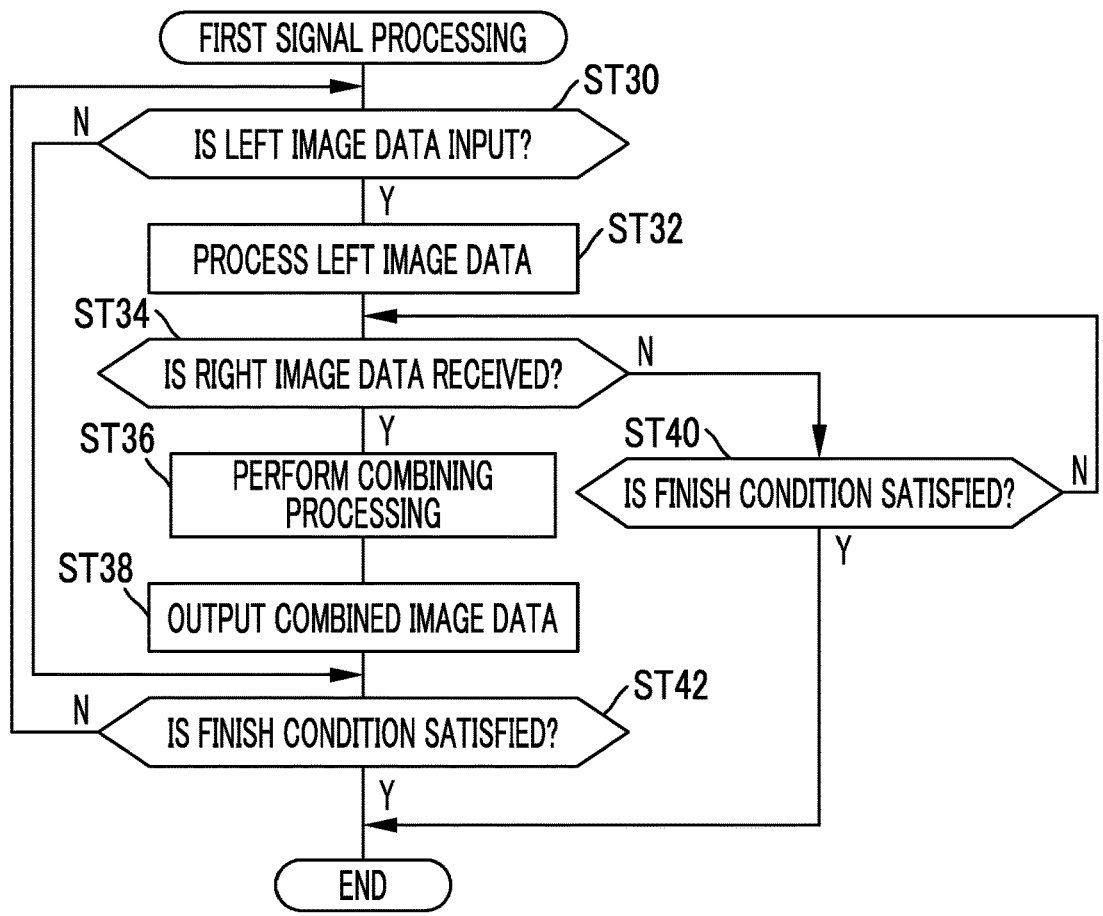
FIG. 11 is a flowchart illustrating a flow of first signal processing according to the first embodiment.

In the first signal processing illustrated in FIG. 11, in step ST30, the first signal processing portion 50 determines whether or not the left image data 70A1 (refer to FIG. 6) is input from the processing circuit 62. In step ST30, in a case where the left image data 70A1 is not input from the processing circuit 62, a negative determination is made, and the first signal processing transitions to step ST42. In step ST30, in a case where the left image data 70A1 is input from the processing circuit 62, a positive determination is made, and the first signal processing transitions to step ST32.

In step ST32, the first signal processing portion 50 performs the specific type of signal processing on the left image data 70A1.

Figure 12:
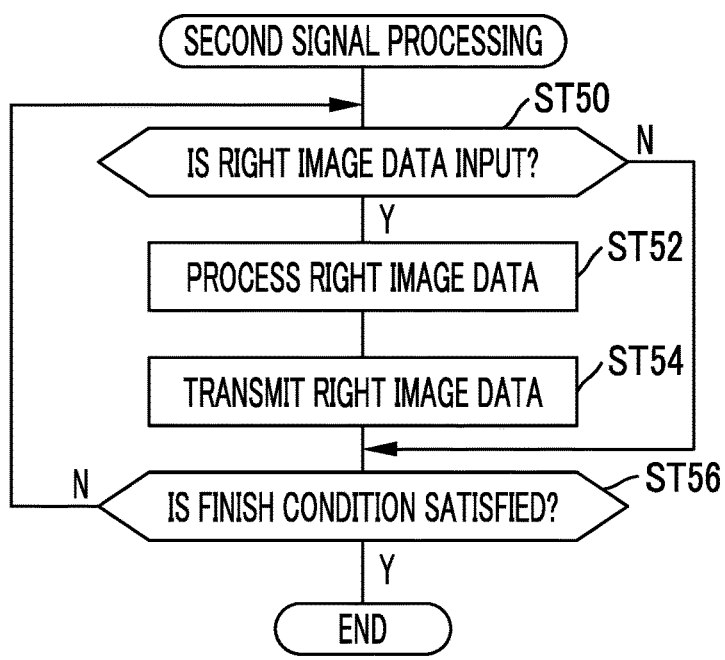
FIG. 12 is a flowchart illustrating a flow of second signal processing according to the first embodiment.

In subsequent step ST34, the first signal processing portion 50 determines whether or not the right image data 70B1 (refer to FIG. 6) transmitted by executing processing of step ST54 of second signal processing illustrated in FIG. 12 is received. In step ST34, in a case where the right image data 70B1 is not received, a negative determination is made, and the first signal processing transitions to step ST40. In step ST34, in a case where the right image data 70B1 is received, a positive determination is made, and the first signal processing transitions to step ST36.

In step ST40, the first signal processing portion 50 determines whether or not a condition (hereinafter, referred to as a "first signal processing finish condition") under which the first signal processing is finished is satisfied. For example, a condition that an instruction to finish the first signal processing is received by the reception portion 84 is illustrated as the first signal processing finish condition. In step ST40, in a case where the first signal processing finish condition is not satisfied, a negative determination is made, and the first signal processing transitions to step ST34. In step ST40, in a case where the first signal processing finish condition is satisfied, a positive determination is made, and the first signal processing is finished.

In step ST36, the first signal processing portion 50 generates the combined image data 72 (refer to FIG. 6) by performing combining processing of combining the left image data 70A1 obtained by executing processing of step ST32 with the right image data 70B1 received in step ST34.

In subsequent step ST38, the first signal processing portion 50 outputs the combined image data 72 obtained by executing processing of step ST36 to the controller 46 (refer to FIG. 6) through the communication line 60 (refer to FIG. 6 and FIG. 8).

In subsequent step ST42, the first signal processing portion 50 determines whether or not the first signal processing finish condition is satisfied. In step ST42, in a case where the first signal processing finish condition is not satisfied, a negative determination is made, and the first signal processing transitions to step ST30. In step ST42, in a case where the first signal processing finish condition is satisfied, a positive determination is made, and the first signal processing is finished.

Next, a flow of second signal processing executed by the second signal processing portion 52 will be described with reference to FIG. 12.

In the second signal processing illustrated in FIG. 12, in step ST50, the second signal processing portion 52 determines whether or not the right image data 70B1 (refer to FIG. 6) is input from the processing circuit 62. In step ST50, in a case where the right image data 70B1 is not input from the processing circuit 62, a negative determination is made, and the second signal processing transitions to step ST56. In step ST50, in a case where the right image data 70B1 is input from the processing circuit 62, a positive determination is made, and the second signal processing transitions to step ST52.

In step ST52, the second signal processing portion 52 performs the specific type of signal processing on the right image data 70B1.

In subsequent step ST54, the second signal processing portion 52 transmits the right image data 70B1 obtained by executing processing of step ST52 to the first signal processing portion 50 through the communication line 58 (refer to FIG. 3 to FIG. 6 and FIG. 8).

In subsequent step ST56, the second signal processing portion 52 determines whether or not a condition (hereinafter, referred to as a "second signal processing finish condition") under which the second signal processing is finished is satisfied. For example, a condition that an instruction to finish the second signal processing is received by the reception portion 84 is illustrated as the second signal processing finish condition. In step ST56, in a case where the second signal processing finish condition is not satisfied, a negative determination is made, and the second signal processing transitions to step ST50. In step ST56, in a case where the second signal processing finish condition is satisfied, a positive determination is made, and the second signal processing is finished.

As described above, the imaging apparatus 10 comprises the imaging element 44, the first signal processing portion 50, and the second signal processing portion 52. In addition, the imaging element 44 comprises the output circuit 62D. The left image data 70A1 is output to the first signal processing portion 50 through the first output line 53 by the output circuit 62D, and the right image data 70B1 is output to the second signal processing portion 52 through the second output line 55 by the output circuit 62D. Each of the left image data 70A1 and the right image data 70B1 subjected to the specific type of signal processing is combined by the first signal processing portion 50, and the combined image data 72 obtained by combining is output to the controller 46.

Thus, a traffic between the imaging element 44 and each of the first signal processing portion 50 and the second signal processing portion 52 is decreased, compared to a case of outputting the captured image data 70 to the first signal processing portion 50 and the second signal processing portion 52 using only one output line.

In addition, a data amount of image data of a target on which each of the first signal processing portion 50 and the second signal processing portion 52 performs the specific type of signal processing is smaller than the captured image data 70. Thus, a load exerted on each of the first signal processing portion 50 and the second signal processing portion 52 in a case of executing the specific type of signal processing is reduced, compared to a case of performing the specific type of signal processing on the entire captured image data 70 by only the first signal processing portion 50 or the second signal processing portion 52.

Accordingly, the imaging apparatus 10 can implement high-speed image processing, compared to a case of outputting image data to a plurality of signal processing portions from the imaging element 44 using only one output line.

In addition, as illustrated in FIG. 7, each of the left image data 70A1 and the right image data 70B1 is image data indicating an image having the overlapping region 71 between the left image 70A1a and the right image 70B1a. In a case where two images obtained by simply dividing the captured image into two parts in the left-right direction RL (refer to FIG. 7) are combined, there is a concern that the boundary region between two images is noticeable. However, as illustrated in FIG. 7, each of the left image 70A1a and the right image 70B1a has the overlapping region 71. Thus, an occurrence of an event such that the boundary region between two images is noticeable can be suppressed, compared to a case of combining two images obtained by simply dividing the captured image into two parts in the left-right direction RL.

In addition, the imaging element 44 is an imaging element in which the photoelectric conversion element 61, the processing circuit 62, and the memory 64 are formed in one chip. Accordingly, portability of the imaging element 44 is increased, compared to an imaging element in which the photoelectric conversion element 61, the processing circuit 62, and the memory 64 are not formed in one chip. In addition, a degree of design freedom can be increased, compared to a case of the imaging element in which the photoelectric conversion element 61, the processing circuit 62, and the memory 64 are not formed in one chip. Furthermore, it is possible to contribute to size reduction of the imaging apparatus main body 12, compared to a case of the imaging element in which the photoelectric conversion element 61, the processing circuit 62, and the memory 64 are not formed in one chip.

In addition, as illustrated in FIG. 4, the laminated imaging element in which the photoelectric conversion element 61 is laminated with the memory 64 is employed as the imaging element 44. Accordingly, a load exerted on processing between the photoelectric conversion element 61 and the memory 64 can be reduced, compared to a case of not laminating the photoelectric conversion element 61 and the memory 64. In addition, the degree of design freedom can be increased, compared to a case of not laminating the photoelectric conversion element 61 and the memory 64. Furthermore, it is possible to contribute to size reduction of the imaging apparatus main body 12, compared to a case of not laminating the photoelectric conversion element 61 and the memory 64.

In addition, as illustrated in FIG. 9, an image indicated by the combined image data 72 is displayed as the live view image 102 on the second display 86 under control of the CPU 46A. Accordingly, the user can visually recognize the image indicated by the combined image data 72. While the live view image 102 is displayed on the second display 86 in the example illustrated in FIG. 9, the technology of the present disclosure is not limited thereto. For example, the live view image 102 may be displayed on the first display 32, or the live view image 102 may be displayed on both of the first display 32 and the second display 86.

While an imaging element in which the photoelectric conversion element 61, the processing circuit 62, and the memory 64 are formed in one chip is illustrated as the imaging element 44 in the first embodiment, the technology of the present disclosure is not limited thereto. For example, at least the photoelectric conversion element 61 and the memory 64 among the photoelectric conversion element 61, the processing circuit 62, and the memory 64 may be formed in one chip.

While an example of a form of separating the captured image data 70 into the left image data 70A1 and the right image data 70B1 is illustratively described in the first embodiment, the technology of the present disclosure is not limited thereto. For example, the captured image data 70 may be separated into upper image data indicating an image of an upper region of the captured image and lower image data indicating an image of a lower region of the captured image. In addition, the captured image data 70 may be separated into upper left image data indicating an image of an upper left region of the captured image and lower right image data indicating an image of a lower right region of the captured image. In addition, the captured image data 70 may be separated into upper right image data indicating an image of an upper right region of the captured image and lower left image data indicating an image of a lower left region of the captured image. Furthermore, the captured image data 70 may be separated into center image data indicating an image of a center region of the captured image and a peripheral region of the captured image, that is, peripheral image data indicating an image of a region other than the center region.

Even in a case of separating the captured image data 70 in such a manner, it is preferable that each of a pair of pieces of image data obtained by separating the captured image data 70 is image data including overlapping image data indicating an image overlapping in a separation direction between two images into which the captured image is separated.

Second Embodiment

While a case of performing the same signal processing on each of the first separated image data 70A and the second separated image data 70B is described in the first embodiment, a case of performing signal processing on the first separated image data 70A and the second separated image data 70B in a discriminatory manner will be described in a second embodiment. In the second embodiment, the same constituents as the first embodiment will be designated by the same reference signs and will not be described. Hereinafter, parts different from the first embodiment will be described.

As illustrated in FIG. 1, an imaging apparatus 200 according to the second embodiment is different from the imaging apparatus 10 described in the first embodiment in that an imaging apparatus main body 212 is included instead of the imaging apparatus main body 12.

The imaging apparatus main body 212 is different from the imaging apparatus main body 12 in that an imaging element 244 (refer to FIG. 13) is included instead of the imaging element 44. In addition, the imaging apparatus main body 212 is different from the imaging apparatus main body 12 in that a first signal processing portion 250 (refer to FIG. 13) is included instead of the first signal processing portion 50, and that a second signal processing portion 252 (refer to FIG. 13) is included instead of the second signal processing portion 52.

Figure 13:
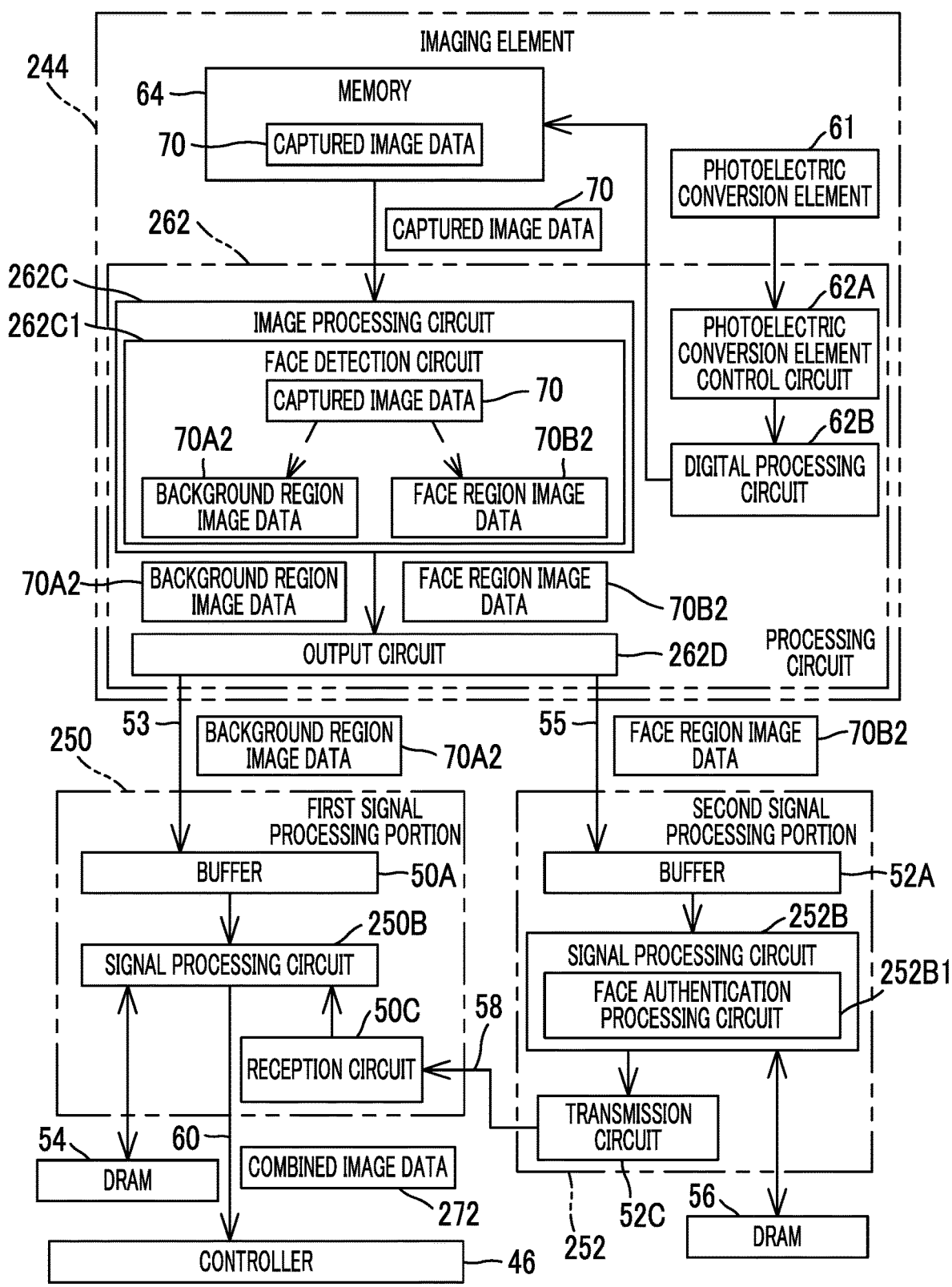
FIG. 13 is a block diagram illustrating a flow of data within an imaging apparatus according to a second embodiment.

As illustrated in FIG. 13, the imaging element 244 is different from the imaging element 44 in that a processing circuit 262 is included instead of the processing circuit 62. The processing circuit 262 is different from the processing circuit 62 in that an image processing circuit 262C is included instead of the image processing circuit 62C, and that an output circuit 262D is included instead of the output circuit 62D.

The image processing circuit 262C is different from the image processing circuit 62C in that a face detection circuit 262C1 is included. The face detection circuit 262C1 is an example of a "detection portion (detection processor)" according to the embodiments of the technology of the present disclosure. The face detection circuit 262C1 is a circuit having a well-known face detection function. The face detection circuit 262C1 is implemented by a hardware configuration based on an ASIC or the like. The face detection circuit 262C1 is not limited to the hardware configuration, and may be implemented by a software configuration or may be implemented by the software configuration and the hardware configuration. In the second embodiment, the face detection circuit 262C1 acquires the captured image data 70 from the memory 64. The face detection circuit 262C1 specifies a face image 69 (refer to FIG. 14A) indicating a face of a person in the captured image indicated by the acquired captured image data 70.

That is, the face detection circuit 262C1 detects face image data indicating the face image 69 from the captured image data 70.

The face detection circuit 262C1 separates the captured image data 70 into face region image data 70B2 and background region image data 70A2 by extracting the face region image data 70B2 indicating a face region image 70B2a (refer to FIG. 14A) within a predetermined range including the specified face image 69 from the captured image data 70.

The background region image data 70A2 refers to an image of a background region of the captured image, that is, image data indicating an image other than the face region image 70B2a. In addition, for example, the predetermined range refers to a range that is determined in accordance with a position of the face image 69 (refer to FIG. 14A) in the captured image and a degree of difference between a size of the face image 69 and a size of an image other than the face image 69 of the captured image. In the example illustrated in FIG. 14A, the face image 69 is positioned in the center region of the captured image. In this case, the captured image is separated into three regions including the center region, the upper region, and the lower region. The image of the center region is specified as the face region image 70B2a, and the image of the upper region and the image of the lower region, that is, the image other than the center region of the captured image, are specified as the background region image 70A2a.

Figure 14A:
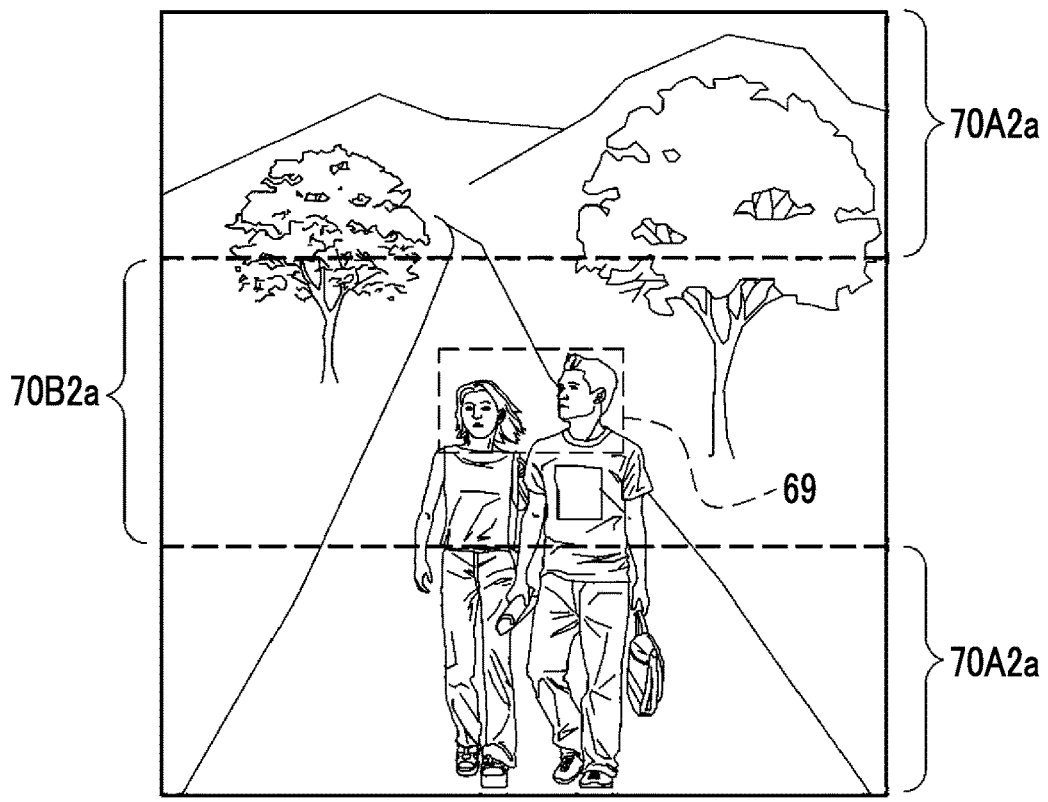
FIG. 14A is an image diagram illustrating a relationship between a face region image and a background region image.

In the example illustrated in FIG. 14A, an image showing faces of two persons is illustrated as the face image 69. The face image 69 is an image for specifying a region having the highest density of faces of a plurality of persons in the captured image. The technology of the present disclosure is not limited thereto. For example, instead of the face image 69, a face image showing a face of one person may be applied, a face image showing a face of a specific facial expression (for example, a smiling face) may be applied, or a face image showing a face of a specific person may be applied.

As illustrated in FIG. 13, the background region image data 70A2 and the face region image data 70B2 are output to the output circuit 262D by the image processing circuit 262C. The background region image data 70A2 is an example of the first separated image data 70A, and the face region image data 70B2 is an example of the second separated image data 70B. In addition, the face region image 70B2a is an example of a "designated image" according to the embodiments of the technology of the present disclosure, and the background region image 70A2a is an example of an "image different from the designated image" according to the embodiments of the technology of the present disclosure.

The output circuit 262D is different from the output circuit 62D in that the background region image data 70A2 is output instead of the left image data 70A1, and that the face region image data 70B2 is output instead of the right image data 70B1.

Specifically, the output circuit 262D outputs the background region image data 70A2 to the first signal processing portion 250 through the first output line 53. In addition, the output circuit 262D outputs the face region image data 70B2 to the second signal processing portion 252 through the second output line 55.

The first signal processing portion 250 is different from the first signal processing portion 50 in that a signal processing circuit 250B is included instead of the signal processing circuit 50B.

The background region image data 70A2 output from the output circuit 262D is temporarily held in the buffer 50A and is output to the signal processing circuit 250B from the buffer 50A. The signal processing circuit 250B performs the specific type of signal processing on the background region image data 70A2 input from the buffer 50A.

The second signal processing portion 252 is different from the second signal processing portion 52 in that a second signal processing circuit 252B is included instead of the signal processing circuit 52B. The signal processing circuit 252B is different from the signal processing circuit 52B in that a face authentication processing circuit 252B1 is included.

The face region image data 70B2 output from the output circuit 262D is temporarily held in the buffer 52A and is output to the signal processing circuit 252B from the buffer 52A. The signal processing circuit 252B performs the specific type of signal processing on the face region image data 70B2 input from the buffer 52A. The face authentication processing circuit 252B1 has a well-known face authentication function and executes face authentication on the face region image data 70B2 subjected to the specific type of signal processing. By executing the face authentication, for example, a determination as to whether or not the face shown by the face image 69 (refer to FIG. 14A) corresponds to a specific display (for example, a smiling face), and/or a determination as to whether or not the face shown by the face image 69 is a face of a specific person is performed.

The face authentication processing circuit 252B1 outputs the face region image data 70B2 on which the face authentication is executed, to the transmission circuit 52C. Face authentication result information that indicates a result of the face authentication is assigned to the face region image data 70B2 and is used for processing in a rear stage circuit. For example, the "rear stage circuit" here refers to the first signal processing portion 250 and/or the controller 46.

The transmission circuit 52C transmits the face region image data 70B2 input from the face authentication processing circuit 252B1 to the first signal processing portion 250.

In the first signal processing portion 250, the reception circuit 50C receives the face region image data 70B2 transmitted from the transmission circuit 52C. The signal processing circuit 250B generates combined image data 272 by combining the face region image data 70B2 received by the reception circuit 50C with the background region image data 70A2 subjected to the specific type of signal processing by the signal processing circuit 250B. The signal processing circuit 250B outputs the combined image data 272 to the controller 46 through the communication line 60.

Figure 14B:
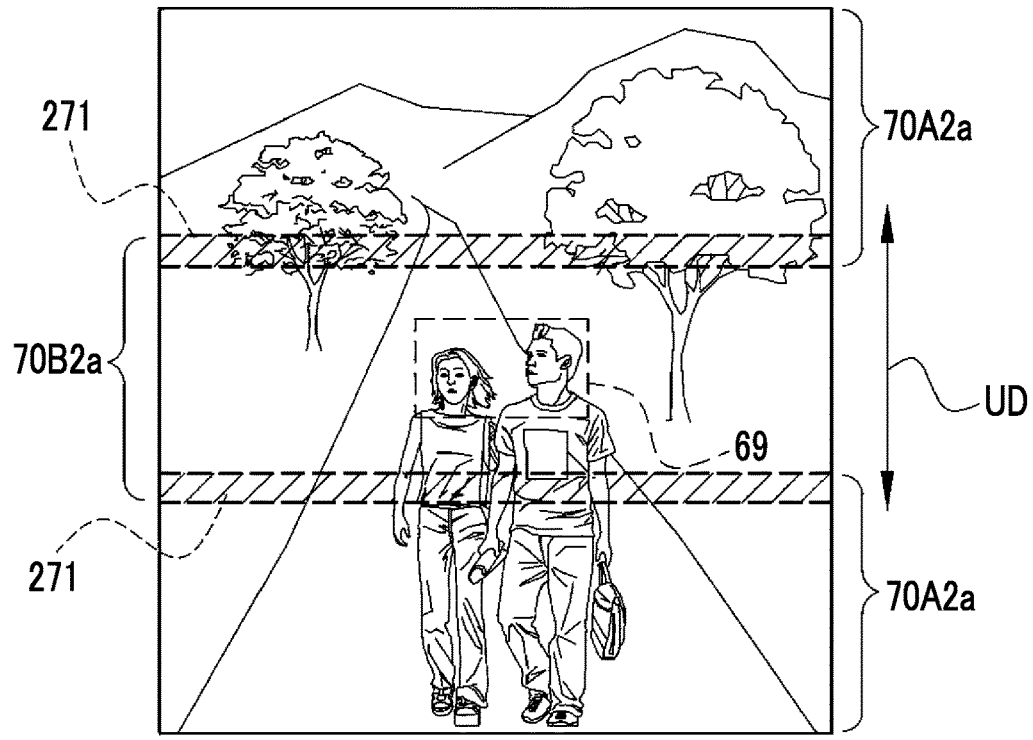
FIG. 14B is an image diagram illustrating a relationship among the face region image, the background region image, and an overlapping region.

As illustrated in FIG. 14B as an example, the background region image 70A2a and the face region image 70B2a may include an overlapping region 271. The overlapping region 271 is a region that overlaps between the background region image 70A2a and the face region image 70B2a in an up-down direction UD. In the same manner as the overlapping region 71 described in the first embodiment, for example, the number of pixels of the overlapping region 271 in the up-down direction UD may be a few tens of pixels to a few hundred pixels. In a case of combining the background region image data 70A2 with the face region image data 70B2 by the first signal processing portion 250, an arithmetic mean of each image data indicating the overlapping region 271 of each of the background region image data 70A2 and the face region image data 70B2 is calculated in the same manner as the first embodiment.

Next, an action of the imaging apparatus 200 will be described.

Figure 15:
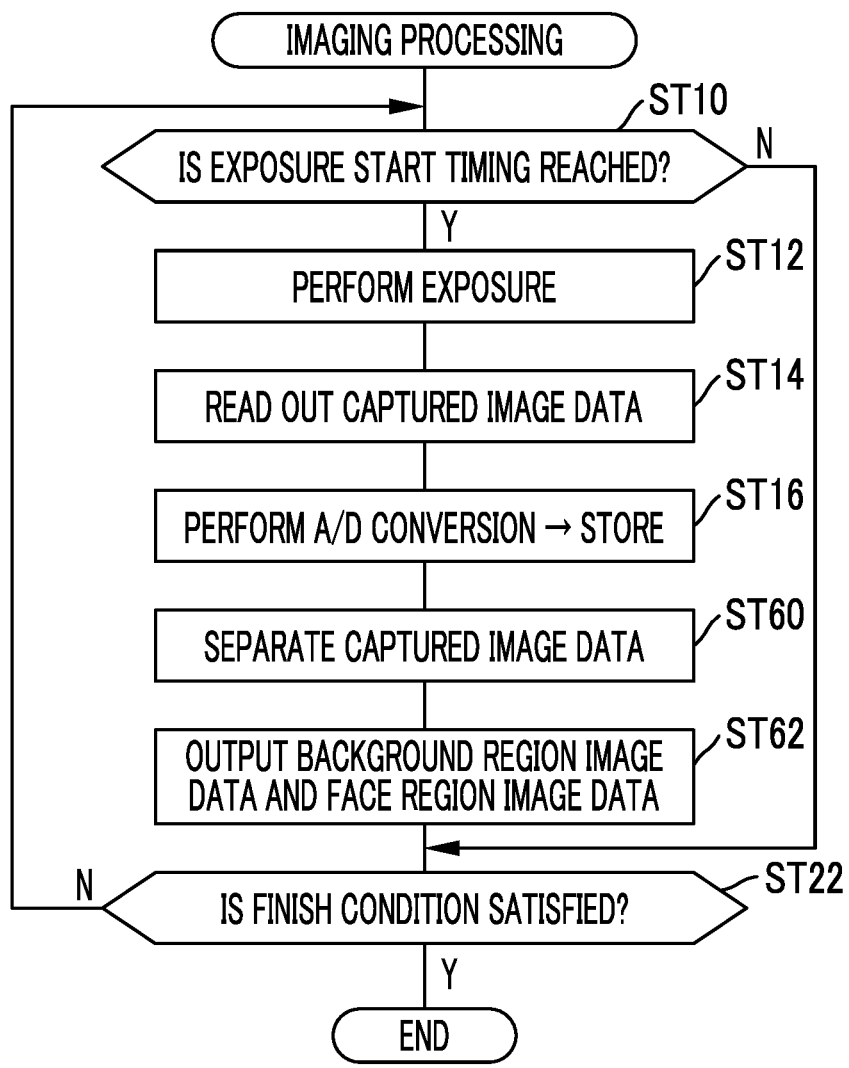
FIG. 15 is a flowchart illustrating a flow of imaging processing according to the second embodiment.

First, a flow of imaging processing executed by the processing circuit 262 of the imaging element 244 will be described with reference to FIG. 15. The imaging processing illustrated in FIG. 15 is different from the imaging processing illustrated in FIG. 10 in that processing of step ST60 is included instead of processing of step ST18, and that step ST62 is included instead of processing of step ST20. Thus, in a flowchart of the imaging processing illustrated in FIG. 15, the same steps as the imaging processing illustrated in FIG. 10 are designated by the same step numbers. Hereinafter, only parts of the imaging processing illustrated in FIG. 15 different from the imaging processing illustrated in FIG. 10 will be described.

In the imaging processing illustrated in FIG. 15, in step ST60, the face detection circuit 262C1 acquires the captured image data 70 from the memory 64 and separates the acquired captured image data 70 into the background region image data 70A2 and the face region image data 70B2. The image processing circuit 262C outputs the background region image data 70A2 and the face region image data 70B2 to the output circuit 262D.

In subsequent step ST62, the output circuit 262D outputs the background region image data 70A2 to the first signal processing portion 250 through the first output line 53. In addition, the output circuit 262D outputs the face region image data 70B2 to the second signal processing portion 252 through the second output line 55.

Next, a flow of first signal processing executed by the first signal processing portion 250 will be described with reference to FIG. 16.

Figure 16:
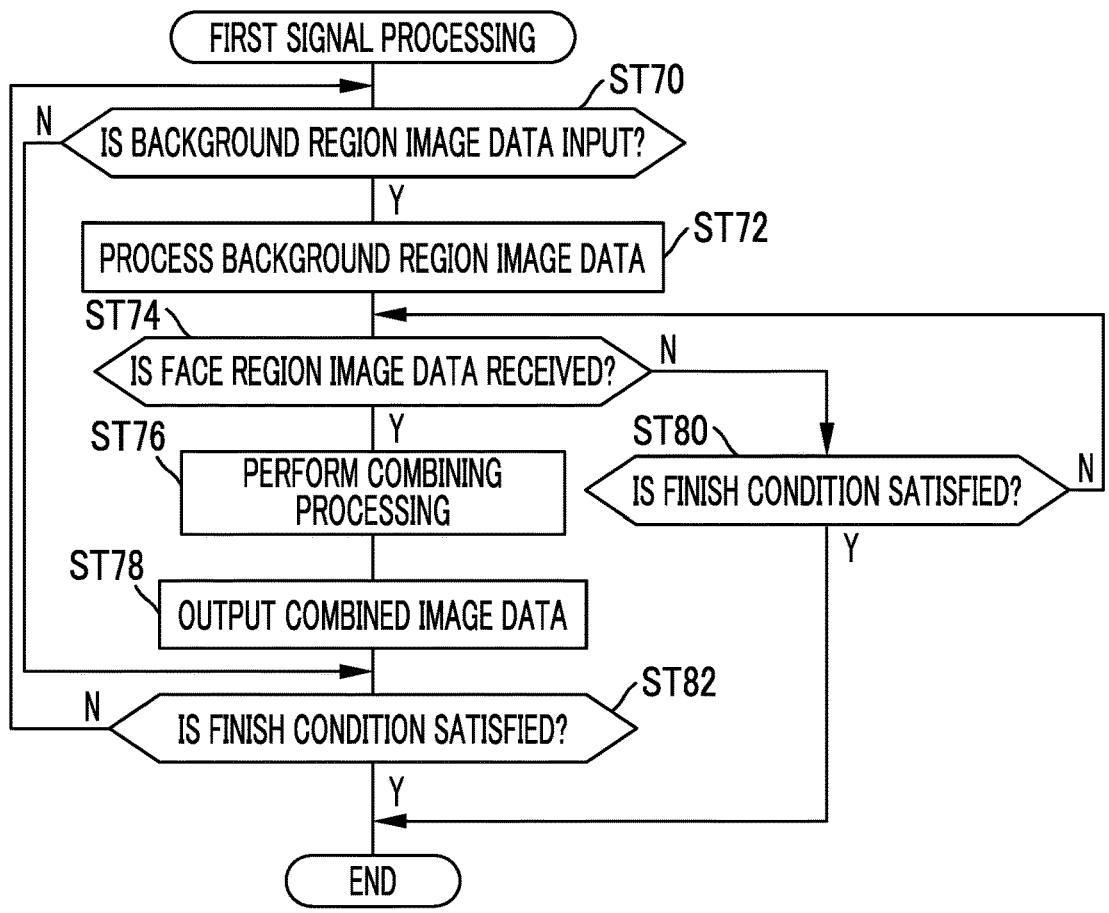
FIG. 16 is a flowchart illustrating a flow of first signal processing according to the second embodiment.

In the first signal processing illustrated in FIG. 16, in step ST70, the first signal processing portion 250 determines whether or not the background region image data 70A2 (refer to FIG. 13) is input from the processing circuit 262. In step ST70, in a case where the background region image data 70A2 is not input from the processing circuit 262, a negative determination is made, and the first signal processing transitions to step ST82. In step ST70, in a case where the background region image data 70A2 is input from the processing circuit 262, a positive determination is made, and the first signal processing transitions to step ST72.

In step ST72, the first signal processing portion 250 performs the specific type of signal processing on the background region image data 70A2.

Figure 17:
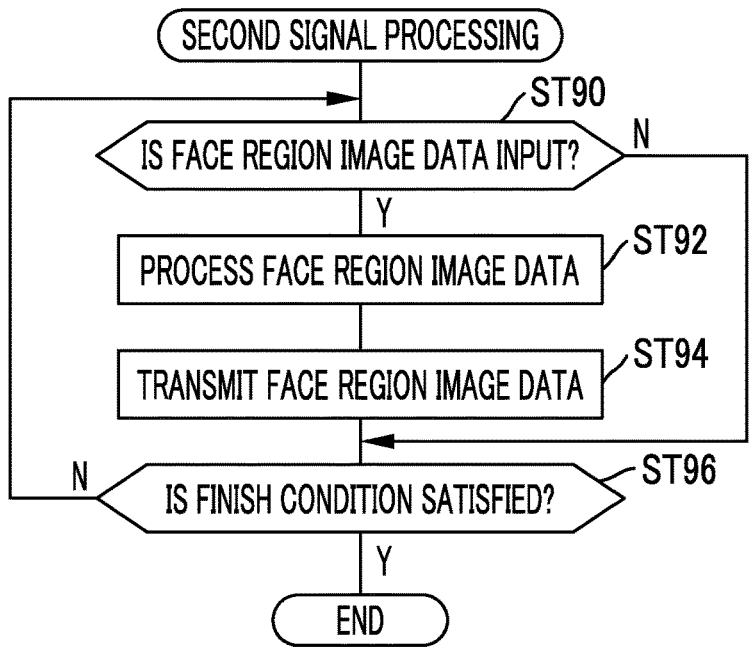
FIG. 17 is a flowchart illustrating a flow of second signal processing according to the second embodiment.

In subsequent step ST74, the first signal processing portion 250 determines whether or not the face region image data 70B2 (refer to FIG. 13) transmitted by executing processing of step ST94 of second signal processing illustrated in FIG. 17 is received. In step ST74, in a case where the face region image data 70B2 is not received, a negative determination is made, and the first signal processing transitions to step ST80. In step ST74, in a case where the face region image data 70B2 is received, a positive determination is made, and the first signal processing transitions to step ST76.

In step ST80, the first signal processing portion 250 determines whether or not the first signal processing finish condition is satisfied. In step ST80, in a case where the first signal processing finish condition is not satisfied, a negative determination is made, and the first signal processing transitions to step ST74. In step ST80, in a case where the first signal processing finish condition is satisfied, a positive determination is made, and the first signal processing is finished.

In step ST76, the first signal processing portion 250 generates the combined image data 272 (refer to FIG. 13) by performing the combining processing of combining the background region image data 70A2 obtained by executing processing of step ST72 with the face region image data 70B2 received in step ST74.

In subsequent step ST78, the first signal processing portion 250 outputs the combined image data 272 obtained by executing processing of step ST76 to the controller 46 (refer to FIG. 13) through the communication line 60 (refer to FIG. 13).

In subsequent step ST82, the first signal processing portion 250 determines whether or not the first signal processing finish condition is satisfied. In step ST82, in a case where the first signal processing finish condition is not satisfied, a negative determination is made, and the first signal processing transitions to step ST70. In step ST82, in a case where the first signal processing finish condition is satisfied, a positive determination is made, and the first signal processing is finished.

Next, a flow of second signal processing executed by the second signal processing portion 252 will be described with reference to FIG. 17.

In the second signal processing illustrated in FIG. 17, in step ST90, the second signal processing portion 252 determines whether or not the face region image data 70B2 (refer to FIG. 13) is input from the processing circuit 262. In step ST90, in a case where the face region image data 70B2 is not input from the processing circuit 262, a negative determination is made, and the second signal processing transitions to step ST96. In step ST90, in a case where the face region image data 70B2 is input from the processing circuit 262, a positive determination is made, and the second signal processing transitions to step ST92.

In step ST92, the second signal processing portion 252 performs the specific type of signal processing on the face region image data 70B2. In addition, the second signal processing portion 252 executes the face authentication on the face region image data 70B2 subjected to the specific type of signal processing.

In subsequent step ST94, the second signal processing portion 252 transmits the face region image data 70B2 obtained by executing processing of step ST92 to the first signal processing portion 250 through the communication line 58 (refer to FIG. 13). The face authentication result information is assigned to the face region image data 70B2 obtained by executing processing of step ST92.

In subsequent step ST96, the second signal processing portion 252 determines whether or not the second signal processing finish condition is satisfied. In step ST96, in a case where the second signal processing finish condition is not satisfied, a negative determination is made, and the second signal processing transitions to step ST90. In step ST96, in a case where the second signal processing finish condition is satisfied, a positive determination is made, and the second signal processing is finished.

As described above, in the imaging apparatus 200, the captured image data 70 is separated into the background region image data 70A2 and the face region image data 70B2. The background region image data 70A2 is output to the first signal processing portion 250 through the first output line 53, and the face region image data 70B2 is output to the second signal processing portion 252 through the second output line 55.

Generally, the face region image data 70B2 is image data that is prioritized over the background region image data 70A2. Thus, in the second signal processing portion 252, more complex processing is performed on the face region image data 70B2 than on the background region image data 70A2. In the second embodiment, the face authentication is executed as the complex processing. The background region image data 70A2 subjected to the specific type of signal processing and the face region image data 70B2 on which the face authentication is executed in addition to the specific type of signal processing are combined by the first signal processing portion 250.

Since the first signal processing portion 250 and the second signal processing portion 252 execute processing of different degrees of complexity, a load required for image processing can be reduced, compared to a case of constantly executing the complex processing on the entire captured image data 70.

In addition, as illustrated in FIG. 14B, each of the background region image 70A2a and the face region image 70B2a adjacent in the up-down direction UD has the overlapping region 271 between the background region image 70A2a and the face region image 70B2a. Accordingly, in the signal processing circuit 250B, the combined image data 272 in which noticeability of a boundary region between the background region image 70A2a and the face region image 70B2a is suppressed, compared to a case of joining two images obtained by simple division into two parts is generated.

While an example of a form of separating the captured image data 70 into the background region image data 70A2 and the face region image data 70B2 is illustratively described in the second embodiment, the technology of the present disclosure is not limited thereto. For example, image data that is designated in the captured image data 70 by the user through the reception portion 84 may be output to the second signal processing portion 252, and the remaining image data of the captured image data 70 may be output to the first signal processing portion 250. For example, the image data designated by the user refers to image data that is defined as important image data in the captured image data 70 in accordance with an instruction received by the reception portion 84. For example, the important image data refers to image data indicating a partial region including an image of a person and/or a building to which the user pays attention.

Even in this case, it is preferable to dispose an overlapping region corresponding to the overlapping region 271 between an image indicated by the image data designated by the user and an image indicated by the remaining image data of the captured image data 70. Accordingly, in the signal processing circuit 250B, combined image data in which noticeability of a boundary region between the image indicated by the designated image data and the image indicated by the remaining image data is suppressed, compared to a case of joining two images by simple division into two parts is generated.

In addition, while the face authentication is illustrated as an example of the complex processing in the second embodiment, the technology of the present disclosure is not limited thereto. For example, pupil detection processing of detecting a pupil of a person, red eye correction processing of correcting a red eye, and/or electronic shake correction processing (for example, EIS) is illustrated as the complex processing.

Third Embodiment

An example of a form of separating the captured image data 70 into the left image data 70A1 and the right image data 70B1 is described in the first embodiment. An example of a form of compressing the captured image data 70 and then, separating the captured image data 70 into two pieces of image data will be described in a third embodiment. In the third embodiment, the same constituents as the first embodiment will be designated by the same reference signs and will not be described. Hereinafter, parts different from the first embodiment will be described.

As illustrated in FIG. 1, an imaging apparatus 300 according to the third embodiment is different from the imaging apparatus 10 described in the first embodiment in that an imaging apparatus main body 312 is included instead of the imaging apparatus main body 12.

The imaging apparatus main body 312 is different from the imaging apparatus main body 12 in that an imaging element 344 (refer to FIG. 18) is included instead of the imaging element 44, and that a first signal processing portion 350 (refer to FIG. 18) is included instead of the first signal processing portion 50. The first signal processing portion 350 is different from the first signal processing portion 50 in that a signal processing circuit 350B is included instead of the signal processing circuit 50B.

Figure 18:
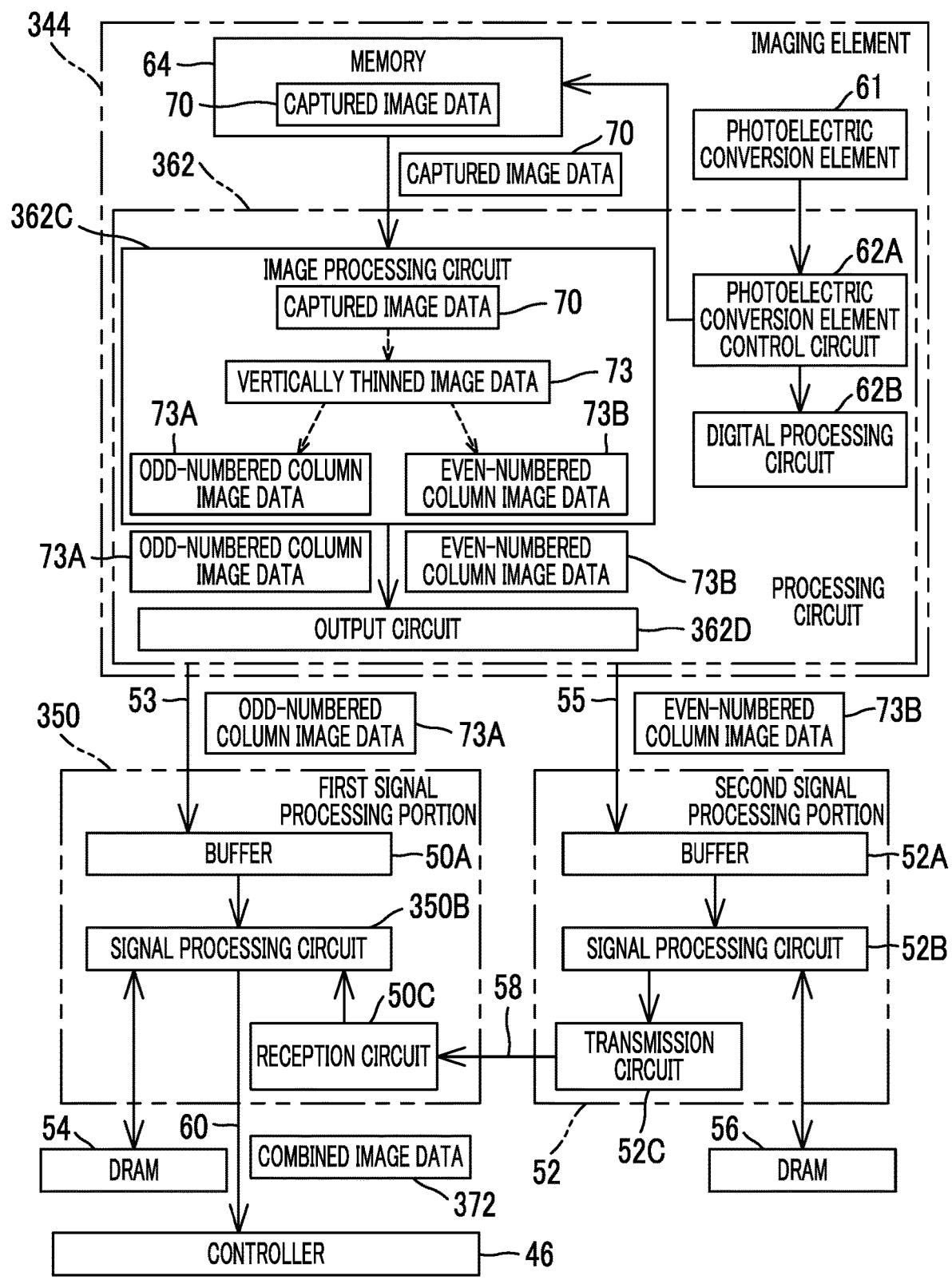
FIG. 18 is a block diagram illustrating a flow of data within an imaging apparatus according to a third embodiment.

As illustrated in FIG. 18, the imaging element 344 is different from the imaging element 44 in that a processing circuit 362 is included instead of the processing circuit 62. The processing circuit 362 is different from the processing circuit 62 in that an image processing circuit 362C is included instead of the image processing circuit 62C, and that an output circuit 362D is included instead of the output circuit 62D.

Figure 19:
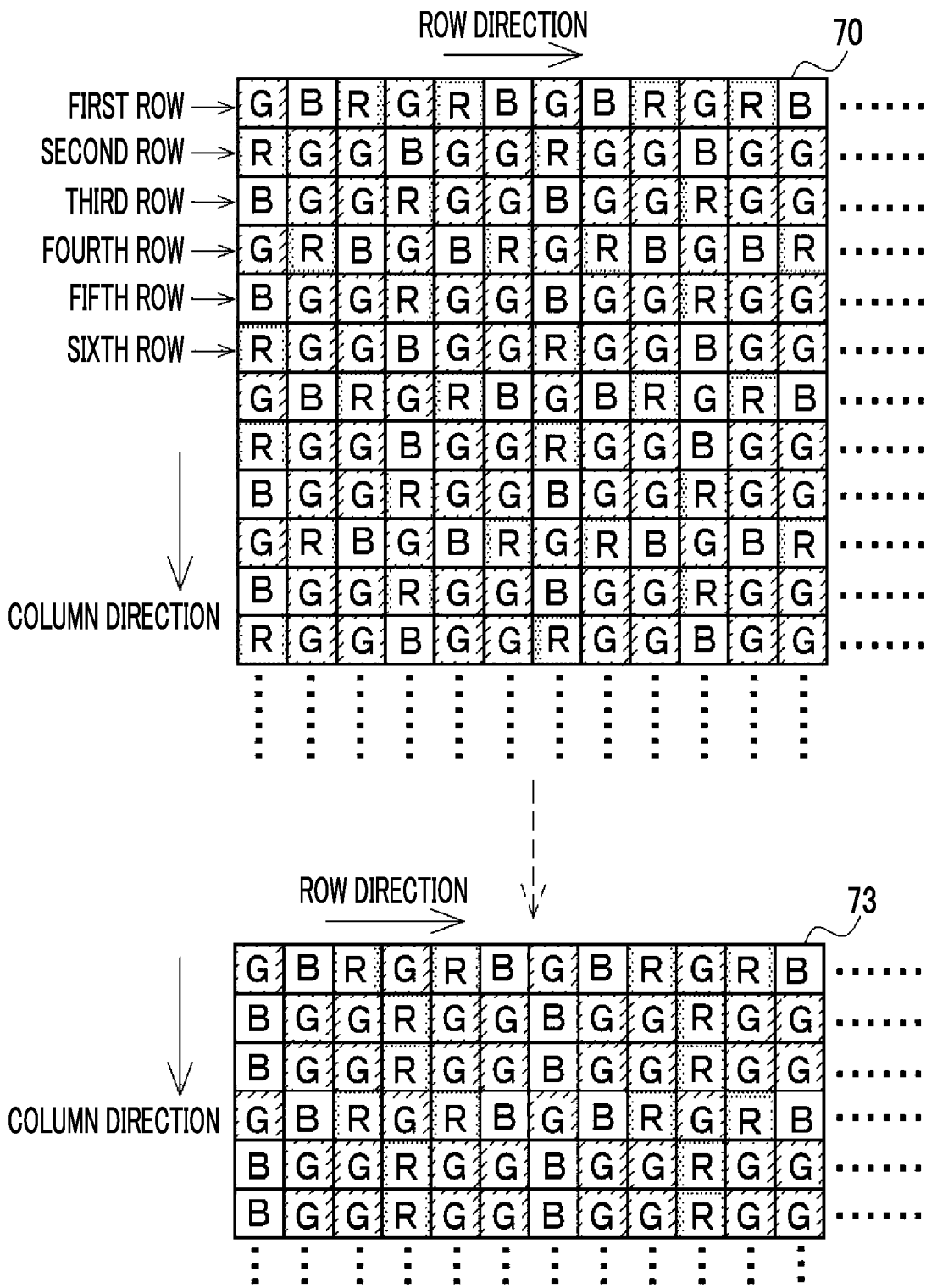
FIG. 19 is a descriptive diagram used for describing a method of generating vertically thinned image data from captured image data.

The image processing circuit 362C acquires the captured image data 70 from the memory 64. The captured image data 70 acquired from the memory 64 by the image processing circuit 362C is color image data in which R pixels, G pixels, and B pixels are periodically arranged. As illustrated in FIG. 19 as an example, in the captured image data 70, the R pixels, the G pixels, and the B pixels are arranged with periodicity corresponding to X-Trans (registered trademark) arrangement. The R pixels, the G pixels, and the B pixels are an example of a "plurality of primary color pixels" according to the embodiments of the technology of the present disclosure.

In the example illustrated in FIG. 19, in a first row, the R pixels, the G pixels, and the B pixels are arranged in circulation in an order of the G pixel, the B pixel, the R pixel, the G pixel, the R pixel, and the B pixel in a row direction. In addition, in a second row, the R pixels, the G pixels, and the B pixels are arranged in circulation in an order of the R pixel, the G pixel, the G pixel, the B pixel, the G pixel, and the G pixel in the row direction. In addition, in a third row, the R pixels, the G pixels, and the B pixels are arranged in circulation in an order of the B pixel, the G pixel, the G pixel, the R pixel, the G pixel, and the G pixel in the row direction. In addition, in a fourth row, the R pixels, the G pixels, and the B pixels are arranged in circulation in an order of the G pixel, the R pixel, the B pixel, the G pixel, the B pixel, and the R pixel in the row direction. In addition, in a fifth row, the R pixels, the G pixels, and the B pixels are arranged in circulation in an order of the B pixel, the G pixel, the G pixel, the R pixel, the G pixel, and the G pixel in the row direction. Furthermore, in a sixth row, the R pixels, the G pixels, and the B pixels are arranged in circulation in an order of the R pixel, the G pixel, the G pixel, the B pixel, the G pixel, and the G pixel in the row direction. An arrangement pattern of the R pixels, the G pixels, and the B pixels of the entire captured image data 70 is formed by repetition of an arrangement pattern of the R pixels, the G pixels, and the B pixels of the first row to the sixth row in units of six rows in a column direction.

The image processing circuit 362C compresses the captured image data 70 acquired from the memory 64. That is, the image processing circuit 362C generates vertically thinned image data 73 from the captured image data 70. The vertically thinned image data 73 is image data obtained by thinning out the captured image data 70 in units of rows. Specifically, as illustrated in FIG. 19 as an example, the vertically thinned image data 73 is image data indicating a vertically ½ thinned image obtained by thinning out pixels of lines of even-numbered rows in the column direction from the captured image indicated by the captured image data 70.

The image processing circuit 362C separates the vertically thinned image data 73 into odd-numbered column image data 73A and even-numbered column image data 73B and outputs the odd-numbered column image data 73A and the even-numbered column image data 73B obtained by separation to the output circuit 362D. While an example of a form of obtaining the odd-numbered column image data 73A and the even-numbered column image data 73B as a plurality of pieces of divided image data by thinning out and then, dividing the captured image data 70 is illustratively described here, the technology of the present disclosure is not limited thereto. For example, the plurality of pieces of divided image data may be obtained by directly dividing the captured image data 70.

Figure 20:
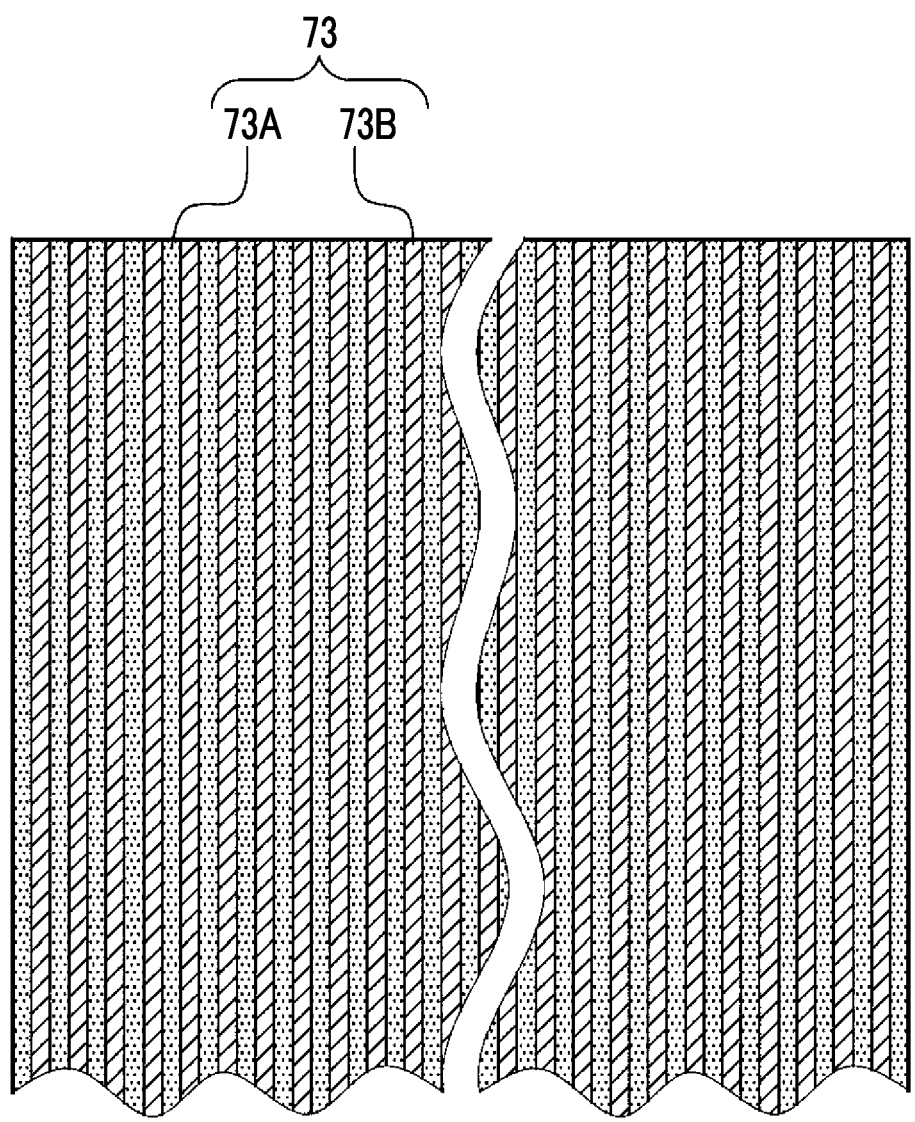
FIG. 20 is a conceptual diagram illustrating a relationship among the vertically thinned image data, odd-numbered column image data, and even-numbered column image data.
Figure 21:
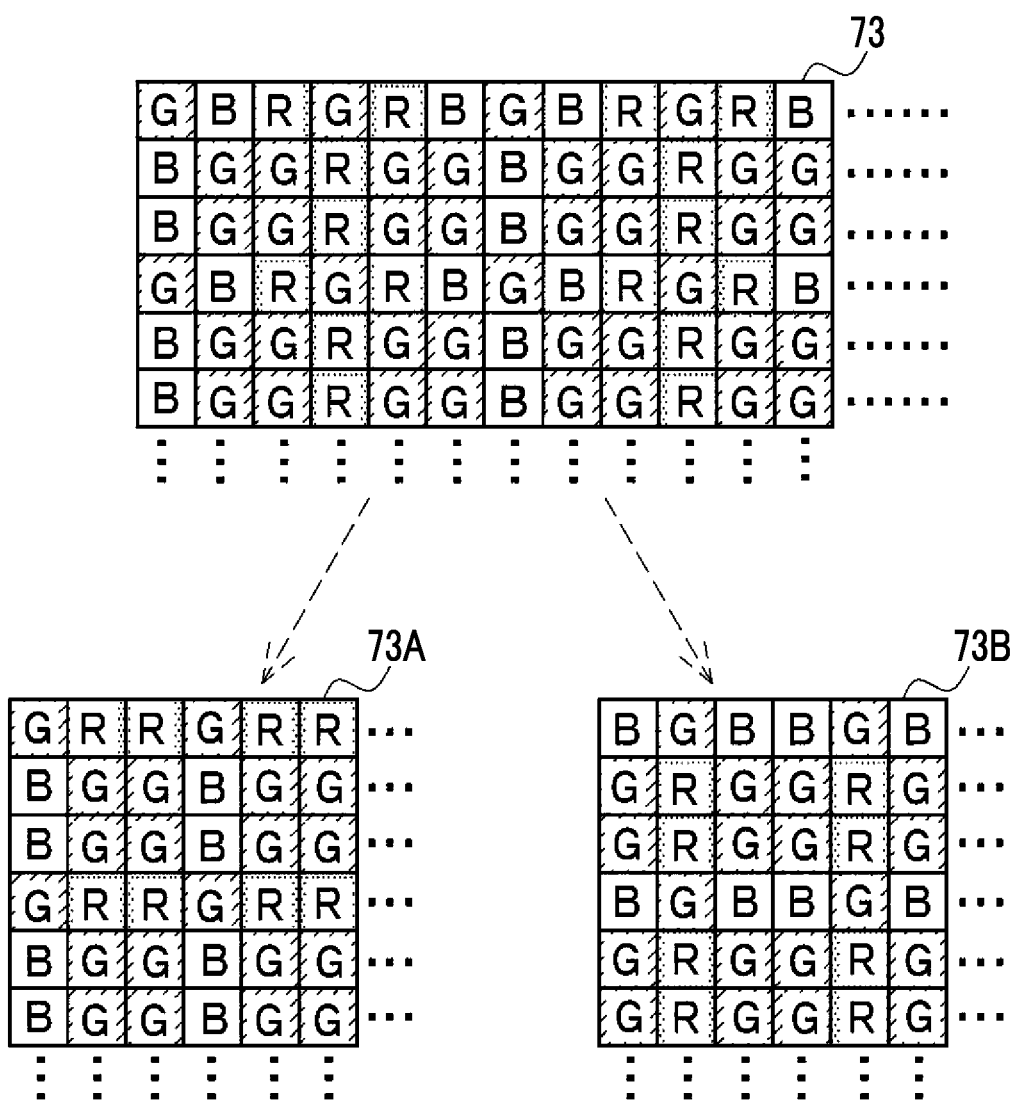
FIG. 21 is a conceptual diagram illustrating an aspect of separating the vertically thinned image data into the odd-numbered column image data and the even-numbered column image data.

As illustrated in FIG. 20 and FIG. 21 as an example, the odd-numbered column image data 73A is image data indicating an odd-numbered column image obtained by thinning out pixels of lines of even-numbered columns from the vertically ½ thinned image indicated by the vertically thinned image data 73. That is, the odd-numbered column image data 73A is image data indicating a set of pixels of odd-numbered columns in the vertically ½ thinned image. In addition, as illustrated in FIG. 20 and FIG. 21 as an example, the even-numbered column image data 73B is image data indicating an even-numbered column image obtained by thinning out pixels of lines of odd-numbered columns from the vertically ½ thinned image indicated by the vertically thinned image data 73. That is, the even-numbered column image data 73B is color image data indicating a set of pixels of even-numbered columns in the vertically ½ thinned image. In other words, each of the odd-numbered column image data 73A and the even-numbered column image data 73B is color image data indicating an image in which each of the R pixels, the G pixels, and the B pixels is periodically arranged. The odd-numbered column image data 73A and the even-numbered column image data 73B are an example of a "plurality of pieces of primary color pixel arrangement image data" and a "plurality of pieces of divided image data" according to the embodiments of the technology of the present disclosure.

The output circuit 362D outputs the odd-numbered column image data 73A input from the image processing circuit 362C to the first signal processing portion 350 through the first output line 53. In addition, the output circuit 362D outputs the even-numbered column image data 73B input from the image processing circuit 362C to the second signal processing portion 52 through the second output line 55.

In the second signal processing portion 52, the same processing as processing performed on the right image data 70B1 described in the first embodiment is performed on the even-numbered column image data 73B, and the even-numbered column image data 73B after processing is transmitted to the first signal processing portion 350.

In the first signal processing portion 350, the reception circuit 50C receives the even-numbered column image data 73B transmitted from the second signal processing portion 52. The signal processing circuit 350B acquires the even-numbered column image data 73B received by the reception circuit 50C.

Meanwhile, the odd-numbered column image data 73A is input into the buffer 50A. The buffer 50A temporarily holds the odd-numbered column image data 73A and outputs the odd-numbered column image data 73A to the signal processing circuit 350B using the FIFO method. The signal processing circuit 350B performs the specific type of signal processing on the odd-numbered column image data 73A input from the buffer 50A. In addition, the signal processing circuit 350B generates combined image data 372 by combining the odd-numbered column image data 73A subjected to the specific type of signal processing with the even-numbered column image data 73B acquired from the reception circuit 50C. Consequently, an arrangement pattern of R pixels, G pixels, and B pixels of an image indicated by the combined image data 372 is the same arrangement pattern as the vertically ½ thinned image. That is, the arrangement pattern of the R pixels, the G pixels, and the B pixels of the image indicated by the combined image data 372 is a periodic arrangement pattern in which the demosaicing can be performed on the R pixels, the G pixels, and the B pixels.

Therefore, the signal processing circuit 350B performs the demosaicing of the R, G, and B signals on the combined image data 372 and outputs the combined image data 372 subjected to the demosaicing to the controller 46 through the communication line 60.

Next, an action of the imaging apparatus 300 will be described.

Figure 22:
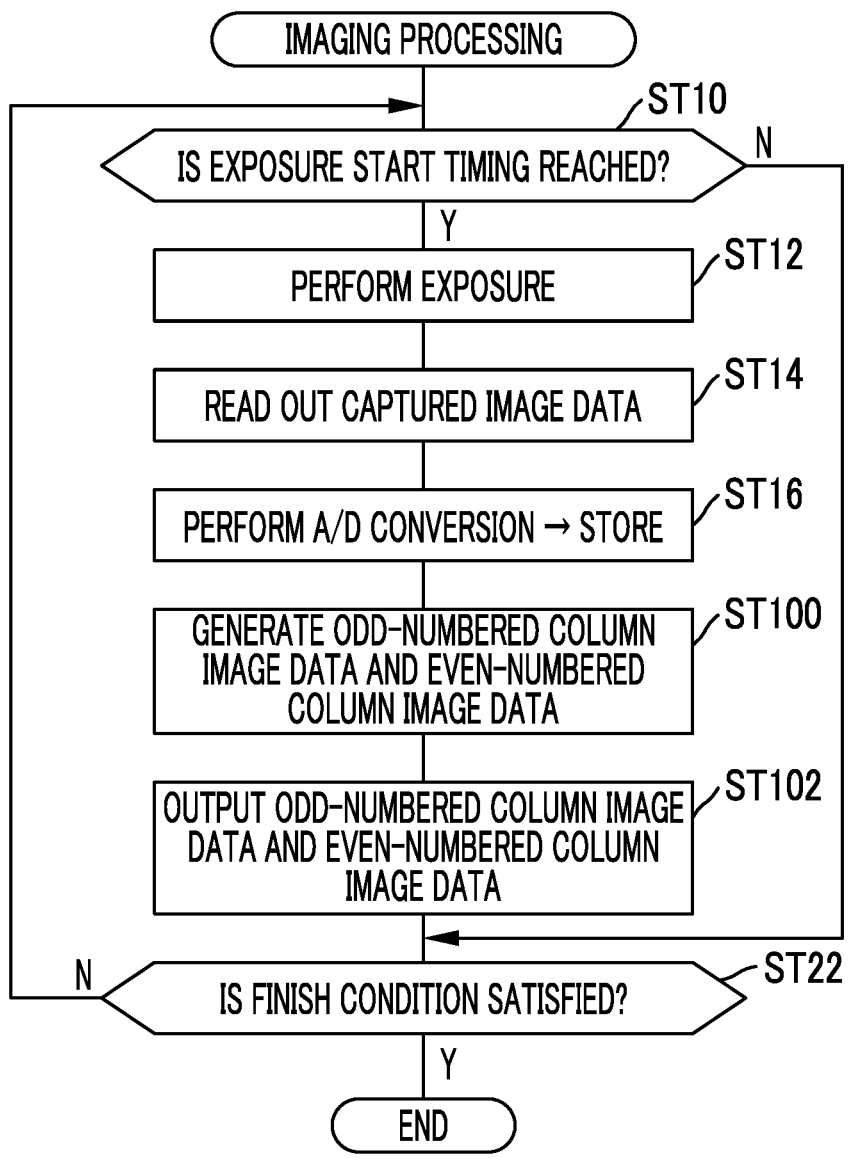
FIG. 22 is a flowchart illustrating a flow of imaging processing according to the third embodiment.

First, a flow of imaging processing executed by the processing circuit 362 of the imaging element 344 will be described with reference to FIG. 22. The imaging processing illustrated in FIG. 22 is different from the imaging processing illustrated in FIG. 10 in that processing of step ST100 is included instead of processing of step ST18, and that step ST102 is included instead of processing of step ST20. Thus, in a flowchart of the imaging processing illustrated in FIG. 22, the same steps as the imaging processing illustrated in FIG. 10 are designated by the same step numbers. Hereinafter, only parts of the imaging processing illustrated in FIG. 22 different from the imaging processing illustrated in FIG. 10 will be described.

In the imaging processing illustrated in FIG. 22, in step ST100, the image processing circuit 362C generates the vertically thinned image data 73 (refer to FIG. 18 to FIG. 21) from the captured image data 70. The image processing circuit 362C generates the odd-numbered column image data 73A and the even-numbered column image data 73B from the generated vertically thinned image data 73. That is, the vertically thinned image data 73 is separated into the odd-numbered column image data 73A and the even-numbered column image data 73B (refer to FIG. 20 and FIG. 21).

In subsequent step ST102, the output circuit 362D outputs the odd-numbered column image data 73A to the first signal processing portion 350 through the first output line 53. In addition, the output circuit 362D outputs the even-numbered column image data 73B to the second signal processing portion 52 through the second output line 55.

Next, a flow of first signal processing executed by the first signal processing portion 350 will be described with reference to FIG. 23.

Figure 23:
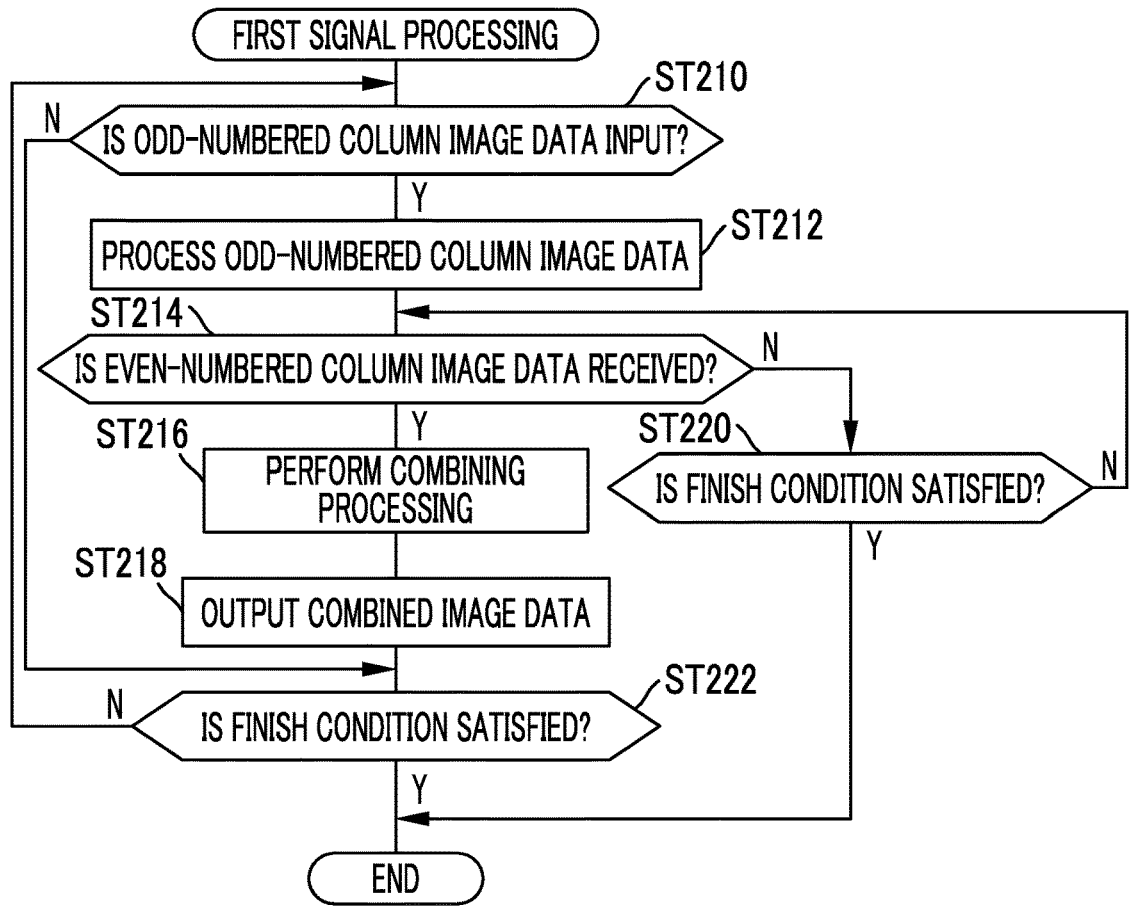
FIG. 23 is a flowchart illustrating a flow of first signal processing according to the third embodiment.

In the first signal processing illustrated in FIG. 23, in step ST210, the first signal processing portion 350 determines whether or not the odd-numbered column image data 73A (refer to FIG. 18) is input from the processing circuit 362. In step ST210, in a case where the odd-numbered column image data 73A is not input from the processing circuit 362, a negative determination is made, and the first signal processing transitions to step ST222. In step ST210, in a case where the odd-numbered column image data 73A is input from the processing circuit 362, a positive determination is made, and the first signal processing transitions to step ST212.

In step ST212, the first signal processing portion 350 performs the specific type of signal processing on the odd-numbered column image data 73A.

Figure 24:
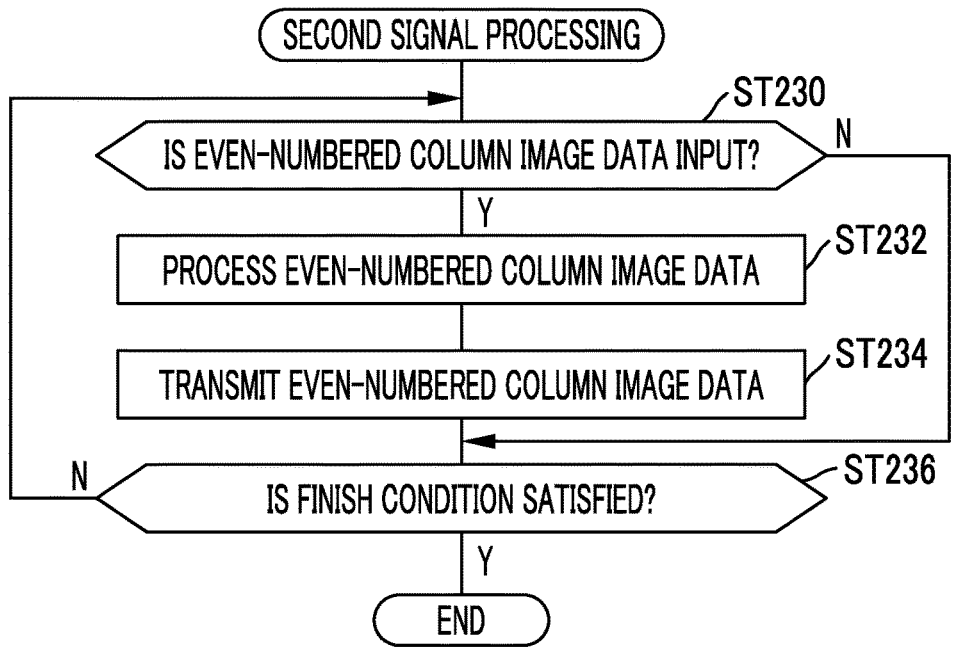
FIG. 24 is a flowchart illustrating a flow of second signal processing according to the third embodiment.

In subsequent step ST214, the first signal processing portion 350 determines whether or not the even-numbered column image data 73B (refer to FIG. 18) transmitted by executing processing of step ST234 of second signal processing illustrated in FIG. 24 is received. In step ST214, in a case where the even-numbered column image data 73B is not received, a negative determination is made, and the first signal processing transitions to step ST220. In step ST214, in a case where the even-numbered column image data 73B is received, a positive determination is made, and the first signal processing transitions to step ST216.

In step ST220, the first signal processing portion 350 determines whether or not the first signal processing finish condition is satisfied. In step ST220, in a case where the first signal processing finish condition is not satisfied, a negative determination is made, and the first signal processing transitions to step ST214. In step ST220, in a case where the first signal processing finish condition is satisfied, a positive determination is made, and the first signal processing is finished.

In step ST216, the first signal processing portion 350 generates the combined image data 372 (refer to FIG. 18) by performing the combining processing of combining the odd-numbered column image data 73A obtained by executing processing of step ST212 with the even-numbered column image data 73B received in step ST214. The first signal processing portion 350 performs the demosaicing on the combined image data 372.

In subsequent step ST218, the first signal processing portion 350 outputs the combined image data 372 obtained by executing processing of step ST216 to the controller 46 (refer to FIG. 18) through the communication line 60 (refer to FIG. 18).

In subsequent step ST222, the first signal processing portion 350 determines whether or not the first signal processing finish condition is satisfied. In step ST222, in a case where the first signal processing finish condition is not satisfied, a negative determination is made, and the first signal processing transitions to step ST210. In step ST222, in a case where the first signal processing finish condition is satisfied, a positive determination is made, and the first signal processing is finished.

Next, a flow of second signal processing executed by the second signal processing portion 52 will be described with reference to FIG. 24.

In the second signal processing illustrated in FIG. 24, in step ST230, the second signal processing portion 52 determines whether or not the even-numbered column image data 73B (refer to FIG. 18) is input from the processing circuit 362. In step ST230, in a case where the even-numbered column image data 73B is not input from the processing circuit 362, a negative determination is made, and the second signal processing transitions to step ST236. In step ST230, in a case where the even-numbered column image data 73B is input from the processing circuit 362, a positive determination is made, and the second signal processing transitions to step ST232.

In step ST232, the second signal processing portion 52 performs the specific type of signal processing on the even-numbered column image data 73B.

In subsequent step ST234, the second signal processing portion 52 transmits the even-numbered column image data 73B obtained by executing processing of step ST232 to the first signal processing portion 350 through the communication line 58 (refer to FIG. 18).

In subsequent step ST236, the second signal processing portion 52 determines whether or not the second signal processing finish condition is satisfied. In step ST236, in a case where the second signal processing finish condition is not satisfied, a negative determination is made, and the second signal processing transitions to step ST230. In step ST236, in a case where the second signal processing finish condition is satisfied, a positive determination is made, and the second signal processing is finished.

As described above, in the third embodiment, the captured image data 70 is color image data indicating a color captured image in which the R pixels, the G pixels, and the B pixels which are the plurality of primary color pixels are periodically arranged. In addition, the captured image data 70 is divided into the plurality of pieces of primary color pixel arrangement image data as a plurality of pieces of image data. In the examples illustrated in FIG. 18 and FIG. 20, the odd-numbered column image data 73A and the even-numbered column image data 73B are illustrated as the plurality of pieces of primary color pixel arrangement image data. In addition, each of the odd-numbered column image data 73A and the even-numbered column image data 73B is image data indicating an image in which each of the R pixels, the G pixels, and the B pixels is periodically arranged. By using the image data indicating the image in which each of the R pixels, the G pixels, and the B pixels is periodically arranged like the odd-numbered column image data 73A and the even-numbered column image data 73B, the demosaicing for the R pixels, the G pixels, and the B pixels can be implemented.

In addition, as illustrated in FIG. 18 and FIG. 19, the odd-numbered column image data 73A and the even-numbered column image data 73B are image data obtained by division from the vertically thinned image data 73. The vertically thinned image data 73 has a smaller data amount than the captured image data 70. Accordingly, the specific type of signal processing for the odd-numbered column image data 73A and the even-numbered column image data 73B can be performed at high speed, compared to a case of performing the specific type of signal processing on one of two pieces of image data obtained by dividing the captured image data 70 without thinning.

In addition, the odd-numbered column image data 73A is image data indicating the set of the pixels of the odd-numbered columns in the vertically ½ thinned image, and the even-numbered column image data 73B is image data indicating the set of the pixels of the even-numbered columns in the vertically ½ thinned image. Processing contents of the specific type of signal processing and combining for a plurality of pieces of image data obtained by irregularly dividing the vertically ½ thinned image are more complex than processing for the odd-numbered column image data 73A and the even-numbered column image data 73B. Accordingly, high-speed processing can be implemented for the odd-numbered column image data 73A and the even-numbered column image data 73B, compared to processing for the plurality of pieces of image data obtained by irregularly dividing the vertically ½ thinned image.

In addition, the first signal processing portion 350 performs the demosaicing on the combined image data 372 obtained by combining the odd-numbered column image data 73A with the even-numbered column image data 73B. Thus, a high image quality image can be obtained, compared to a case of not performing the demosaicing.

Figure 25:
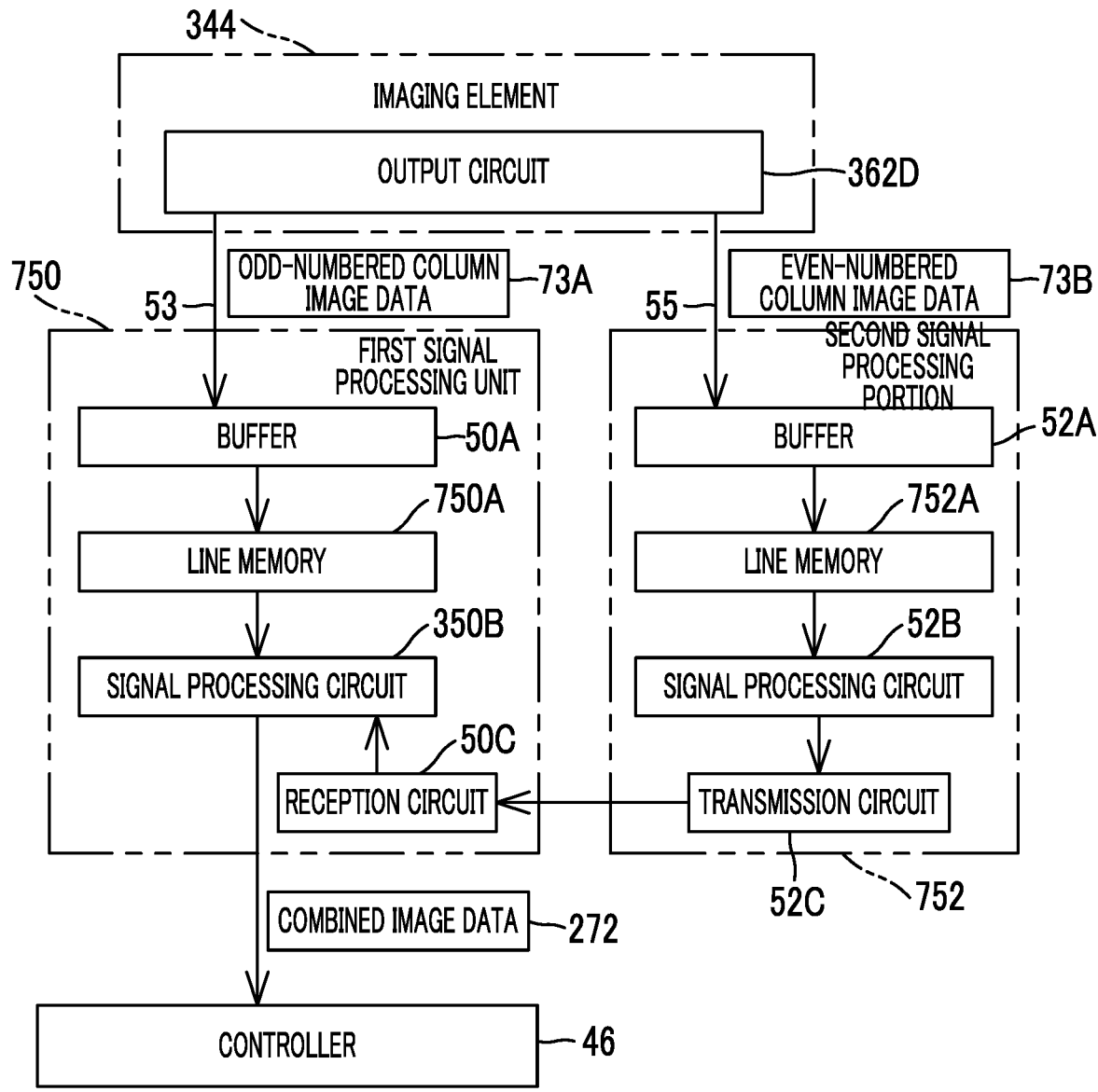
FIG. 25 is a block diagram illustrating the flow of data within the imaging apparatus according to the third embodiment.

While an example of a form in which the first signal processing portion 350 uses the DRAM 54, and in which the second signal processing portion 52 uses the DRAM 56 is illustratively described in the third embodiment, the technology of the present disclosure is not limited thereto. For example, as illustrated in FIG. 25, without using the DRAMs 54 and 56, a first signal processing portion 750 may be applied instead of the first signal processing portion 350, and a second signal processing portion 752 may be applied instead of the second signal processing portion 52. In the example illustrated in FIG. 25, the first signal processing portion 750 is different from the first signal processing portion 350 in that a line memory 750A is included, and that the DRAM 54 is not used. In addition, the second signal processing portion 752 is different from the second signal processing portion 52 in that a line memory 752A is included, and that the DRAM 56 is not used.

In the first signal processing portion 750, the line memory 750A is interposed between the buffer 50A and the signal processing circuit 350B. The buffer 50A outputs the odd-numbered column image data 73A to the line memory 750A. The line memory 750A stores the odd-numbered column image data 73A input from the buffer 50A in units of lines and outputs the odd-numbered column image data 73A to the signal processing circuit 350B using the FIFO method. The signal processing circuit 350B executes processing described in the third embodiment.

Meanwhile, in the second signal processing portion 752, the line memory 752A is interposed between the buffer 52A and the signal processing circuit 52B. The buffer 52A outputs the even-numbered column image data 73B to the line memory 752A. The line memory 752A stores the even-numbered column image data 73B input from the buffer 52A in units of lines and outputs the even-numbered column image data 73B to the signal processing circuit 52B using the FIFO method. The signal processing circuit 52B executes processing described in the third embodiment.

In addition, while the image data indicating the vertically ½ thinned image is illustrated as compressed image data in the third embodiment, the technology of the present disclosure is not limited thereto. For example, in a case where n denotes a natural number greater than or equal to 3, image data indicating a vertically 1/n thinned image may be applied as the compressed image data. In addition, image data indicating a horizontally thinned image that is thinned in units of columns may be applied as the compressed image data, or image data indicating an image that is thinned in units of rows and units of columns may be applied as the compressed image data.

Fourth Embodiment

An example of a form of separating the captured image data 70 into the left image data 70A1 and the right image data 70B1 is described in the first embodiment. An example of a form of setting a separation method for the captured image data 70 to vary depending on the operation mode will be described in a fourth embodiment. In the fourth embodiment, the same constituents as the first embodiment will be designated by the same reference signs and will not be described. Hereinafter, parts different from the first embodiment will be described.

As illustrated in FIG. 1, an imaging apparatus 400 according to the fourth embodiment is different from the imaging apparatus 10 described in the first embodiment in that an imaging apparatus main body 412 is included instead of the imaging apparatus main body 12.

The imaging apparatus main body 412 is different from the imaging apparatus main body 12 in that an imaging element 444 (refer to FIG. 26) is included instead of the imaging element 44. The imaging element 444 is different from the imaging element 44 in that a processing circuit 462 is included instead of the processing circuit 62. The processing circuit 462 is different from the processing circuit 62 in that an image processing circuit 462C is included instead of the image processing circuit 62C, and that an output circuit 462D is included instead of the output circuit 62D.

The imaging apparatus main body 412 is different from the imaging apparatus main body 12 in that a first signal processing portion 450 (refer to FIG. 26) is included instead of the first signal processing portion 50, and that a second signal processing portion 452 (refer to FIG. 26) is included instead of the second signal processing portion 52.

The first signal processing portion 450 is different from the first signal processing portion 50 in that a function of the first signal processing portion 50 and a function of the first signal processing portion 350 described in the third embodiment are included. In addition, the first signal processing portion 450 is different from the first signal processing portion 50 in that the function of the first signal processing portion 50 and the function of the first signal processing portion 350 are selectively operated.

The second signal processing portion 452 is different from the second signal processing portion 52 in that a function of the second signal processing portion 52 and a function of the second signal processing portion 252 described in the second embodiment are included. In addition, the second signal processing portion 452 is different from the second signal processing portion 52 in that the function of the second signal processing portion 52 and the function of the second signal processing portion 252 described in the second embodiment are selectively operated.

The controller 46 selectively outputs a still picture image capturing mode signal 480A (refer to FIG. 26) and a display motion picture capturing mode signal 480B (refer to FIG. 27) to the processing circuit 462 through the communication line 60. For example, the still picture image capturing mode signal 480A is output from the controller 46 in a case where an instruction to set the imaging apparatus 400 to the still picture image capturing mode is received by the reception portion 84. In addition, for example, the display motion picture capturing mode signal 480B is output from the controller 46 in a case where an instruction to set the imaging apparatus 400 to the display motion picture capturing mode is received by the reception portion 84.

Figure 26:
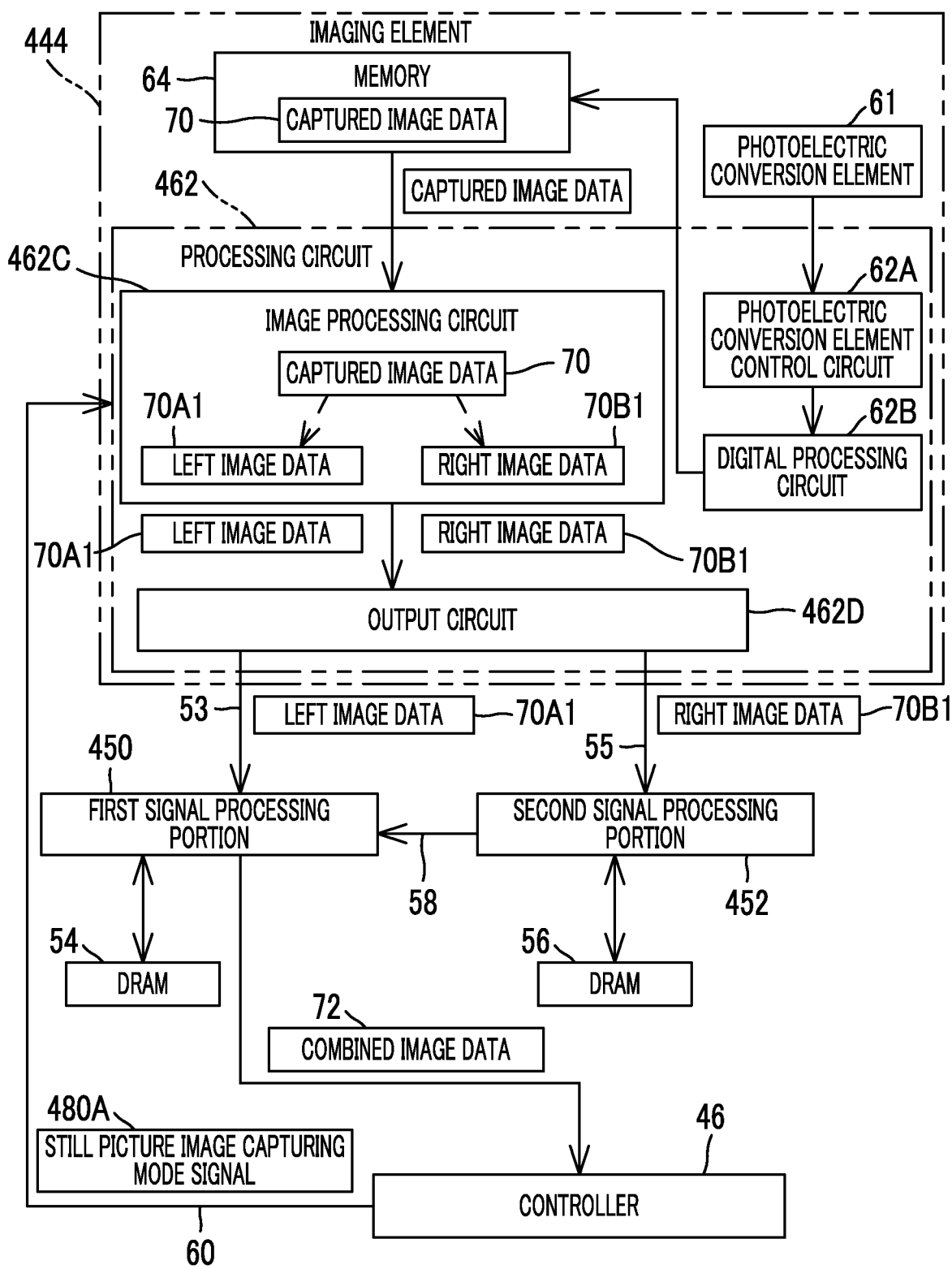
FIG. 26 is a block diagram illustrating a flow of data within the imaging apparatus in which a still picture image capturing mode is set.

As illustrated in FIG. 26, in a case where the still picture image capturing mode signal 480A is input from the controller 46 through the communication line 60, the processing circuit 462 operates the image processing circuit 462C in the same manner as the image processing circuit 62C described in the first embodiment. That is, the processing circuit 462 causes the image processing circuit 462C to separate the captured image data 70 into the left image data 70A1 and the right image data 70B1 and output the left image data 70A1 and the right image data 70B1 to the output circuit 462D. The left image 70A1a indicated by the left image data 70A1 and the right image 70B1a indicated by the right image data 70B1 have the overlapping region 71 described in the first embodiment. The left image data 70A1 and the right image data 70B1 according to the fourth embodiment are an example of a "plurality of overlapping image data" according to the embodiments of the technology of the present disclosure.

As illustrated in FIG. 26, the output circuit 462D outputs the left image data 70A1 to the first signal processing portion 450 through the first output line 53 in the same manner as the output circuit 62D described in the first embodiment. In addition, the output circuit 462D outputs the right image data 70B1 to the second signal processing portion 452 through the second output line 55 in the same manner as the output circuit 62D described in the first embodiment.

The first signal processing portion 450 performs the specific type of signal processing on the input left image data 70A1. The second signal processing portion 452 performs the specific type of signal processing on the input right image data 70B1 and outputs the right image data 70B1 subjected to the specific type of signal processing to the first signal processing portion 450.

The first signal processing portion 450 generates the combined image data 72 described in the first embodiment by combining the left image data 70A1 subjected to the specific type of signal processing with the right image data 70B1 input from the second signal processing portion 452. The first signal processing portion 450 outputs the generated combined image data 72 to the controller 46.

Figure 27:
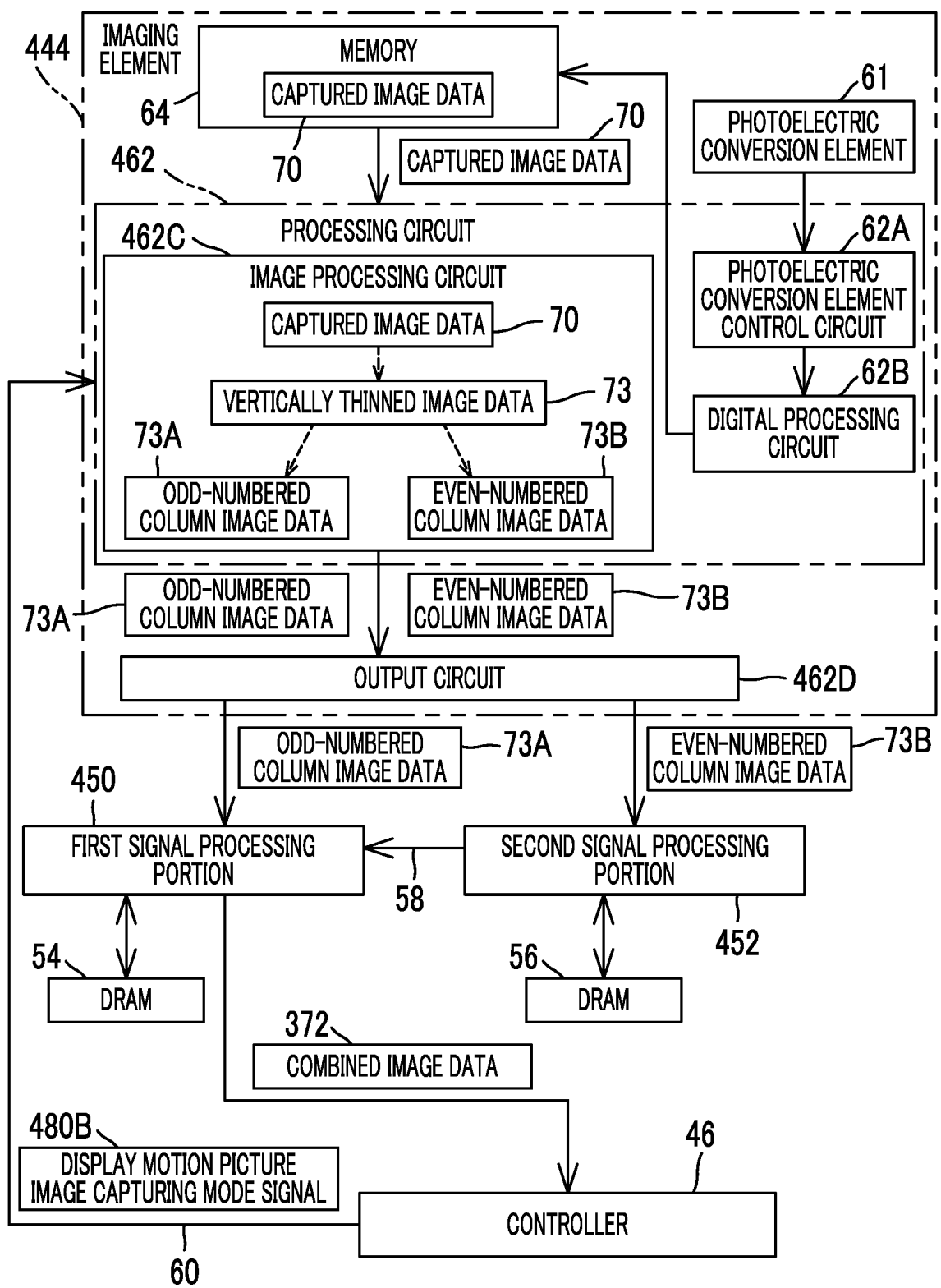
FIG. 27 is a block diagram illustrating a flow of data within the imaging apparatus in which a display image capturing mode is set.

Meanwhile, as illustrated in FIG. 27, in a case where the display motion picture capturing mode signal 480B is input from the controller 46 through the communication line 60, the processing circuit 462 operates the image processing circuit 462C in the same manner as the image processing circuit 362C described in the third embodiment. That is, the processing circuit 462 causes the image processing circuit 462C to compress the captured image data 70 into the vertically thinned image data 73 and then, separate the vertically thinned image data 73 into the odd-numbered column image data 73A and the even-numbered column image data 73B. The processing circuit 462 causes the image processing circuit 462C to output the odd-numbered column image data 73A and the even-numbered column image data 73B to the output circuit 462D.

As illustrated in FIG. 27, the output circuit 462D outputs the odd-numbered column image data 73A to the first signal processing portion 450 through the first output line 53 in the same manner as the output circuit 362D described in the third embodiment. In addition, the output circuit 462D outputs the even-numbered column image data 73B to the second signal processing portion 452 through the second output line 55 in the same manner as the output circuit 362D described in the third embodiment.

The first signal processing portion 450 performs the specific type of signal processing on the input odd-numbered column image data 73A. The second signal processing portion 452 performs the specific type of signal processing on the input even-numbered column image data 73B and outputs the even-numbered column image data 73B subjected to the specific type of signal processing to the first signal processing portion 450.

The first signal processing portion 450 generates the combined image data 372 described in the third embodiment by combining the odd-numbered column image data 73A subjected to the specific type of signal processing with the even-numbered column image data 73B input from the second signal processing portion 452. The first signal processing portion 450 outputs the generated combined image data 372 to the controller 46.

Next, an action of the imaging apparatus 400 will be described.

First, a flow of imaging processing executed by the processing circuit 462 of the imaging element 444 will be described with reference to FIG. 28. Here, for convenience of description, it is assumed that the imaging apparatus 400 is set to the still picture image capturing mode or the display motion picture capturing mode.

Figure 28:
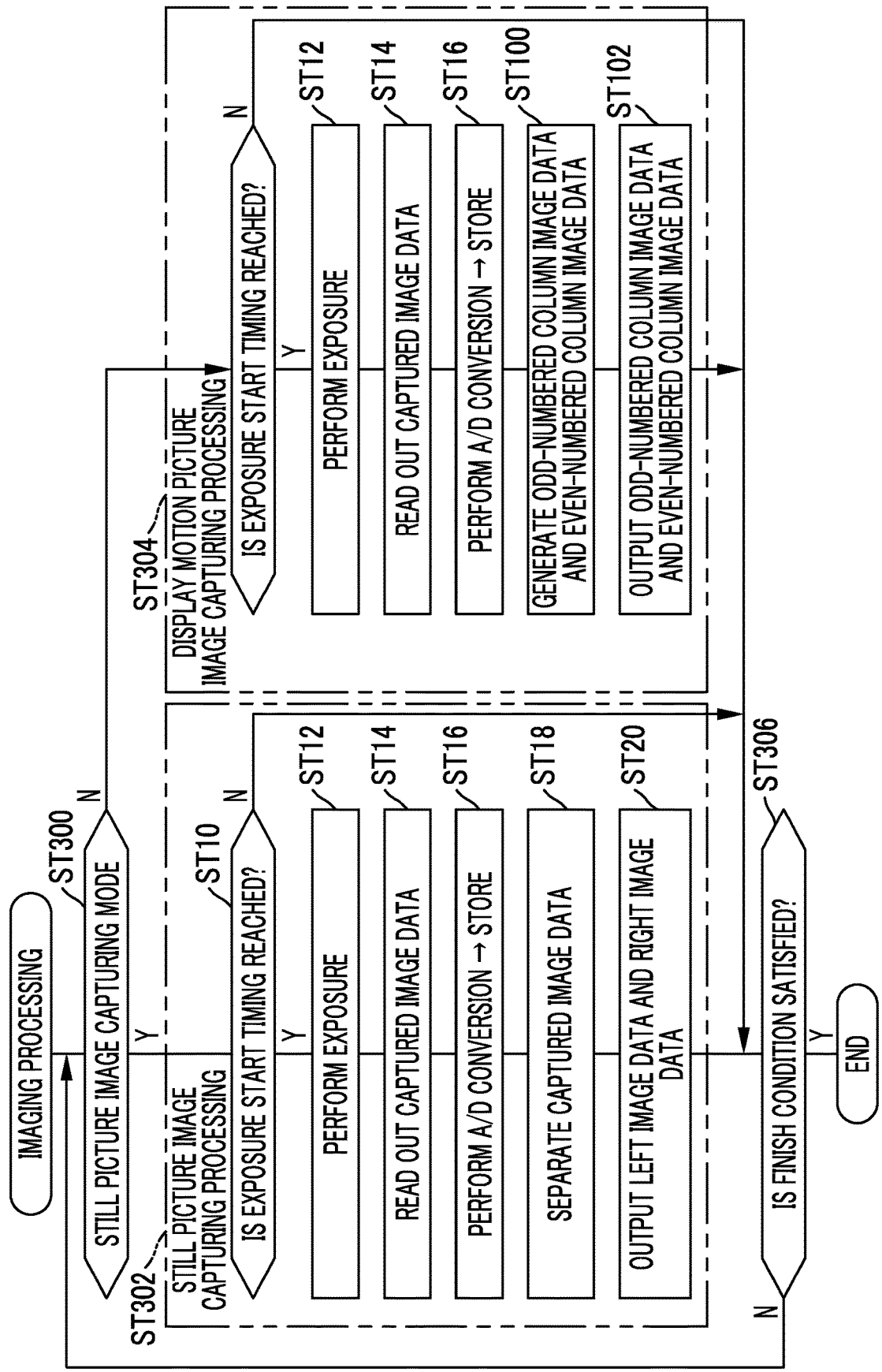
FIG. 28 is a flowchart illustrating a flow of imaging processing according to a fourth embodiment.

In the imaging processing illustrated in FIG. 28, first, in step ST300, the image processing circuit 462C determines whether or not the imaging apparatus 400 is in the still picture image capturing mode. In step ST300, in a case where the imaging apparatus 400 is not in the still picture image capturing mode, that is, in a case where the imaging apparatus 400 is in the display motion picture capturing mode, a negative determination is made, and the imaging processing transitions to step ST304. In step ST300, in a case where the imaging apparatus 400 is in the still picture image capturing mode, a positive determination is made, and the imaging processing transitions to step ST302.

In step ST302, the processing circuit 462 executes still picture image capturing processing. Then, the imaging processing transitions to step ST306. The still picture image capturing processing is the same processing as the imaging processing (refer to FIG. 10) described in the first embodiment.

In step ST304, the processing circuit 462 executes display motion picture image capturing processing. Then, the imaging processing transitions to step ST306. The display motion picture imaging processing is the same processing as the imaging processing (refer to FIG. 22) described in the third embodiment.

In step ST306, the processing circuit 462 determines whether or not the imaging processing finish condition is satisfied. In step ST306, in a case where the imaging processing finish condition is not satisfied, a negative determination is made, and the imaging processing transitions to step ST300. In step ST306, in a case where the imaging processing finish condition is satisfied, a positive determination is made, and the imaging processing is finished.

In the still picture image capturing mode, in the first signal processing portion 450, the same processing as the first signal processing (refer to FIG. 11) described in the first embodiment is executed. In addition, in the still picture image capturing mode, in the second signal processing portion 452, the same processing as the second signal processing (refer to FIG. 12) described in the first embodiment is executed.

Meanwhile, in the display motion picture capturing mode, in the first signal processing portion 450, the same processing as the first signal processing (FIG. 23) described in the third embodiment is executed. In addition, in the display motion picture capturing mode, in the second signal processing portion 452, the same processing as the second signal processing (FIG. 24) described in the third embodiment is executed.

As described above, in the fourth embodiment, in the still picture image capturing mode, the captured image data 70 is separated into the left image data 70A1 and the right image data 70B1 described in the first embodiment. In addition, in the display motion picture capturing mode, the captured image data 70 is separated into the odd-numbered column image data 73A and the even-numbered column image data 73B described in the third embodiment. Accordingly, a balance among image quality, power consumption, and a processing speed can be set to vary between the still picture image capturing mode and the display motion picture capturing mode.

In addition, in the still picture image capturing mode, the captured image data 70 is separated into the left image data 70A1 and the right image data 70B1 each of which includes the image data indicating the overlapping region 71. Meanwhile, in the display motion picture capturing mode, the captured image data 70 is separated in units of lines. Accordingly, in the still picture image capturing mode, since processing is performed on the left image data 70A1 and the right image data 70B1 each of which includes the image data indicating the overlapping region 71, the image quality can be increased, compared to the display motion picture capturing mode. In addition, in the display motion picture capturing mode, processing is performed on the odd-numbered column image data 73A and the even-numbered column image data 73B having a smaller data amount than the left image data 70A1 and the right image data 70B1. Thus, in the display motion picture capturing mode, the power consumption can be reduced, and the processing speed can be increased, compared to the still picture image capturing mode.

While a case of applying the imaging processing (refer to FIG. 10) described in the first embodiment as processing of step ST302 (refer to FIG. 28) is described in the third embodiment, the technology of the present disclosure is not limited thereto. For example, the imaging processing (refer to FIG. 15) described in the second embodiment may be applied as processing of step ST302 (refer to FIG. 28). In this case, in the still picture image capturing mode, the first signal processing (refer to FIG. 16) described in the second embodiment is executed in the first signal processing portion 450, and the second signal processing (refer to FIG. 17) described in the second embodiment is executed in the second signal processing portion 452.

In addition, while an example of a form of separating the captured image data 70 into the left image data 70A1 and the right image data 70B1 in the still picture image capturing mode is illustratively described in the third embodiment, the technology of the present disclosure is not limited thereto. For example, in the still picture image capturing mode, as described in the second embodiment, the captured image data 70 may be separated into the background region image data 70A2 and the face region image data 70B2. In this case, in the still picture image capturing mode, the first signal processing portion 450 may be operated in the same manner as the first signal processing portion 250 described in the second embodiment, and the second signal processing portion 452 may be operated in the same manner as the second signal processing portion 252 described in the second embodiment.

Fifth Embodiment

An example of a form of compressing the captured image data 70 into the odd-numbered column image data 73A and the even-numbered column image data 73B is described in the third embodiment. An example of a form of compressing the captured image data 70 into two pieces of image data using another method will be described in a fifth embodiment. In the fifth embodiment, the same constituents as the third embodiment will be designated by the same reference signs and will not be described. Hereinafter, parts different from the third embodiment will be described.

As illustrated in FIG. 1, an imaging apparatus 500 according to the fifth embodiment is different from the imaging apparatus 300 described in the third embodiment in that an imaging apparatus main body 512 is included instead of the imaging apparatus main body 312.

The imaging apparatus main body 512 is different from the imaging apparatus main body 312 in that an imaging element 544 (refer to FIG. 29) is included instead of the imaging element 344. The imaging element 544 is different from the imaging element 344 in that a processing circuit 562 is included instead of the processing circuit 362. The processing circuit 562 is different from the processing circuit 362 in that an image processing circuit 562C is included instead of the image processing circuit 362C, and that an output circuit 562D is included instead of the output circuit 362D.

The imaging apparatus main body 512 is different from the imaging apparatus main body 312 in that a first signal processing portion 550 (refer to FIG. 29) is included instead of the first signal processing portion 50.

Figure 30:
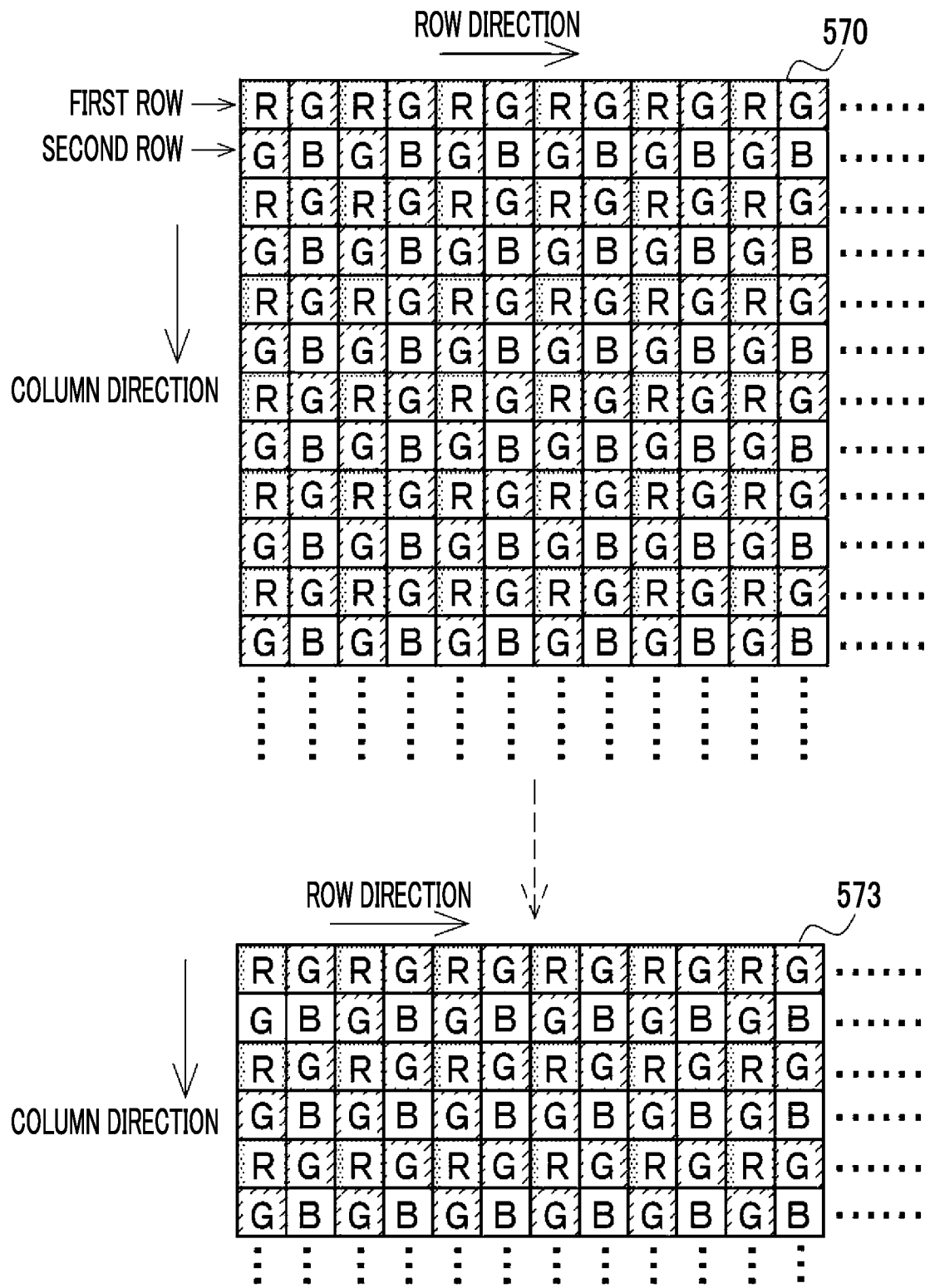
FIG. 30 is a descriptive diagram used for describing a method of generating vertically thinned image data from captured image data having Bayer arrangement.

The memory 64 stores captured image data 570. The image processing circuit 562C acquires the captured image data 570 from the memory 64. The captured image data 570 is color image data including R pixels, G pixels, and B pixels. As illustrated in FIG. 30 as an example, in the captured image data 570, the R pixels, the G pixels, and the B pixels are arranged with periodicity corresponding to Bayer arrangement.

In the example illustrated in FIG. 30, in a first row, the R pixels and the G pixels are arranged in circulation in an order of the R pixel and the G pixel in the row direction. In addition, in a second row, the B pixels and the G pixels are arranged in circulation in an order of the G pixel and the B pixel in the row direction. An arrangement pattern of the R pixels, the G pixels, and the B pixels of the entire captured image data 570 is formed by repetition of an arrangement pattern of the R pixels and the G pixels of the first row in every other row in the column direction and repetition of an arrangement pattern of the B pixels and the G pixels of the second row in every other row in the column direction.

The image processing circuit 562C compresses the captured image data 570 acquired from the memory 64. That is, the image processing circuit 562C generates vertically thinned image data 573 from the captured image data 570. As illustrated in FIG. 30 as an example, the vertically thinned image data 573 is image data indicating a vertically ½ thinned image obtained by thinning out lines of every two rows adjacent in the column direction from a captured image indicated by the captured image data 570.

Figure 29:
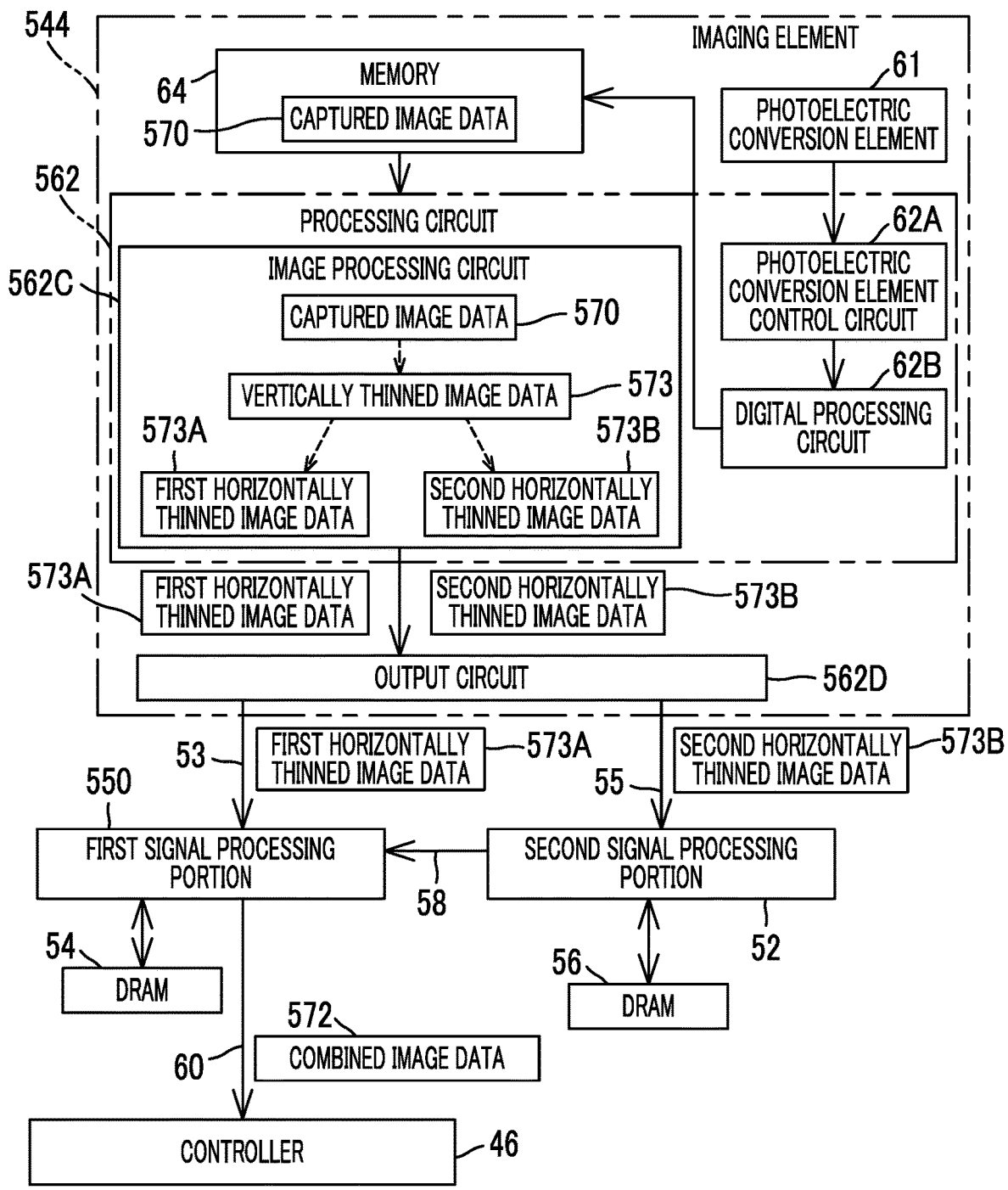
FIG. 29 is a block diagram illustrating a flow of data within an imaging apparatus according to the fourth embodiment.
Figure 31:
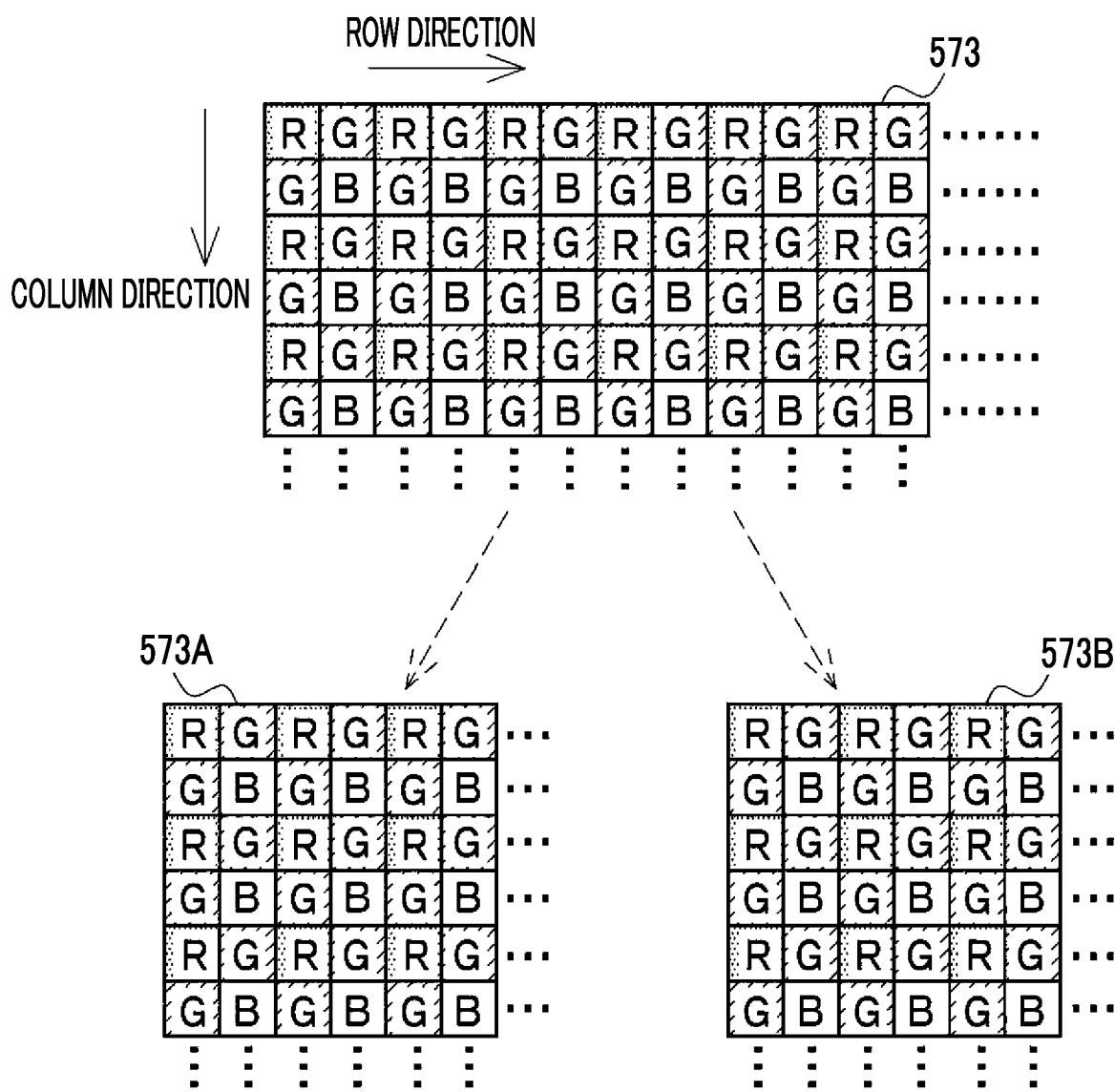
FIG. 31 is a conceptual diagram illustrating a relationship among the vertically thinned image data, first horizontally thinned image data, and second horizontally thinned image data.

As illustrated in FIG. 29 and FIG. 31 as an example, the image processing circuit 562C separates the vertically thinned image data 753 into first horizontally thinned image data 573A and second horizontally thinned image data 573B. The image processing circuit 562C outputs the first horizontally thinned image data 573A and the second horizontally thinned image data 573B obtained by separation to the output circuit 562D.

As illustrated in FIG. 31 as an example, the first horizontally thinned image data 573A is image data indicating one of a pair of horizontally ½ thinned images that are obtained by thinning out every two columns different between the horizontally ½ thinned images in the row direction in units of two columns from the vertically ½ thinned image indicated by the vertically thinned image data 573. In addition, the second horizontally thinned image data 573B is image data indicating the other of the pair of horizontally ½ thinned images.

The output circuit 562D outputs the first horizontally thinned image data 573A input from the image processing circuit 562C to the first signal processing portion 550 through the first output line 53. In addition, the output circuit 562D outputs the second horizontally thinned image data 573B input from the image processing circuit 562C to the second signal processing portion 52 through the second output line 55.

In the second signal processing portion 52, the same processing as processing performed on the even-numbered column image data 73B described in the third embodiment is performed on the second horizontally thinned image data 573B, and the second horizontally thinned image data 573B after processing is transmitted to the first signal processing portion 550.

The first signal processing portion 550 receives the second horizontally thinned image data 573B transmitted from the second signal processing portion 52.

In the first signal processing portion 550, the same processing as processing performed on the odd-numbered column image data 73A described in the third embodiment is performed on the first horizontally thinned image data 573A. In the first signal processing portion 550, combined image data 572 is generated by combining the first horizontally thinned image data 573A with the second horizontally thinned image data 573B. Consequently, an arrangement pattern of R pixels, G pixels, and B pixels of an image indicated by the combined image data 572 is the same arrangement pattern as the vertically ½ thinned image indicated by the vertically thinned image data 573. That is, the arrangement pattern of the R pixels, the G pixels, and the B pixels of the image indicated by the combined image data 572 is a periodic arrangement pattern in which the demosaicing can be performed on the R pixels, the G pixels, and the B pixels.

Therefore, the first signal processing portion 550 performs the demosaicing of the R, G, and B signals on the combined image data 572 and outputs the combined image data 572 subjected to the demosaicing to the controller 46 through the communication line 60 in the same manner as the third embodiment.

As described above, the Bayer arrangement is employed in the captured image data 570. Even in this case, in the same manner as the odd-numbered column image data 73A and the even-numbered column image data 73B described in the third embodiment, the first horizontally thinned image data 573A and the second horizontally thinned image data 573B are obtained as two pieces of image data on which the demosaicing can be performed. Thus, even in a case where the captured image data 570 is image data having the Bayer arrangement, the same effect as the third embodiment can be obtained.

Figure 32:
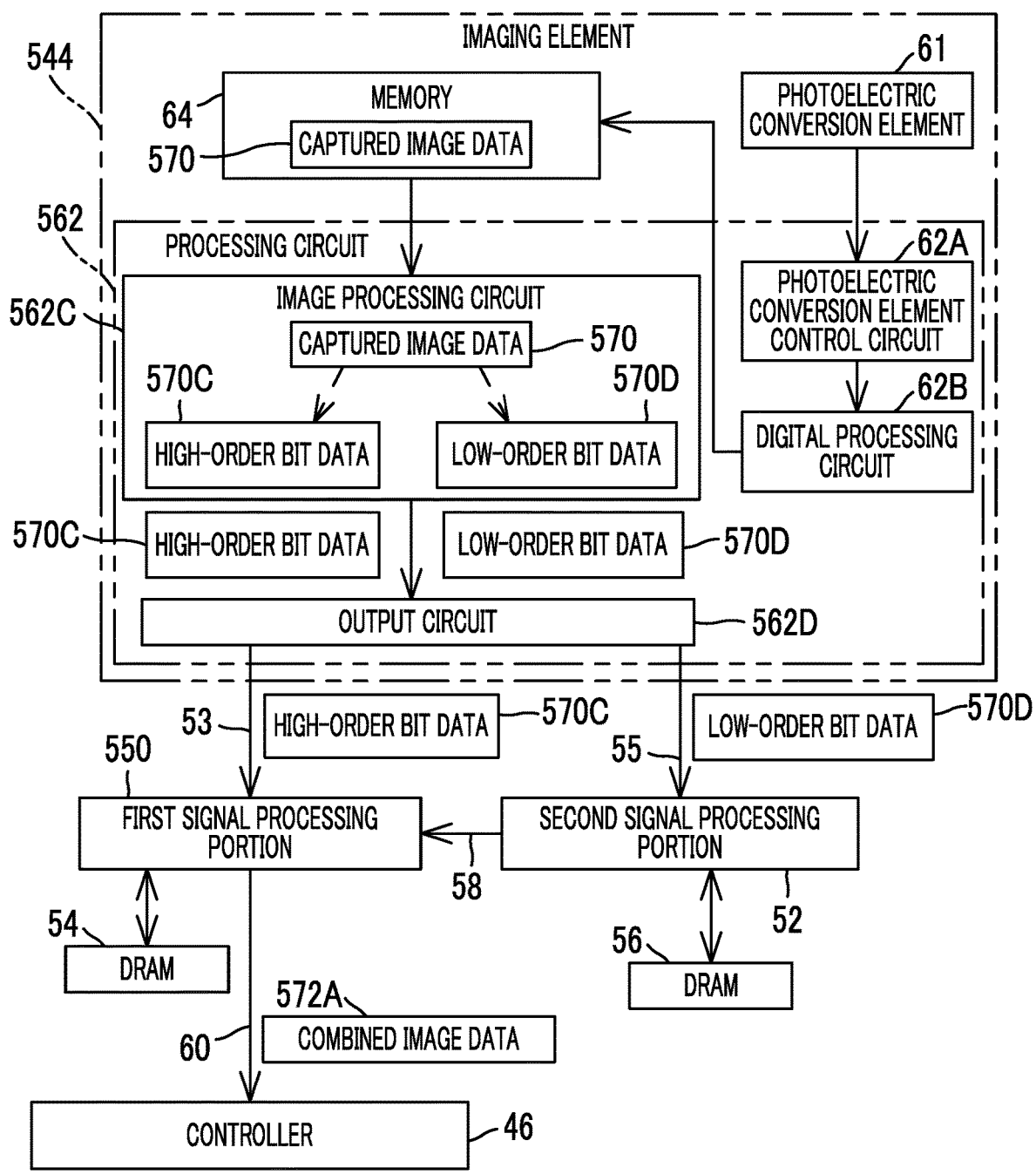
FIG. 32 is a block diagram illustrating a form of processing after separating the captured image data into high-order bit data and low-order bit data.

While the first horizontally thinned image data 573A and the second horizontally thinned image data 573B are illustrated as two pieces of image data into which the captured image data 570 is compressed in the fifth embodiment, the technology of the present disclosure is not limited thereto. For example, as illustrated in FIG. 32, the image processing circuit 562C may separate the captured image data 570 into high-order bit data 570C and low-order bit data 570D. In a case where the number of bits for each pixel of the captured image data 570 is 16 bits, the high-order bit data 570C is, for example, image data in which the number of bits for each pixel is high-order 8 bits, and the low-order bit data 570D is, for example, image data in which the number of bits for each pixel is low-order 8 bits.

As illustrated in FIG. 32, the output circuit 562D outputs the high-order bit data 570C to the first signal processing portion 550 through the first output line 53 and outputs the low-order bit data 570D to the second signal processing portion 52 through the second output line 55. In addition, the second signal processing portion 52 performs the specific type of signal processing on the low-order bit data 570D and then, transmits the low-order bit data 570D to the first signal processing portion 550 through the communication line 58 in the same manner as the fifth embodiment. In addition, the first signal processing portion 550 receives the low-order bit data 570D transmitted from the second signal processing portion 52 and performs the specific type of signal processing on the high-order bit data 570C in the same manner as the fifth embodiment. The first signal processing portion 550 generates combined image data 572A by combining the high-order bit data 570C subjected to the specific type of signal processing with the received low-order bit data 570D in the same manner as the fifth embodiment. The first signal processing portion 550 outputs the generated combined image data 572A to the controller 46.

While a case where the number of bits for each pixel of the captured image data 570 is 16 bits is illustrated here, the technology of the present disclosure is not limited thereto. Image data in which the number of bits for each pixel is less than 16 bits may be used, or image data having the number of bits such that the number of bits for each pixel exceeds 16 bits may be used. In addition, for example, a division method for high-order bits and low-order bits may be a division method that is determined in accordance with an application and/or specifications.

In addition, while an example of separating the captured image data 570 into the high-order bit data 570C and the low-order bit data 570D by the image processing circuit 562C is illustratively described here, the technology of the present disclosure is not limited thereto. For example, the captured image data 570 may be separated into high-order bit image data, middle-order bit image data, and low-order bit image data. The high-order bit image data, the middle-order bit image data, and the low-order bit image data refer to three pieces of compressed image data obtained by compressing the captured image data 570 by dividing the captured image data 570 into three bit ranges. In addition, the captured image data 570 may be compressed by dividing the captured image data 570 into four or more bit ranges. A plurality of pieces of compressed image data may be obtained by dividing the captured image data 570 into a plurality of bit ranges.

The captured image data 570 is separated into the plurality of pieces of compressed image data (in the example illustrated in FIG. 32, the high-order bit data 570C and the low-order bit data 570D) obtained by dividing the captured image data 570 into the plurality of bit ranges. Accordingly, each of the first signal processing portion 550 and the second signal processing portion 52 can perform high-speed processing, compared to a case of processing image data obtained by irregular division.

In addition, as illustrated in FIG. 32, by separating the captured image data 570 into the high-order bit data 570C and the low-order bit data 570D, high-accuracy processing can be performed on the high-order bit data 570C, compared to the low-order bit data 570D. Meanwhile, for the low-order bit data 570D, the power consumption can be reduced, and the processing speed can be increased, compared to the high-order bit data 570C.

In addition, while an example of a form of separating the captured image data 70 and 570 (hereinafter, simply referred to as the "captured image data") into two pieces of image data is illustratively described in each of the embodiments, the technology of the present disclosure is not limited thereto. For example, in a case where N denotes a natural number greater than or equal to 2, the captured image data may be separated into N pieces of image data. As a separation method, for example, a method of separating the captured image data into N bit ranges is considered in addition to a method of dividing the captured image data into N equal parts.

Figure 33:
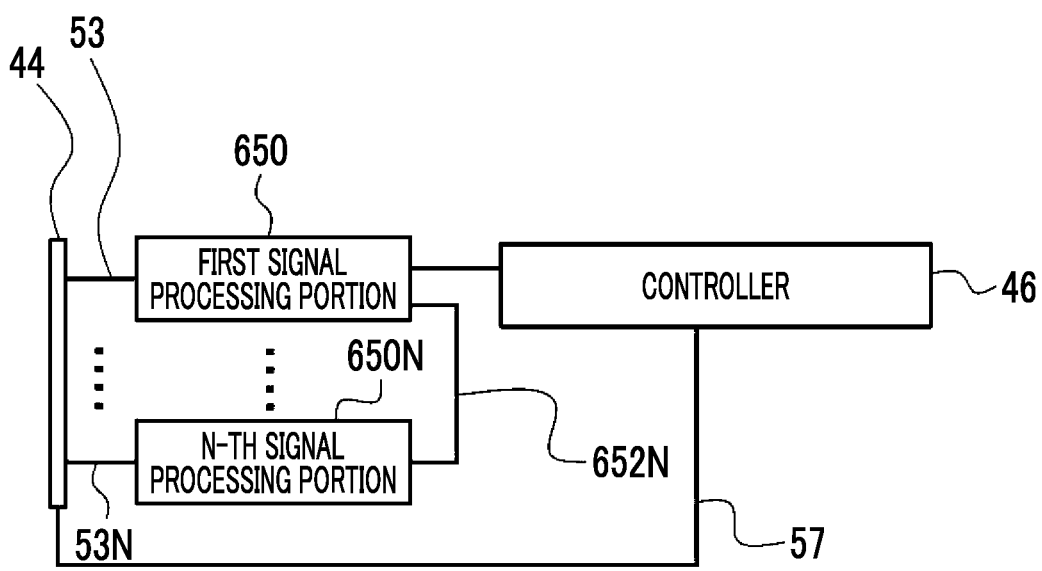
FIG. 33 is a conceptual diagram illustrating a relationship among the imaging element, a plurality of signal processing portions, and the controller in a case of using three or more signal processing portions.

In a case of separating the captured image data into N pieces of image data, for example, as illustrated in FIG. 33, each of a first signal processing portion 650 to an N-th signal processing portion 650N is connected to the imaging element 44 through a corresponding output line. In the example illustrated in FIG. 33, the first signal processing portion 650 is connected to the imaging element 44 through the first output line 53, and the N-th signal processing portion 650N is connected to the imaging element 44 through an N-th output line 53N. The N-th signal processing portion 650N may transmit image data after signal processing to the first signal processing portion 650, and the first signal processing portion 650 may combine the N pieces of image data and output combined image data obtained by combining to the controller 46.

In addition, while an example of a form of implementing the processing circuits 62, 262, 362, 462, and 562 (hereinafter, simply referred to as the "processing circuit") by an ASIC is illustratively described in each of the embodiments, the technology of the present disclosure is not limited thereto. For example, the imaging processing may be implemented by a software configuration based on a computer.

Figure 34:
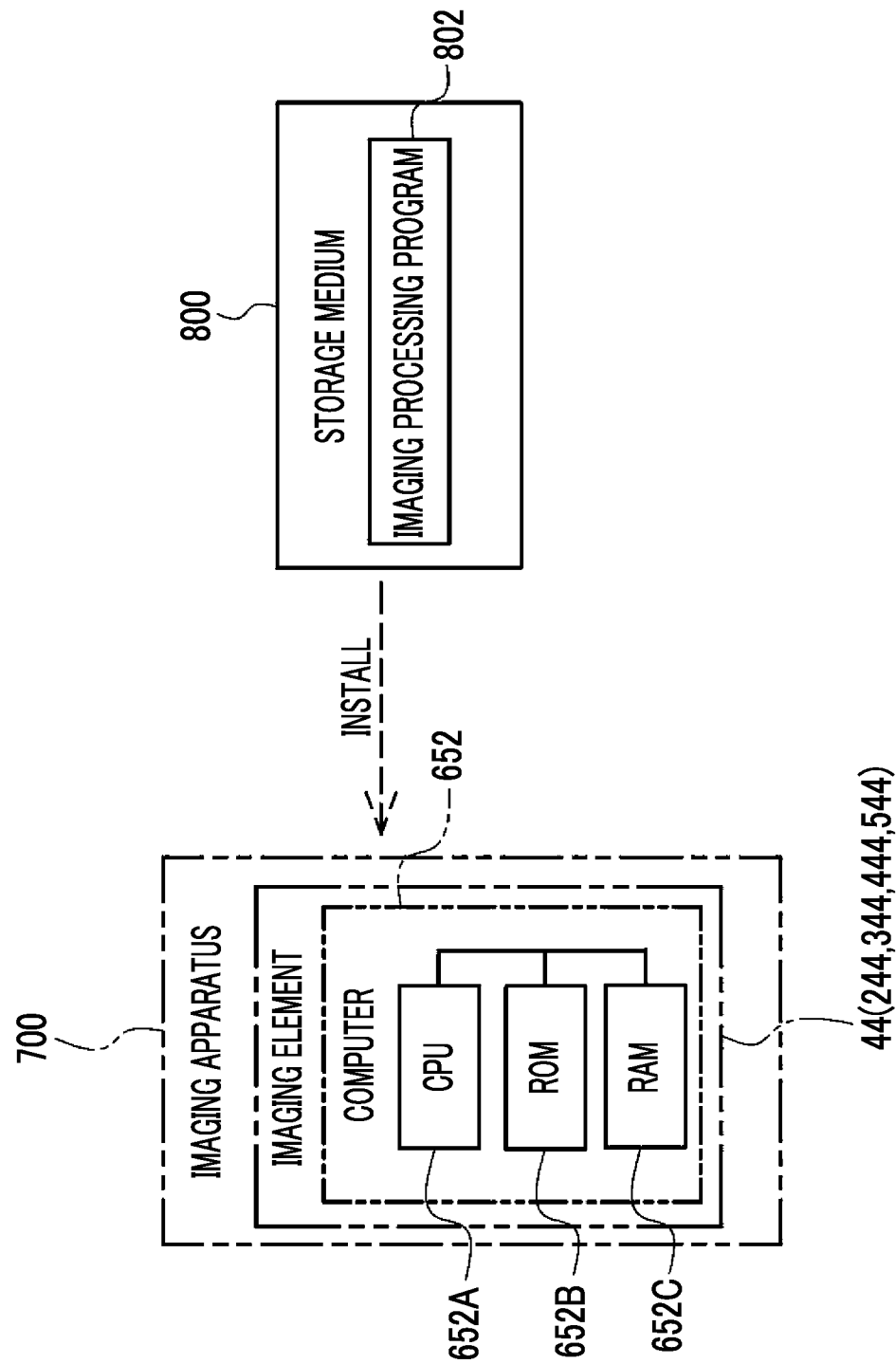
FIG. 34 is a conceptual diagram illustrating an example of an aspect in which an imaging processing program is installed on a computer within the imaging element from a storage medium storing the imaging processing program.

In this case, for example, as illustrated in FIG. 34, an imaging processing program 802 causing a computer 652 incorporated in the imaging elements 44, 244, 344, 444, and 544 to execute the imaging processing is stored in a storage medium 800. The computer 652 comprises a CPU 652A, a ROM 652B, and a RAM 652C. The imaging processing program 802 of the storage medium 800 is installed on the computer 652, and the CPU 652A of the computer 652 executes the imaging processing in accordance with the imaging processing program 802. While a single CPU is illustrated as the CPU 652A here, the technology of the present disclosure is not limited thereto. A plurality of CPUs may be employed instead of the CPU 652A. Any portable storage medium such as an SSD or a USB memory is illustrated as an example of the storage medium 800.

While the imaging processing program 802 is stored in the storage medium 800 in the example illustrated in FIG. 34, the technology of the present disclosure is not limited thereto. For example, the imaging processing program 802 may be stored in advance in the ROM 652B, and the CPU 652A may read out the imaging processing program 802 from the ROM 652B, load the imaging processing program 802 into the RAM 652C, and execute the loaded imaging processing program 802.

In addition, the imaging processing program 802 may be stored in a storage portion of another computer, a server apparatus, or the like connected to the computer 652 through a communication network (not illustrated), and the imaging processing program 802 may be downloaded to the computer 652 in accordance in response to a request from an imaging apparatus 700 having the same configuration as any of the imaging apparatuses 10, 200, 300, 400, and 500. In this case, the downloaded imaging processing program 802 is executed by the CPU 652A of the computer 652.

In addition, the computer 652 may be disposed outside the imaging elements 44, 244, 344, 444, and 544. In this case, the computer 652 may control the processing circuit in accordance with the imaging processing program 802.

Various processors illustrated below can be used as a hardware resource for executing the imaging processing described in each of the embodiments. For example, as described above, a CPU that is a general-purpose processor functioning as the hardware resource for executing the imaging processing by executing software, that is, the program, is illustrated as a processor. In addition, a dedicated electric circuit such as an FPGA, a PLD, or an ASIC that is a processor having a circuit configuration dedicatedly designed to execute a specific type of processing is illustrated as a processor.

The hardware resource for executing the imaging processing may be configured with one of those various processors or may be configured with a combination of two or more processors of the same type or different types (for example, a combination of a plurality of FPGAs or a combination of a CPU and an FPGA). In addition, the hardware resource for executing various types of processing according to the embodiments of the technology of the present disclosure may be one processor.

As an example of a configuration with one processor, first, as represented by a computer such as a client and a server, a form in which one processor is configured with a combination of one or more CPUs and software, and in which this processor functions as the hardware resource for executing the in-imaging element processing is available. Second, as represented by a system-on-a-chip (SoC) or the like, a form of using a processor that implements, by one IC chip, a function of the entire system including a plurality of hardware resources for executing the imaging processing is available. The in-imaging element processing is implemented using one or more of the various processors as the hardware resource.

Furthermore, as a hardware structure of those various processors, more specifically, an electric circuit in which circuit elements such as semiconductor elements are combined can be used.

Figure 35:
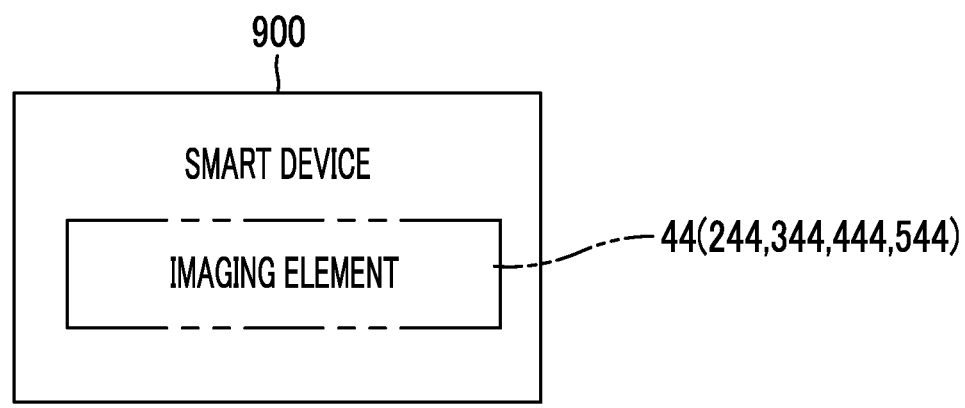
FIG. 35 is a block diagram illustrating an example of a schematic configuration of a smart device incorporating the imaging element according to the embodiment.

While an interchangeable lens camera is illustrated as the imaging apparatus in each of the embodiments, the technology of the present disclosure is not limited thereto. For example, the technology of the present disclosure may be applied to a smart device 900 illustrated in FIG. 35. The smart device 900 illustrated in FIG. 35 as an example is an example of the imaging apparatus according to the embodiments of the technology of the present disclosure. The imaging elements 44, 244, 344, 444, and 544 described in the embodiments are mounted in the smart device 900. Even with the smart device 900 configured in such a manner, the same actions and effects as the imaging apparatus described in the embodiments are obtained. The technology of the present disclosure can be applied to not only the smart device 900 but also a personal computer or a wearable terminal apparatus.

While the first display 32 and the second display 86 are illustrated in each of the embodiments, the technology of the present disclosure is not limited thereto. For example, a separate display that is retrofit into the imaging apparatus main body 12 may be used as the "display portion" according to the embodiments of the technology of the present disclosure.

In addition, the imaging processing, the first signal processing, and the second signal processing are merely an example. Accordingly, unnecessary steps may be deleted, new steps may be added, or a processing order may be rearranged without departing from a gist of the present disclosure.

Above described contents and illustrated contents are detailed description for parts according to the embodiment of the technology of the present disclosure and are merely one example of the technology of the present disclosure. For example, description related to the above configurations, functions, actions, and effects is description related to one example of configurations, functions, actions, and effects of the parts according to the embodiment of the technology of the present disclosure. Thus, unnecessary parts may be removed, new elements may be added, or parts may be replaced in the above described contents and the illustrated contents without departing from the gist of the technology of the present disclosure. In addition, particularly, description related to common technical knowledge or the like that does not need to be described in terms of embodying the technology of the present disclosure is omitted in the above described contents and the illustrated contents in order to avoid complication and facilitate understanding of the parts according to the embodiment of the technology of the present disclosure.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards is specifically and individually indicated to be incorporated by reference.

The following appendices are further disclosed with respect to the above embodiments.

Appendix 1

An imaging apparatus (10, 200, 300, 400, 500, and 700) including an imaging element (44, 244, 344, 444, and 544), the imaging apparatus (10, 200, 300, 400, 500, and 700) comprising a storage portion (64) that stores captured image data (70 and 570) obtained by imaging a subject by the imaging element (44, 244, 344, 444, and 544) and is incorporated in the imaging element (44, 244, 344, 444, and 544), a processing portion (62, 262, 363, 462, and 562) that processes the captured image data (70 and 570) and is incorporated in the imaging element (44, 244, 344, 444, and 544), an output portion (62D, 262D, 362D, 462D, and 562D) that outputs processed image data obtained by processing the captured image data (70 and 570) by the processing portion (62, 262, 363, 462, and 562) and is incorporated in the imaging element (44, 244, 344, 444, and 544), and a plurality of signal processing portions (50, 250, 350, 450, 550, 650, 52, 252, and 452) that are disposed outside the imaging element, in which the processing portion (62, 262, 362, 462, and 562) performs processing of dividing the captured image data (70 and 570) stored in the storage portion (64) into a plurality of pieces of image data (70A and 70B), the output portion (62D, 262D, 362D, 462D, and 562D) includes a plurality of output lines (53 and 55) each disposed in correspondence with each of the plurality of signal processing portions (50, 250, 350, 450, 550, 650, 52, 252, and 452) and outputs each of the plurality of pieces of image data (70A and 70B) as the processed image data to a corresponding signal processing portion among the plurality of signal processing portions (50, 250, 350, 450, 550, 650, 52, 252, 452, 750, and 752) from the plurality of output lines (53 and 55), and any of the plurality of signal processing portions (50, 250, 350, 450, 550, 650, 52, 252, 452, 750, and 752) combines the plurality of pieces of image data (70A and 70B).

Appendix 2

The imaging apparatus (200) according to Appendix 1, in which each of the plurality of pieces of image data (70A and 70B) is image data indicating an image having an overlapping region (71 and 271) between adjacent images (70A1a, 70B1a, 70A2a, and 70B2a) among a plurality of images (70A1a, 70B1a, 70A2a, and 70B2a) based on each of the plurality of pieces of image data (70A and 70B).

Appendix 3

The imaging apparatus (200) according to Appendix 1 or 2, in which the plurality of images (70A2a and 70B2a) are divided into a designated image (70B2a) and an image different from the designated image.

Appendix 4

The imaging apparatus (200) according to Appendix 3, in which the processing portion detects face image data indicating an image (69) of a face from the captured image data (70), and the designated image (70B2a) is an image including the image (69) of the face indicated by the face image data detected by the processing portion (262) in a captured image indicated by the captured image data (70).

Appendix 5

The imaging apparatus (400) according to any one of Appendices 1 to 4, in which the processing portion (462) changes a division method for the captured image data between a recording imaging mode and a display motion picture capturing mode.

Appendix 6

The imaging apparatus according to Appendix 5, in which the processing portion (462) divides the captured image data (70) into a plurality of pieces of overlapping image data (70A1 and 70B1) as the plurality of pieces of image data in the recording imaging mode, and divides the captured image data (70) in units of lines in the display motion picture capturing mode, and each of the plurality of pieces of overlapping image data is image data indicating an image having an overlapping region (71) between adjacent images among a plurality of images.

What is claimed is:

1. An imaging apparatus including an image sensor, the imaging apparatus comprising:
    a memory that stores captured image data obtained by imaging a subject via the image sensor and that is incorporated in the image sensor;
    a processor that is incorporated in the image sensor; and
    a plurality of signal processing processors that are external to the image sensor, wherein:
    the processor that is incorporated in the image sensor incorporates an output circuit,
    the output circuit includes a plurality of output lines each disposed in correspondence with each of the plurality of signal processing processors and outputs each of a plurality of pieces of image data into which the captured image data stored in the memory is divided, to a corresponding signal processing processor among the plurality of signal processing processors from the plurality of output lines,
    at least one of the plurality of signal processing processors combines the plurality of pieces of image data, and
    the captured image data stored in the memory is digitized image data.

2. The imaging apparatus according to claim 1, wherein each of the plurality of pieces of image data is image data indicating an image having an overlapping region between adjacent images among images based on each of the plurality of pieces of image data.

3. The imaging apparatus according to claim 1, wherein a plurality of images are divided into a designated image and an image different from the designated image.

4. The imaging apparatus according to claim 3, further comprising:
    a detection processor configured to detect face image data indicating an image of a face from the captured image data,
    wherein the designated image is an image including the image of the face indicated by the face image data detected by the detection processor in a captured image indicated by the captured image data.

5. The imaging apparatus according to claim 1, wherein a method of dividing the captured image data varies between a recording imaging mode and a display moving picture capturing mode.

6. The imaging apparatus according to claim 5, wherein the captured image data is divided into a plurality of pieces of overlapping image data as the plurality of pieces of image data in the recording imaging mode, and the captured image data is divided into units of lines in the display moving picture capturing mode.

7. The imaging apparatus according to claim 6, wherein each of the plurality of pieces of overlapping image data is image data indicating an image having an overlapping region between adjacent images among a plurality of images.

8. The imaging apparatus according to claim 5, wherein the recording imaging mode is an operation mode in which the imaging element performs imaging for a still picture.

9. The imaging apparatus according to claim 1, wherein the captured image data is color image data indicating a color captured image in which a plurality of primary color pixels are periodically arranged, the color image data is divided into a plurality of pieces of primary color pixel arrangement image data as the plurality of pieces of image data, and
    each of the plurality of pieces of primary color pixel arrangement image data is image data indicating an image in which each of the plurality of primary color pixels is periodically arranged.

10. The imaging apparatus according to claim 9, wherein the plurality of pieces of primary color pixel arrangement image data are a plurality of pieces of divided image data obtained by thinning out and then dividing the color image data.

11. The imaging apparatus according to claim 10,
wherein the plurality of pieces of divided image data are odd-numbered column image data indicating a set of pixels of odd-numbered columns and even-numbered column image data indicating a set of pixels of even-numbered columns, in thinned image data obtained by thinning out the color image data in units of rows.

12. The imaging apparatus according to claim 9,
wherein at least one of the plurality of signal processing processors performs demosaic processing on combined image data obtained by combining the plurality of pieces of image data.

13. The imaging apparatus according to claim 1,
wherein the plurality of pieces of image data are a plurality of pieces of compressed image data obtained by compressing the captured image data by dividing the captured image data into a plurality of bit ranges.

14. The imaging apparatus according to claim 13,
wherein the plurality of pieces of compressed image data are high-order bit image data and low-order bit image data in the captured image data.

15. The imaging apparatus according to claim 1,
wherein, in the image sensor, at least a photoelectric conversion element and the memory are formed in one chip.

16. The imaging apparatus according to claim 15,
wherein the image sensor is a laminated image sensor in which the photoelectric conversion element is laminated with the memory.

17. The imaging apparatus according to claim 1, further comprising:
a control processor configured to perform control for displaying an image, on a display, based on the plurality of pieces of image data output by the processor.

18. An image data processing method of an imaging apparatus including an image sensor, a memory that stores captured image data obtained by imaging a subject via the image sensor and that is incorporated in the image sensor, a processor that is incorporated in the image sensor, and a plurality of signal processing processors that are external to the image sensor, the image data processing method comprising:

outputting each of a plurality of pieces of image data into which the captured image data stored in the memory is divided, to a corresponding signal processing processor among the plurality of signal processing processors from a plurality of output lines each of which is disposed in the processor in correspondence with each of the plurality of signal processing processors; and combining the plurality of pieces of image data by at least one of the plurality of signal processing processors, wherein:

the processor that is incorporated in the image sensor includes incorporates an output circuit, the output circuit includes the plurality of output lines, and the captured image data stored in the memory is digitized image data.

19. A non-transitory computer-readable storage medium storing a program causing a computer applied to an imaging apparatus including an image sensor, a memory that stores captured image data obtained by imaging a subject via the image sensor and that is incorporated in the image sensor, a processor that is incorporated in the image sensor, and a plurality of signal processing processors that are external to the image sensor, wherein the processor that is incorporated in the image sensor incorporates an output circuit, and the output circuit includes a plurality of output lines each disposed in correspondence with each of the plurality of signal processing processors, to execute a process comprising:

outputting each of a plurality of pieces of image data into which the captured image data stored in the memory is divided, to a corresponding signal processing processor among the plurality of signal processing processors from the plurality of output lines; and combining the plurality of pieces of image data by at least one of the plurality of signal processing processors, wherein the captured image data stored in the memory is digitized image data.

* * * * *